US012641297B2

(12) United States Patent
Zhao et al.

(10) Patent No.: US 12,641,297 B2
(45) Date of Patent: May 26, 2026

(54) CROSS-COMPONENT SAMPLE OFFSET

(71) Applicant: Tencent America LLC, Palo Alto, CA (US)

(72) Inventors: Xin Zhao, San Jose, CA (US); Yixin Du, Los Altos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 25 days.

(21) Appl. No.: 18/676,272

(22) Filed: May 28, 2024

(65) Prior Publication Data

US 2024/0323450 A1      Sep. 26, 2024

Related U.S. Application Data

(63) Continuation of application No. 18/184,990, filed on Mar. 16, 2023, now Pat. No. 12,034,978, which is a
(Continued)

(51) Int. Cl.
H04N 19/82 (2014.01)
H04N 19/132 (2014.01)
(Continued)

(52) U.S. Cl.
CPC ........... H04N 19/82 (2014.11); H04N 19/132 (2014.11); H04N 19/172 (2014.11);
(Continued)

(58) Field of Classification Search
CPC .... H04N 19/82; H04N 19/132; H04N 19/172; H04N 19/186; H04N 19/593; H04N 19/86
(Continued)

(56) References Cited

U.S. PATENT DOCUMENTS

2013/0051454 A1    2/2013  Sze et al.
2017/0339411 A1    11/2017  Alshina et al.
(Continued)

FOREIGN PATENT DOCUMENTS

KR        10-2619404 B1    12/2023
WO        2018/045207 A1    3/2018
(Continued)

OTHER PUBLICATIONS

Fu et al., "Sample adaptive offset for HEVC," 13th International Workshop on Multimedia Signal Processing (MMSP), 2011, pp. 1-5.
(Continued)

*Primary Examiner* — Marnie A Matt
(74) *Attorney, Agent, or Firm* — ArentFox Schiff LLP

(57) ABSTRACT

An apparatus for video decoding including processing circuitry is provided. The processing circuitry is configured to receive a bitstream that includes coded information indicating a filter shape of a sample offset filter to be applied to a reconstructed sample of a first component in a current picture, the filter shape of the sample offset filter being one of a plurality of filter shapes, each of the plurality of filter shapes including different first reconstructed samples of a second component in the current picture. The processing circuitry is configured to determine an output value of the sample offset filter based on the first reconstructed samples in the filter shape indicated by the coded information. The processing circuitry is configured to determine a filtered sample value of the reconstructed sample of the first component based on the reconstructed sample and the output value of the sample offset filter.

20 Claims, 36 Drawing Sheets

Related U.S. Application Data continuation of application No. 17/495,318, filed on Oct. 6, 2021, now Pat. No. 11,706,461.

(60) Provisional application No. 63/162,956, filed on Mar. 18, 2021.

(51) Int. Cl.
| | |
|---|---|
| *H04N 19/172* | (2014.01) |
| *H04N 19/186* | (2014.01) |
| *H04N 19/593* | (2014.01) |
| *H04N 19/86* | (2014.01) |

(52) U.S. Cl.
CPC ......... *H04N 19/186* (2014.11); *H04N 19/593* (2014.11); *H04N 19/86* (2014.11)

(58) Field of Classification Search
USPC ................................................... 375/240.12
See application file for complete search history.

(56) References Cited

U.S. PATENT DOCUMENTS

| | | | |
|---|---|---|---|
| 2018/0063527 A1 | 3/2018 | Chen et al. | |
| 2018/0197276 A1 | 7/2018 | Kim et al. | |
| 2018/0343469 A1 | 11/2018 | Jin et al. | |
| 2019/0306534 A1 | 10/2019 | Zhang et al. | |
| 2021/0044834 A1* | 2/2021 | Li | H04N 19/107 |
| 2021/0368172 A1 | 11/2021 | Lim et al. | |
| 2022/0109833 A1 | 4/2022 | Choi et al. | |
| 2022/0248006 A1 | 8/2022 | Lim et al. | |
| 2022/0272333 A1 | 8/2022 | Jang | |
| 2022/0303529 A1* | 9/2022 | Lai | H04N 19/186 |
| 2025/0240418 A1* | 7/2025 | Jang | H04N 19/157 |

FOREIGN PATENT DOCUMENTS

| | | |
|---|---|---|
| WO | 2020/256413 A1 | 12/2020 |
| WO | 2020/259538 A1 | 12/2020 |
| WO | 2021/025165 A1 | 2/2021 |

OTHER PUBLICATIONS

Office Action received for Korean Patent Application No. 10-2022-7021937 mailed on Feb. 5, 2025, 11 pages (6 pages of English Translation and 5 pages of Official Copy).

Extended European Search Report received for European Patent Application No. 21929418.8, mailed on Apr. 13, 2023, 9 pages.

Fu et al., "CE13: Sample Adaptive Offset with LCU-independent Decoding," Joint Collaborative Team on Video Coding (JCT-VC) of ITU-T SG16 WP3 and ISO/IEC JTC1/SC29/WG11, Mar. 2011, 5th Meeting, JCTVC-E049, pp. 1-6.

Fu et al., "Sample Adaptive Offset in the HEVC Standard", IEEE Transactions on Circuits and Systems for Video Technology, vol. 22, No. 12, Dec. 2012, 6 pages.

International Search Report and Written Opinion received for PCT Patent Application No. PCT/US2021/054198, mailed on Jan. 14, 2022, 8 pages.

Office Action received for Chinese Patent Application No. 202180027129.X, mailed on Mar. 29, 2024, 18 pages (7 pages of English Translation and 11 pages of Original Document).

Zhao et al., "Study on Coding Tools Beyond AV1," arXiv.org, Cornell University Library, 13491, 2021, pp. 1-6.

* cited by examiner

| Combination | d0 | d1 | d2 | d3 | Offset |
|---|---|---|---|---|---|
| 0 | -1 | -1 | -1 | -1 | s0 |
| 1 | -1 | -1 | -1 | 0 | s1 |
| 2 | -1 | -1 | -1 | 1 | s2 |
| 3 | -1 | -1 | 0 | -1 | s3 |
| 4 | -1 | -1 | 0 | 0 | s4 |
| 5 | -1 | -1 | 0 | 1 | s5 |
| 6 | -1 | -1 | 1 | -1 | s6 |
| 7 | -1 | -1 | 1 | 0 | s7 |
| 8 | -1 | -1 | 1 | 1 | s8 |
| 9 | -1 | 0 | -1 | -1 | s9 |
| 10 | -1 | 0 | -1 | 0 | s10 |
| 11 | -1 | 0 | -1 | 1 | s11 |
| 12 | -1 | 0 | 0 | -1 | s12 |
| 13 | -1 | 0 | 0 | 0 | s13 |
| 14 | -1 | 0 | 0 | 1 | s14 |
| 15 | -1 | 0 | 1 | -1 | s15 |
| 16 | -1 | 0 | 1 | 0 | s16 |
| 17 | -1 | 0 | 1 | 1 | s17 |
| 18 | -1 | 1 | -1 | -1 | s18 |
| 19 | -1 | 1 | -1 | 0 | s19 |
| 20 | -1 | 1 | -1 | 1 | s20 |
| 21 | -1 | 1 | 0 | -1 | s21 |
| 22 | -1 | 1 | 0 | 0 | s22 |
| 23 | -1 | 1 | 0 | 1 | s23 |
| 24 | -1 | 1 | 1 | -1 | s24 |
| 25 | -1 | 1 | 1 | 0 | s25 |
| 26 | -1 | 1 | 1 | 1 | s26 |

FIG. 21B

Continued from FIG. 21A

| Combination | d0 | d1 | d2 | d3 | Offset |
|---|---|---|---|---|---|
| 27 | 0 | -1 | -1 | -1 | s27 |
| 28 | 0 | -1 | -1 | 0 | s28 |
| 29 | 0 | -1 | -1 | 1 | s29 |
| 30 | 0 | -1 | 0 | -1 | s30 |
| 31 | 0 | -1 | 0 | 0 | s31 |
| 32 | 0 | -1 | 0 | 1 | s32 |
| 33 | 0 | -1 | 1 | -1 | s33 |
| 34 | 0 | -1 | 1 | 0 | s34 |
| 35 | 0 | -1 | 1 | 1 | s35 |
| 36 | 0 | 0 | -1 | -1 | s36 |
| 37 | 0 | 0 | -1 | 0 | s37 |
| 38 | 0 | 0 | -1 | 1 | s38 |
| 39 | 0 | 0 | 0 | -1 | s39 |
| 40 | 0 | 0 | 0 | 0 | s40 |
| 41 | 0 | 0 | 0 | 1 | s41 |
| 42 | 0 | 0 | 1 | -1 | s42 |
| 43 | 0 | 0 | 1 | 0 | s43 |
| 44 | 0 | 0 | 1 | 1 | s44 |
| 45 | 0 | 1 | -1 | -1 | s45 |
| 46 | 0 | 1 | -1 | 0 | s46 |
| 47 | 0 | 1 | -1 | 1 | s47 |
| 48 | 0 | 1 | 0 | -1 | s48 |
| 49 | 0 | 1 | 0 | 0 | s49 |
| 50 | 0 | 1 | 0 | 1 | s50 |
| 51 | 0 | 1 | 1 | -1 | s51 |
| 52 | 0 | 1 | 1 | 0 | s52 |
| 53 | 0 | 1 | 1 | 1 | s53 |

FIG. 21C

*Continued from FIG. 21B*

| Combination | d0 | d1 | d2 | d3 | Offset |
|---|---|---|---|---|---|
| 54 | 1 | -1 | -1 | -1 | s54 |
| 55 | 1 | -1 | -1 | 0 | s55 |
| 56 | 1 | -1 | -1 | 1 | s56 |
| 57 | 1 | -1 | 0 | -1 | s57 |
| 58 | 1 | -1 | 0 | 0 | s58 |
| 59 | 1 | -1 | 0 | 1 | s59 |
| 60 | 1 | -1 | 1 | -1 | s60 |
| 61 | 1 | -1 | 1 | 0 | s61 |
| 62 | 1 | -1 | 1 | 1 | s62 |
| 63 | 1 | 0 | -1 | -1 | s63 |
| 64 | 1 | 0 | -1 | 0 | s64 |
| 65 | 1 | 0 | -1 | 1 | s65 |
| 66 | 1 | 0 | 0 | -1 | s66 |
| 67 | 1 | 0 | 0 | 0 | s67 |
| 68 | 1 | 0 | 0 | 1 | s68 |
| 69 | 1 | 0 | 1 | -1 | s69 |
| 70 | 1 | 0 | 1 | 0 | s70 |
| 71 | 1 | 0 | 1 | 1 | s71 |
| 72 | 1 | 1 | -1 | -1 | s72 |
| 73 | 1 | 1 | -1 | 0 | s73 |
| 74 | 1 | 1 | -1 | 1 | s74 |
| 75 | 1 | 1 | 0 | -1 | s75 |
| 76 | 1 | 1 | 0 | 0 | s76 |
| 77 | 1 | 1 | 0 | 1 | s77 |
| 78 | 1 | 1 | 1 | -1 | s78 |
| 79 | 1 | 1 | 1 | 0 | s79 |
| 80 | 1 | 1 | 1 | 1 | s80 |

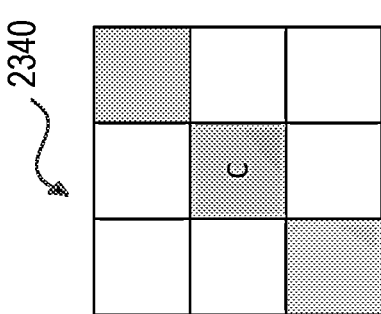
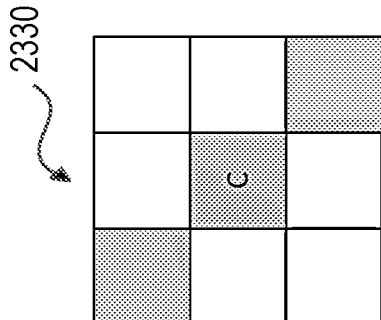
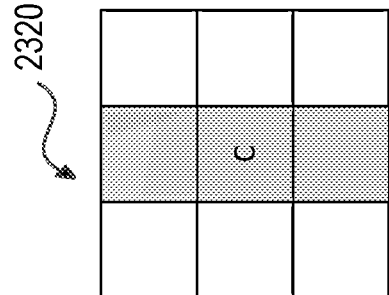
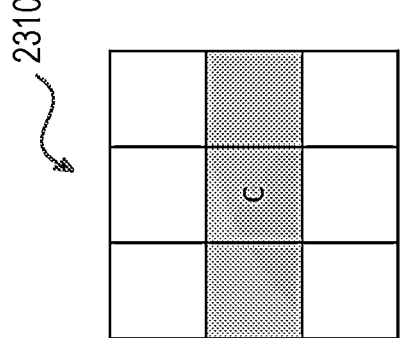
*FIG. 23*

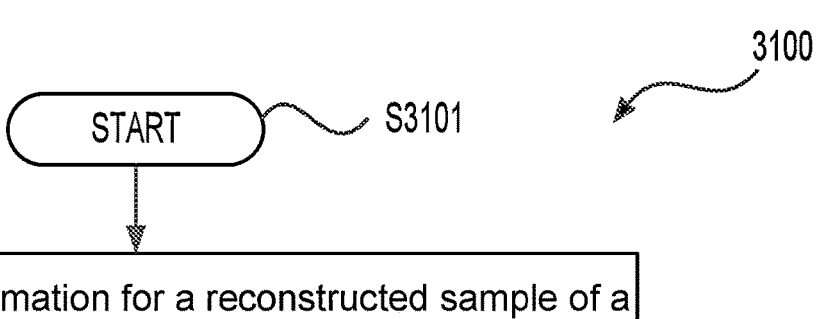

START ⟶ S3101

3100

Decode coded information for a reconstructed sample of a current component in a current picture from a coded video bitstream, the coded information indicating a sample offset filter to be applied to the reconstructed sample, a filter shape of the sample offset filter being one of a plurality of filter shapes, each of the plurality of filter shapes including first reconstructed samples of a first component in the current picture, for each of the plurality of filter shapes, a top-most sample of the first reconstructed samples being located within N rows from a center reconstructed sample in the first component that is co-located with the reconstructed sample of the current component, N being less than or equal to 3 ⟶ S3110

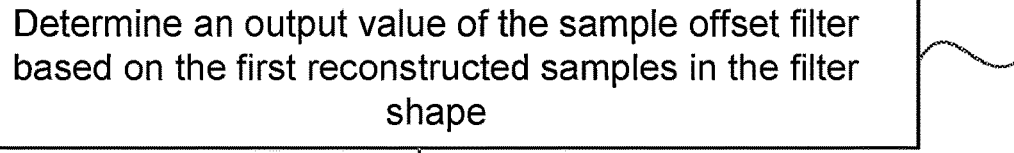

Determine an output value of the sample offset filter based on the first reconstructed samples in the filter shape ⟶ S3120

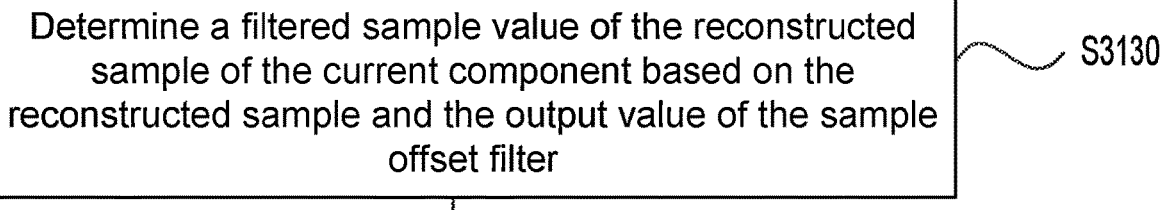

Determine a filtered sample value of the reconstructed sample of the current component based on the reconstructed sample and the output value of the sample offset filter ⟶ S3130

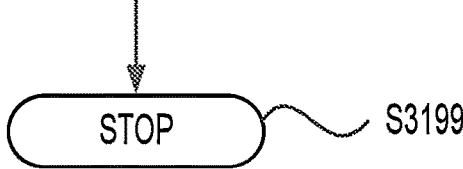

STOP ⟶ S3199

FIG. 31

CROSS-COMPONENT SAMPLE OFFSET

INCORPORATION BY REFERENCE

This present application is a continuation of U.S. application Ser. No. 18/184,990, filed on Mar. 16, 2023, which is a continuation of U.S. application Ser. No. 17/495,318, filed on Oct. 6, 2021, issued as U.S. Pat. No. 11,706,461, which claims the benefit of priority to U.S. Provisional Application No. 63/162,956, entitled "LOW-COMPLEXITY FILTER DESIGN FOR SAMPLE OFFSET," and filed on Mar. 18, 2021. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry can decode coded information for a reconstructed sample of a current component in a current picture from a coded video bitstream. The coded information indicates a sample offset filter to be applied to the reconstructed sample. A filter shape of the sample offset filter can be one of a plurality of filter shapes. Each of the plurality of filter shapes can include first reconstructed samples of a first component in the current picture. The processing circuitry can determine an output value of the sample offset filter based on the first reconstructed samples in the filter shape. Further, the processing circuitry can determine a filtered sample value of the reconstructed sample of the current component based on the reconstructed sample and the output value of the sample offset filter. The sample offset filter is an in-loop filter by which the output value is applied to the reconstructed sample as an offset to filter out coding artifacts while retaining details of the current component in the current picture.

For each of the plurality of filter shapes, a top-most sample of the first reconstructed samples is located within N rows from a center reconstructed sample in the first component that is co-located with the reconstructed sample of the current component. N can be less than or equal to 3.

In an embodiment, a number of the first reconstructed samples in each of the plurality of filter shapes is less than five.

In an embodiment, each of the plurality of filter shapes includes the center reconstructed sample that is co-located with the reconstructed sample of the current component, and a number of the first reconstructed samples in each of the plurality of filter shapes is 3. In an example, the first reconstructed samples in each of the plurality of filter shapes include the center reconstructed sample and two samples that are symmetric with respect to the center reconstructed sample.

In an example, the sample offset filter comprises one of a local sample offset filter (LSO), a cross-component sample offset filter (CCSO), and an adaptive sample offset filter (ASO)

In an embodiment, N is 1. In an example, each of the plurality of filter shapes includes the center reconstructed sample that is co-located with the reconstructed sample of the current component, and a number of the first reconstructed samples in each of the plurality of filter shapes is 3.

In an example, N is 1, and a location of the center reconstructed sample in the first component of the current picture is (i, j) where i and j can be integers. The plurality of filter shapes includes six filter shapes. Locations of the two samples in a first of the six filter shapes are (i−1, j) and (i+1, j), locations of the two samples in a second of the six filter shapes are (i−1, j−1) and (i+1, j+1), locations of the two samples in a third of the six filter shapes are (i, j−1) and (i, j+1), locations of the two samples in a fourth of the six filter shapes are (i+1, j−1) and (i−1, j+1), locations of the two samples in a fifth of the six filter shapes are (i, j−4) and (i, j+4), and locations of the two samples in a sixth of the six filter shapes are (i, j−7) and (i, j+7).

In an example, N is 1, and a location of the center reconstructed sample in the first component of the current picture is (i, j) where i and j can be integers. The plurality of filter shapes includes six different filter shapes. Locations of the two samples in the first filter shape are (i−1, j) and (i+1, j), locations of the two samples in the second filter shape are (i−1, j−1) and (i+1, j+1), locations of the two samples in the third filter shape are (i, j−1) and (i, j+1), locations of the two samples in the fourth filter shape are (i+1, j−1) and (i−1, j+1), locations of the two samples in the fifth filter shape are (i, j−3) and (i, j+3), and locations of the two samples in the sixth filter shape are (i, j−5) and (i, j+5).

In an example, the sample offset filter is the CCSO. For example, the first component is a luma component, and the current component is a chroma component.

In an example, the sample offset filter is the LSO, the first component is the current component, and the reconstructed sample is the center reconstructed sample.

In some examples, the current component is in a filtering unit in the current picture. The processing circuitry can determine the filter shape of the sample offset filter based on a location of the reconstructed sample in the filtering unit.

In an example, the sample offset filter is a CCSO filter, and the filtering unit is a chroma block having 128×128 chroma samples.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIGS. 10A-10D show examples of subsampled positions used for calculating gradients of a vertical direction, a horizontal direction, and two diagonal directions, respectively, according to embodiments of the disclosure.

FIGS. 21A-21C show an exemplary mapping used in a CCSO filter according to an embodiment of the disclosure.

FIG. 23 shows four patterns for pixel classifications in an edge offset according to an embodiment of the disclosure.

FIG. 31 shows a flow chart outlining a process (3100) according to an embodiment of the disclosure.

DETAILED DESCRIPTION OF EMBODIMENTS

Figure 1A:
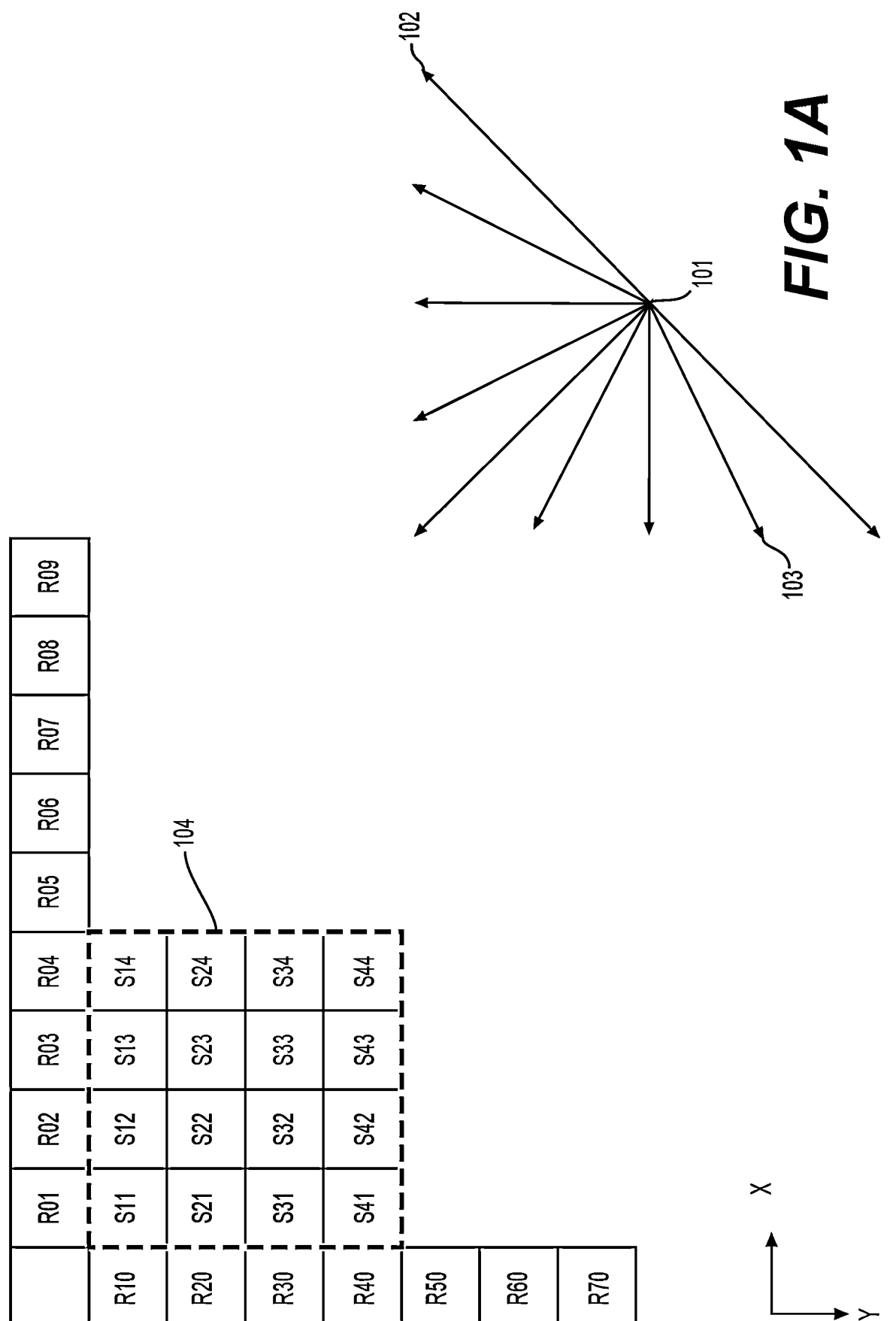
FIG. 1A is a schematic illustration of an exemplary subset of intra prediction modes.
Figure 1B:
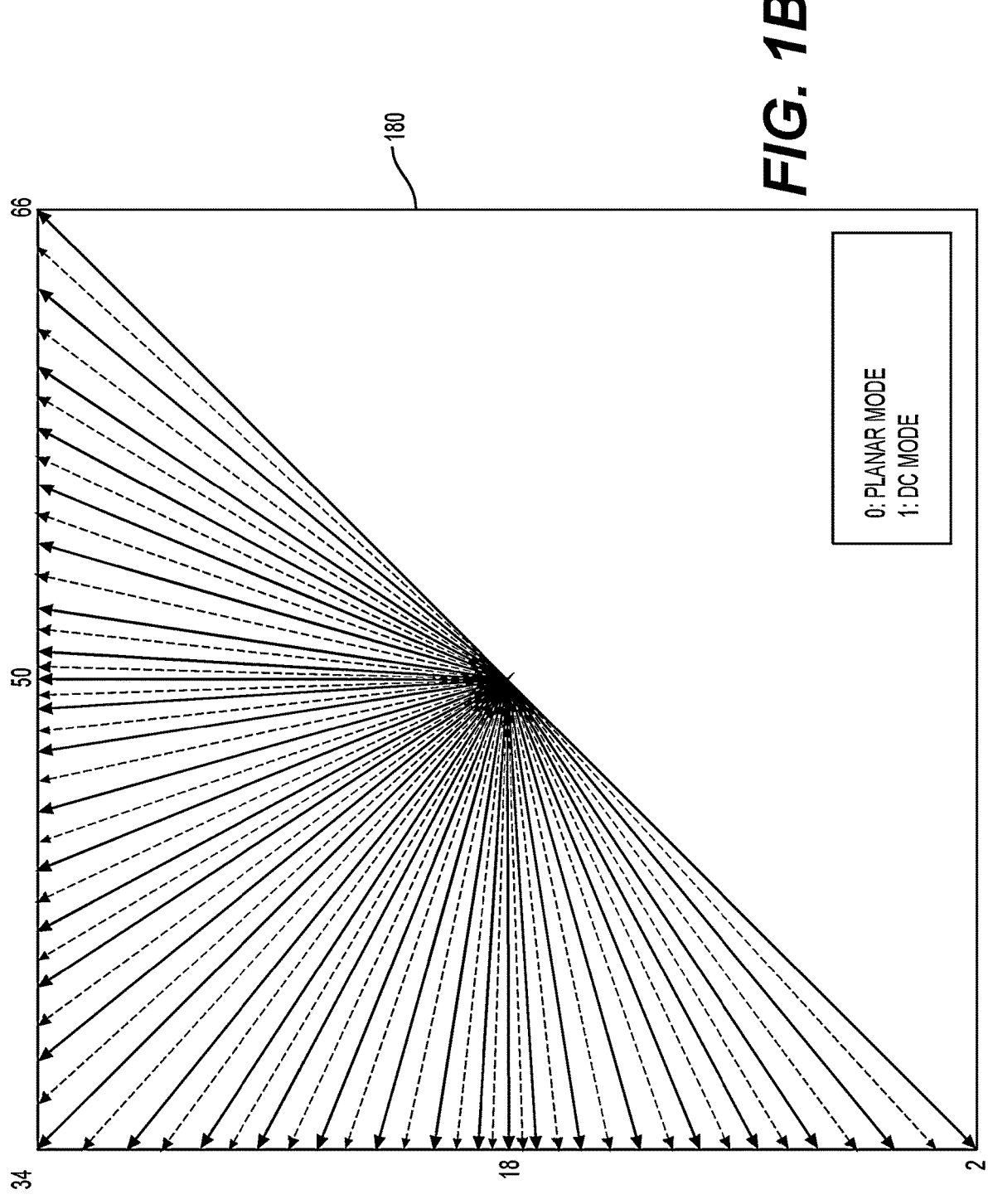
FIG. 1B is an illustration of exemplary intra prediction directions.
Figure 2:
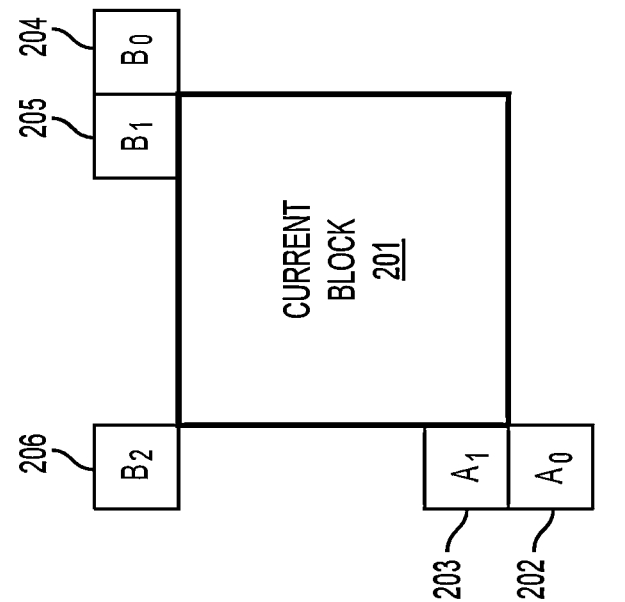
FIG. 2 is a schematic illustration of a current block and its surrounding spatial merge candidates in one example.
Figure 3:
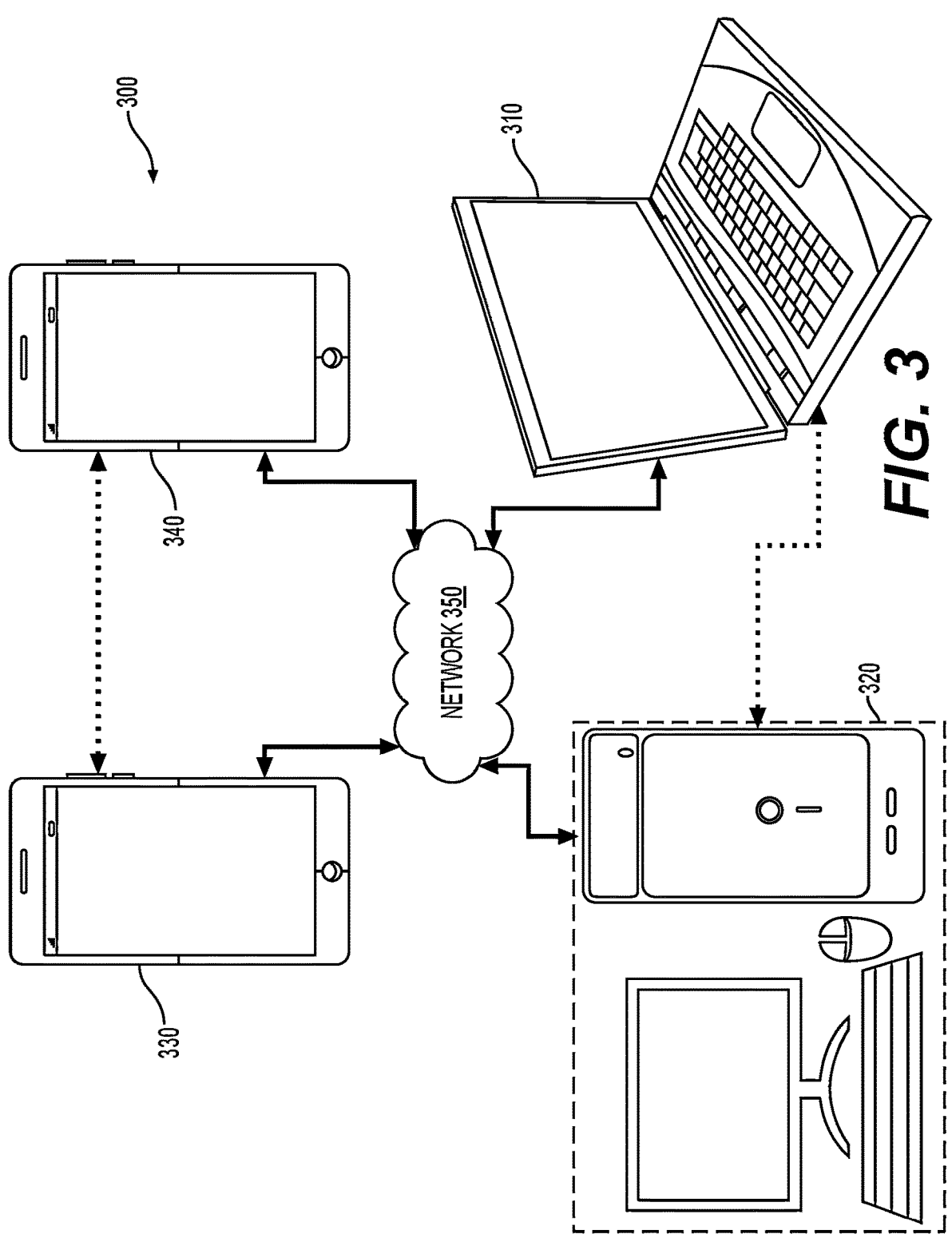
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
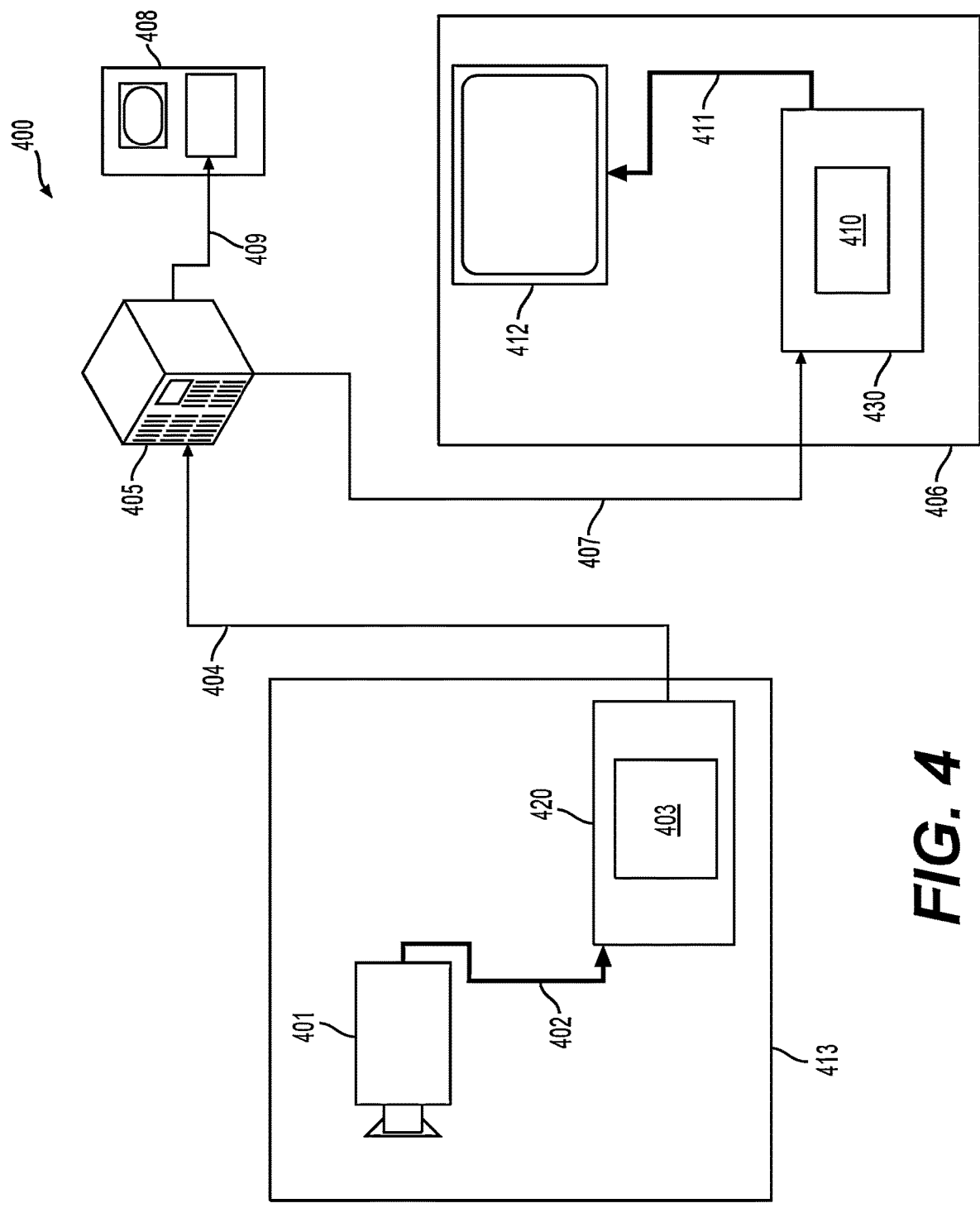
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413) that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
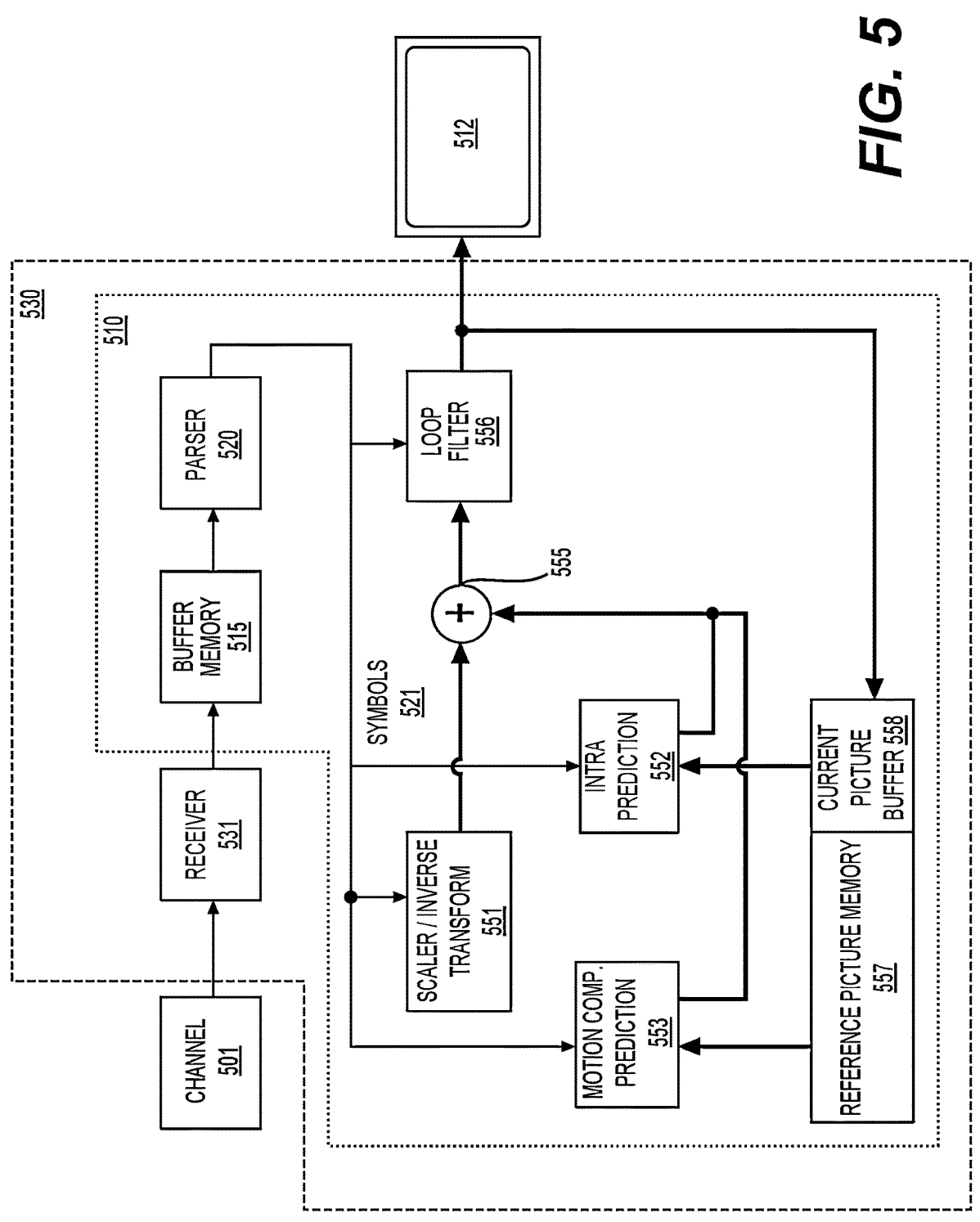
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence is decoded at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
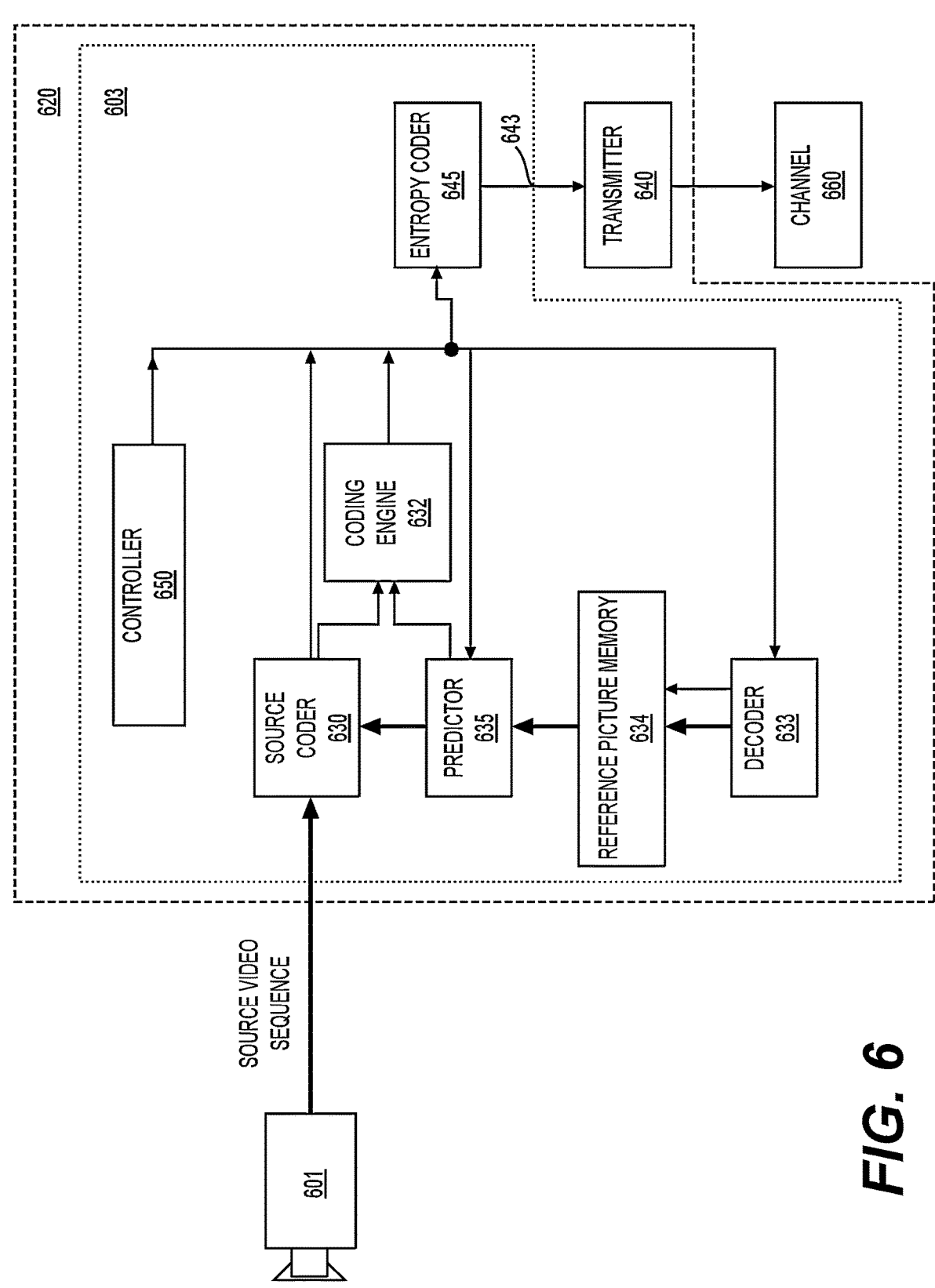
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bit-stream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
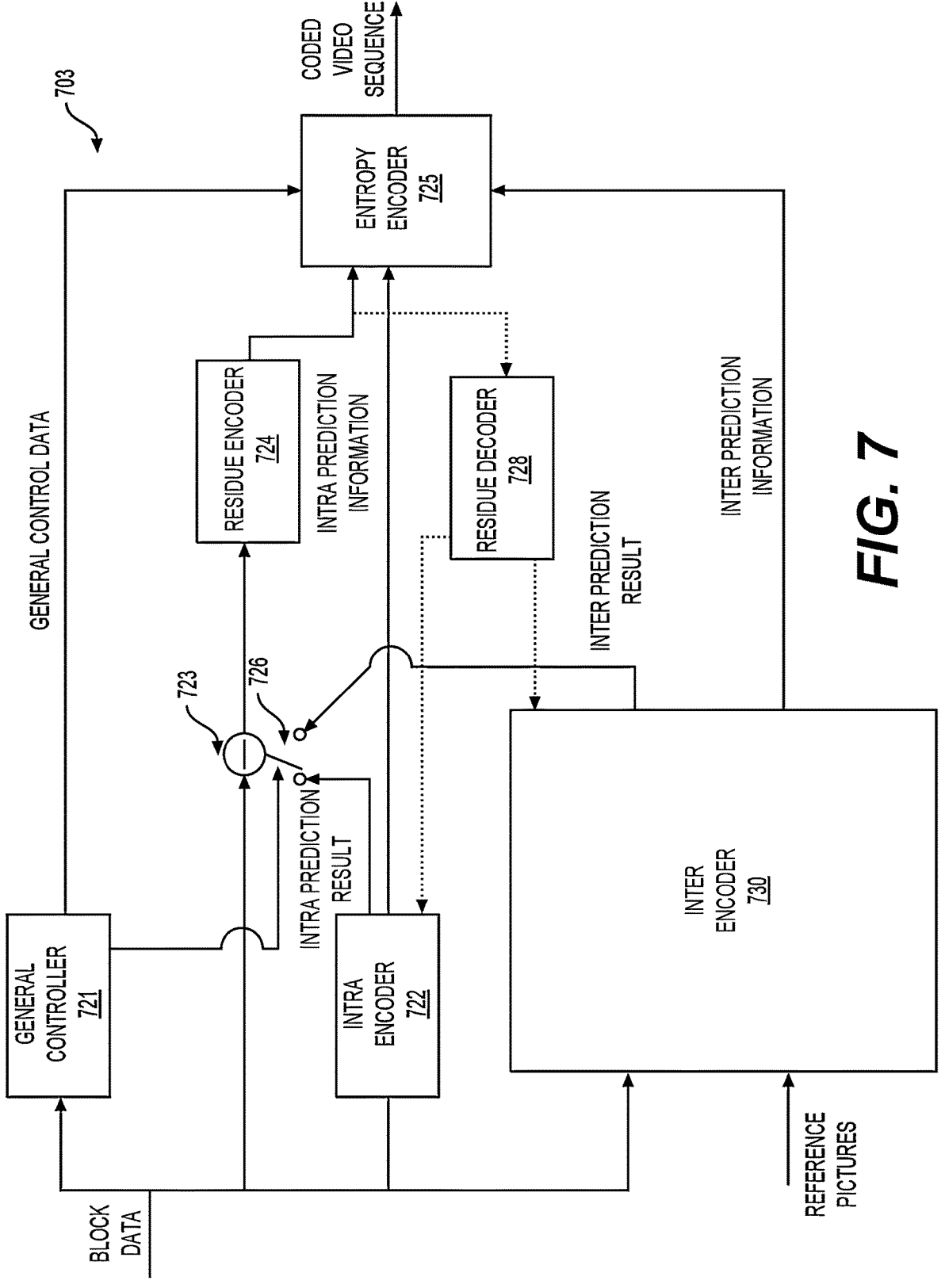
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703)

includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include in the bitstream various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
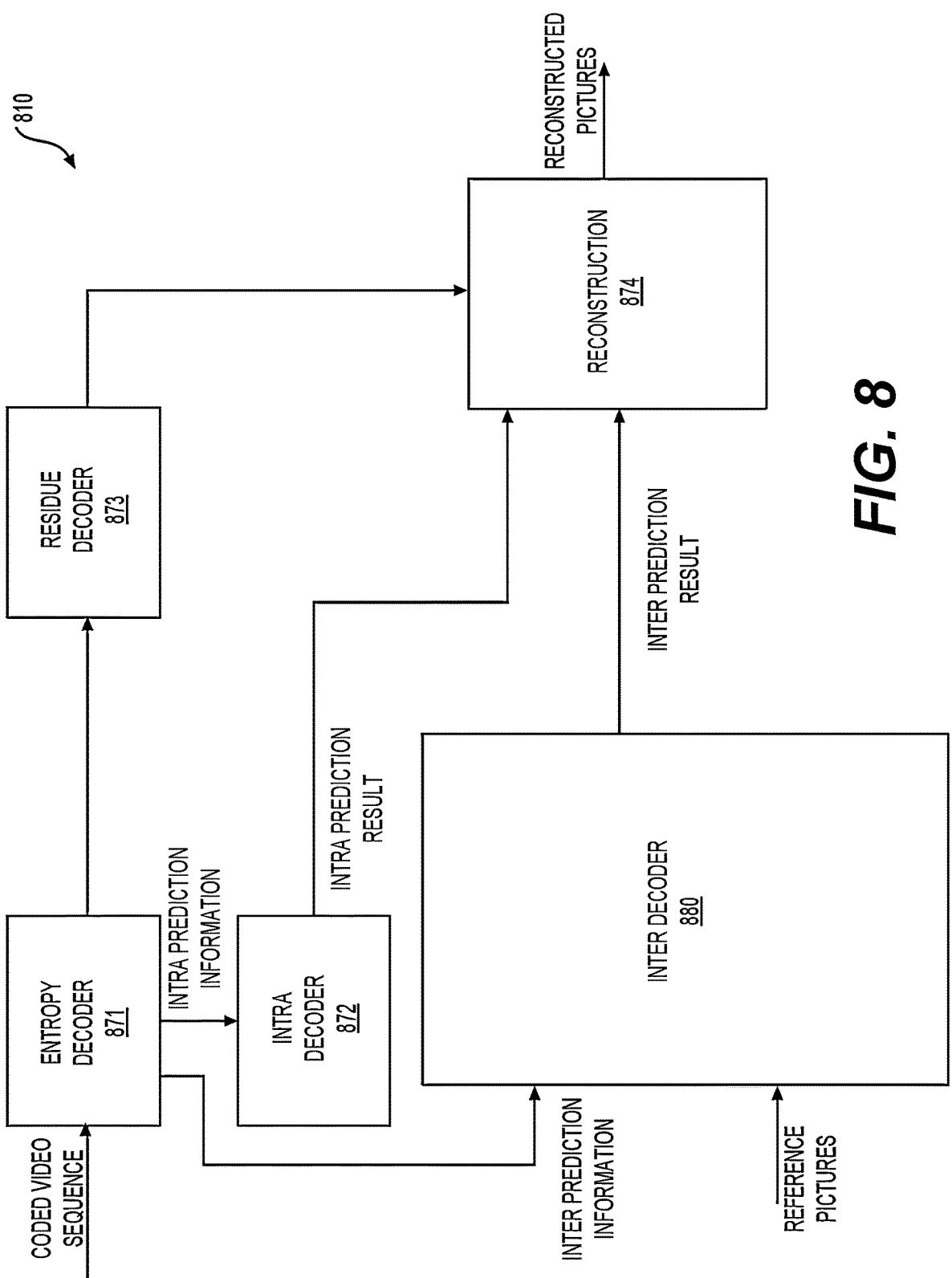
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The present disclosure includes a set of video coding technologies, such as a low-complexity filter or filter shape for sample offset. For example, lower complexity filter shapes for sample offset filters are disclosed.

A video coding format can include any suitable video coding format, for example, an open video coding format designed for video transmissions over the Internet, such as a video coding format Alliance for Open Media (AOMedia) Video 1 (AV1) or a next generation AOMedia Video format beyond the AV1. A video coding standard can include High Efficiency Video Coding (HEVC) standard, a next-generation video coding beyond HEVC (e.g., the Versatile Video Coding (VVC)), or the like.

An Adaptive Loop Filter (ALF) with block-based filter adaption can be applied by encoders/decoders to reduce artifacts. For a luma component, one of a plurality of filters (e.g., 25 filters) can be selected for a 4×4 luma block, for example, based on a direction and activity of local gradients.

Figure 9:
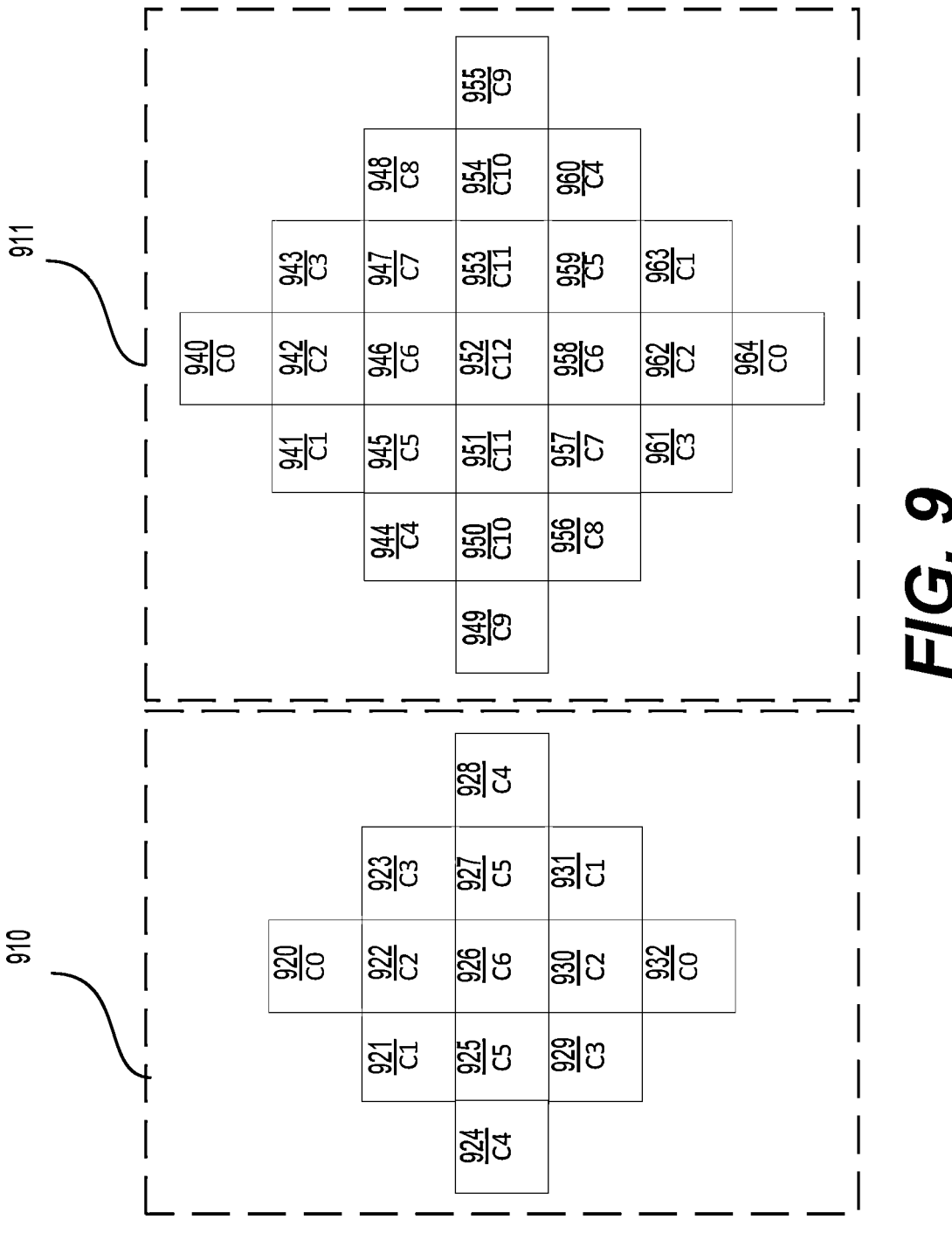
FIG. 9 shows exemplary adaptive loop filters according to embodiments of the disclosure.

An ALF can have any suitable shape and size. Referring to FIG. 9, ALFs (910)-(911) have a diamond shape, such as a 5×5 diamond-shape for the ALF (910) and a 7×7 diamond-shape for the ALF (911). In the ALF (910), elements (920)-(932) can be used in the filtering process and form a diamond shape. Seven values (e.g., C0-C6) can be used for the elements (920)-(932). In the ALF (911), elements (940)-(964) can be used in the filtering process and form a diamond shape. Thirteen values (e.g., C0-C12) can be used for the elements (940)-(964).

Referring to FIG. 9, in some examples, the two ALFs (910)-(911) with the diamond filter shape are used. The 5×5 diamond-shaped filter (910) can be applied for chroma components (e.g., chroma blocks, chroma CBs), and the 7×7 diamond-shaped filter (911) can be applied for a luma component (e.g., a luma block, a luma CB). Other suitable shape(s) and size(s) can be used in the ALF. For example, a 9×9 diamond-shaped filter can be used.

Filter coefficients at locations indicated by the values (e.g., C0-C6 in (910) or C0-C12 in (920)) can be non-zero. Further, when the ALF includes a clipping function, clipping values at the locations can be non-zero.

For block classification of a luma component, a 4×4 block (or luma block, luma CB) can be categorized or classified as one of multiple (e.g., 25) classes. A classification index C can be derived based on a directionality parameter D and a quantized value $\hat{A}$ of an activity value A using Eq. (1).

$$C = 5D + \hat{A} \qquad \text{Eq. (1)}$$

To calculate the directionality parameter D and the quantized value $\hat{A}$, gradients $g_v$, $g_h$, $g_{d1}$, and $g_{d2}$ of a vertical, a horizontal, and two diagonal directions (e.g., d1 and d2), respectively, can be calculated using 1-D Laplacian as follows.

$$g_v = \sum_{k=i-2}^{i+3} \sum_{l=j-2}^{j+3} V_{k,l}, \; V_{k,l} = |2R(k, l) - R(k, l-1) - R(k, l+1)| \quad \text{Eq. (2)}$$

$$g_h = \sum_{k=i-2}^{i+3} \sum_{l=j-2}^{j+3} H_{k,l}, \; H_{k,l} = |2R(k, l) - R(k-1, l) - R(k+1, l)| \quad \text{Eq. (3)}$$

$$g_{d1} = \sum_{k=i-2}^{i+3} \sum_{l=j-2}^{j+3} D1_{k,l}, \quad \text{Eq. (4)}$$
$$D1_{k,l} = |2R(k, l) - R(k-1, l-1) - R(k+1, l+1)|$$

$$g_{d2} = \sum_{k=i-2}^{i+3} \sum_{l=j-2}^{j+3} D2_{k,l}, \quad \text{Eq. (5)}$$
$$D2_{k,l} = |2R(k, l) - R(k-1, l+1) - R(k+1, l-1)|$$

where indices i and j refer to coordinates of an upper left sample within the 4×4 block and R(k, l) indicates a reconstructed sample at a coordinate (k, l). The directions (e.g., d1 and d2) can refer to 2 diagonal directions.

Figures 10A, 10B:
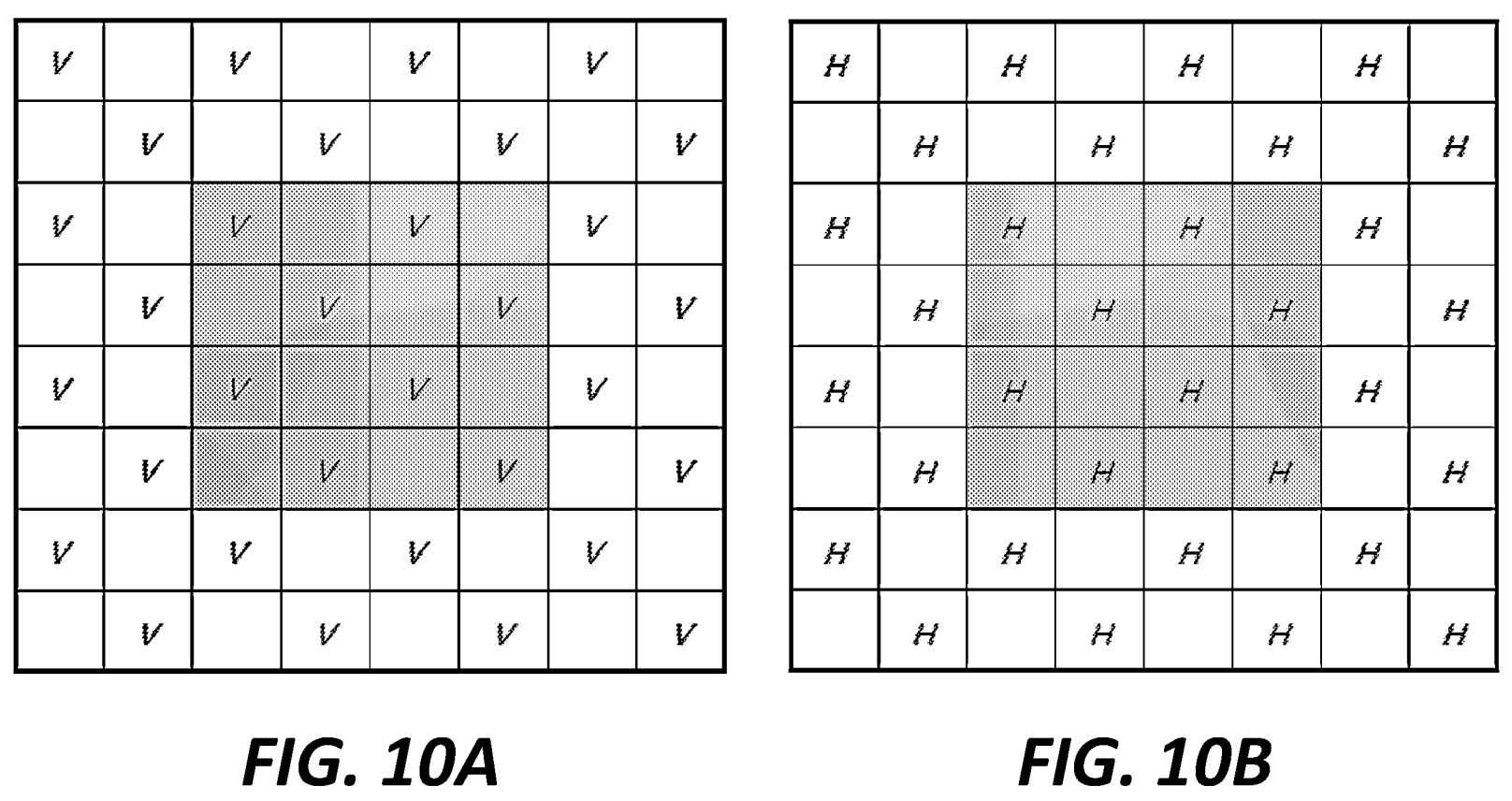
Figures 10C, 10D:
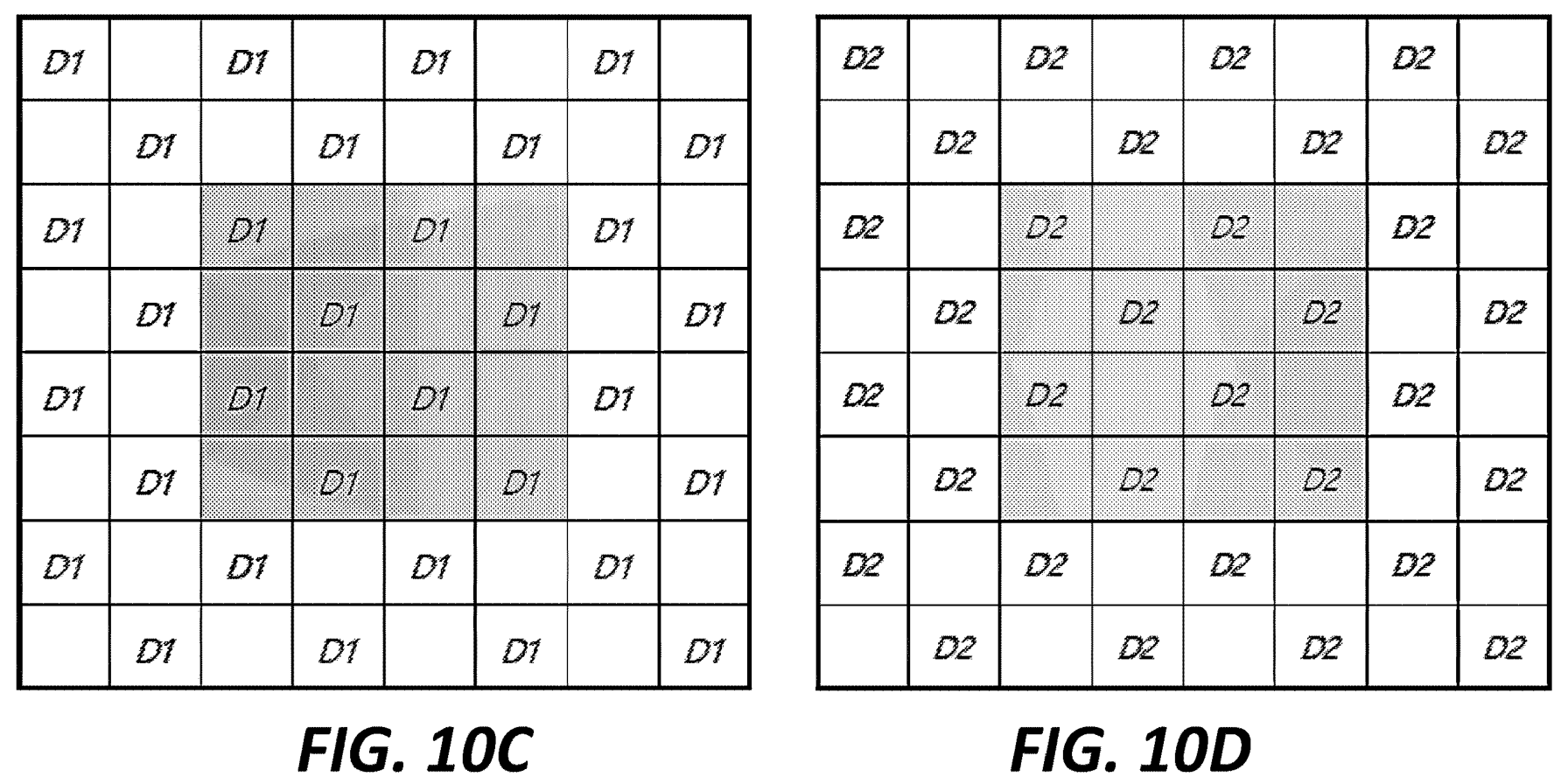

To reduce complexity of the block classification described above, a subsampled 1-D Laplacian calculation can be applied. FIGS. 10A-10D show examples of subsampled positions used for calculating the gradients $g_v$, $g_h$, $g_{d1}$, and $g_{d2}$ of the vertical (FIG. 10A), the horizontal (FIG. 10B), and the two diagonal directions d1 (FIG. 10C) and d2 (FIG. 10D), respectively. The same subsampled positions can be used for gradient calculation of the different directions. In FIG. 10A, labels 'V' show the subsampled positions to calculate the vertical gradient $g_v$. In FIG. 10B, labels 'H' show the subsampled positions to calculate the horizontal gradient $g_h$. In FIG. 10C, labels 'D1' show the subsampled positions to calculate the d1 diagonal gradient $g_{d1}$. In FIG. 10D, labels 'D2' show the subsampled positions to calculate the d2 diagonal gradient $g_{d2}$.

A maximum value $$g_{h,v}^{max}$$

and a minimum value $$g_{h,v}^{min}$$

of the gradients of horizontal and vertical directions $g_v$ and $g_h$ can be set as:

$$g_{h,v}^{max} = \max(g_h, g_v), \; g_{h,v}^{min} = \min(g_h, g_v) \quad \text{Eq. (6)}$$

A maximum value $$g_{d1,d2}^{max}$$

and a minimum value $$g_{d1,d2}^{min}$$

of the gradients of two diagonal directions $g_{d1}$ and $g_{d2}$ can be set as:

$$g_{d1,d2}^{max} = \max(g_{d1}, g_{d2}), \; g_{d1,d2}^{min} = \min(g_{d1}, g_{d2}) \quad \text{Eq. (7)}$$

The directionality parameter D can be derived based on the above values and two thresholds $t_1$ and $t_2$ as below.

If (1) $g_{h,v}^{max} \le t_1 \cdot g_{h,v}^{min}$ and (2) $g_{d1,d2}^{max} \le t_1 \cdot g_{d1,d2}^{min}$ are true,    Step 1

D is set to 0.

If $g_{h,v}^{max} / g_{h,v}^{min} > g_{d1,d2}^{max} / g_{d1,d2}^{min}$, continue to Step 3;    Step 2 otherwise continue to Step 4.

If $g_{h,v}^{max} > t_2 \cdot g_{h,v}^{min}$, D is set to 2; otherwise D is set to 1.    Step 3

If $g_{d1,d2}^{max} > t_2 \cdot g_{d1,d2}^{min}$, D is set to 4; otherwise D is set to 3.    Step 4

The activity value A can be calculated as:

$$A = \sum_{k=i-2}^{i+3} \sum_{l=j-2}^{j+3} (V_{k,l} + H_{k,l}) \quad \text{Eq. (8)}$$

A can be further quantized to a range of 0 to 4, inclusively, and the quantized value is denoted as Â.

For chroma components in a picture, no block classification is applied, and thus a single set of ALF coefficients can be applied for each chroma component.

Geometric transformations can be applied to filter coefficients and corresponding filter clipping values (also referred to as clipping values). Before filtering a block (e.g., a 4×4 luma block), geometric transformations such as rotation or diagonal and vertical flipping can be applied to the filter coefficients f(k, l) and the corresponding filter clipping values c(k, l), for example, depending on gradient values (e.g., $g_v$, $g_h$, $g_{d1}$, and/or $g_{d2}$) calculated for the block. The geometric transformations applied to the filter coefficients f(k, l) and the corresponding filter clipping values c(k, l) can be equivalent to applying the geometric transformations to samples in a region supported by the filter. The geometric transformations can make different blocks to which an ALF is applied more similar by aligning the respective directionality.

Three geometric transformations, including a diagonal flip, a vertical flip, and a rotation can be performed as described by Eqs. (9)-(11), respectively.

$$f_D(k, l) = f(l, k), \; c_D(k, l) = c(l, k), \quad \text{Eq. (9)}$$

$$f_V(k, l) = f(k, K - l - 1), \; c_V(k, l) = c(k, K - l - 1) \quad \text{Eq. (10)}$$

$$f_R(k, l) = f(K - l - 1, k), \; c_R(k, l) = c(K - l - 1, k) \quad \text{Eq. (11)}$$

where K is a size of the ALF or the filter, and $0 \le k$, $l \le K-1$ are coordinates of coefficients. For example, a location (0,0) is at an upper left corner and a location (K-1, K-1) is at a lower right corner of the filter f or a clipping value matrix (or clipping matrix) c. The transformations can be applied to the filter coefficients f(k, l) and the clipping values c(k, l) depending on the gradient values calculated for the block. An example of a relationship between the transformation and the four gradients are summarized in Table 1.

TABLE 1

Mapping of the gradient calculated
for a block and the transformation

| Gradient values | Transformation |
|---|---|
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, such as in VVC, ALF filter parameters are signaled in an Adaptation Parameter Set (APS) for a picture. In the APS, one or more sets (e.g., up to 25 sets) of luma filter coefficients and clipping value indexes can be signaled. In an example, a set of the one or more sets can include luma filter coefficients and one or more clipping value indexes. One or more sets (e.g., up to 8 sets) of chroma filter coefficients and clipping value indexes can be signaled. To reduce signaling overhead, filter coefficients of different classifications (e.g., having different classification indices) for luma components can be merged. In a slice header, indices of the APSs used for a current slice can be signaled. In an example, such as in VVC, the signaling of ALF is CTU based.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by a table, such as a table (e.g., used for a luma CB) of the clipping value index and the corresponding clipping value for a luma component, a table (e.g., used for a chroma CB) of the clipping value index and the corresponding clipping value for a chroma component. The clipping value can be dependent on a bit depth B. The bit depth B can refer to an internal bit depth, a bit depth of reconstructed samples in a CB to be filtered, or the like. In some examples, a table of clipping values (e.g., for luma and/or for chroma) is obtained using Eq. (12).

$$AlfClip = \{round(2^{B-\alpha*n}) \text{ for } n \in [0..N-1]\}, \quad \text{Eq. (12)}$$

where AlfClip is the clipping value, B is the bit depth (e.g., bitDepth), N (e.g., N=4) is a number of allowed clipping values, α is a pre-defined constant value. In an example, α is equal to 2.35. n is the clipping value index (also referred to as clipping index or clipIdx). Table 2 shows an example of a table obtained using Eq. (12) with N=4. The clipping index n can be 0, 1, 2, and 3 in Table 2. Table 2 can be used for luma blocks or chroma blocks.

TABLE 2

AlfClip can depend on the bit depth B and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |

TABLE 2-continued

AlfClip can depend on the bit depth B and clipIdx

| bitDepth | clipIdx | | | |
|---|---|---|---|---|
| | 0 | 1 | 2 | 3 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (also referred to as signaled filter set(s)) that are signaled in the APSs. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to decrease the multiplication complexity, a bitstream conformance can be applied so that the coefficient value of the non-central position can be in a range of −27 to 27−1, inclusive. In an example, the central position coefficient is not signaled in the bitstream and can be considered as equal to 128.

In some embodiments, the syntaxes and semantics of clipping index and clipping values are defined as follows: alf_luma_clip_idx [sfIdx][j] can be used to specify the clipping index of the clipping value to use before multiplying by the j-th coefficient of the signaled luma filter indicated by sfIdx. A requirement of bitstream conformance can include that the values of alf_luma_clip_idx [sfIdx][j] with sfIdx=0 to alf_luma_num_filters_signalled_minus1 and j=0 to 11 shall be in the range of 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepth Y and clipIdx set equal to alf_luma_clip_idx [alf_luma_coeff_delta_idx [filtIdx]][j].

alf_chroma_clip_idx [altIdx][j] can be used to specify the clipping index of the clipping value to use before multiplying by the j-th coefficient of the alternative chroma filter with index altIdx. A requirement of bitstream conformance can include that the values of alf_chroma_clip_idx[altIdx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id] [altIdx][j], with altIdx=0 to alf_chroma_num_alt_filters_minus 1, j=0 to 5 can be derived as specified in Table 2 depending on bitDepth set equal to BitDepthC and clipIdx set equal to alf_chroma_clip_idx [altIdx][j].

In an embodiment, the filtering process can be described as below. At a decoder side, when the ALF is enabled for a CTB, a sample R(i,j) within a CU (or CB) can be filtered, resulting in a filtered sample value R'(i,j) as shown below using Eq. (13). In an example, each sample in the CU is filtered.

$$R'(i, j) = R(i, j) +$$

$$\left( \left( \sum_{k \neq 0} \sum_{l \neq 0} f(k, l) \times K(R(i + k, j + l) - R(i, j), c(k, l)) + 64 \right) >> 7 \right)$$

Eq. (13)

where f(k,l) denotes the decoded filter coefficients, K(x, y) is a clipping function, and c(k, l) denotes the decoded clipping parameters (or clipping values). The variables k and l can vary between −L/2 and L/2 where L denotes a filter length. The clipping function K(x, y)=min(y, max(−y, x)) corresponds to a clipping function Clip3 (−y, y, x). By incorporating the clipping function K(x, y), the loop filtering method (e.g., ALF) becomes a non-linear process, and can be referred to a nonlinear ALF.

The selected clipping values can be coded in an "alf_data" syntax element as follows: a suitable encoding scheme (e.g., a Golomb encoding scheme) can be used to encode a clipping index corresponding to the selected clipping value such as shown in Table 2. The encoding scheme can be the same encoding scheme used for encoding the filter set index.

Figure 11A:
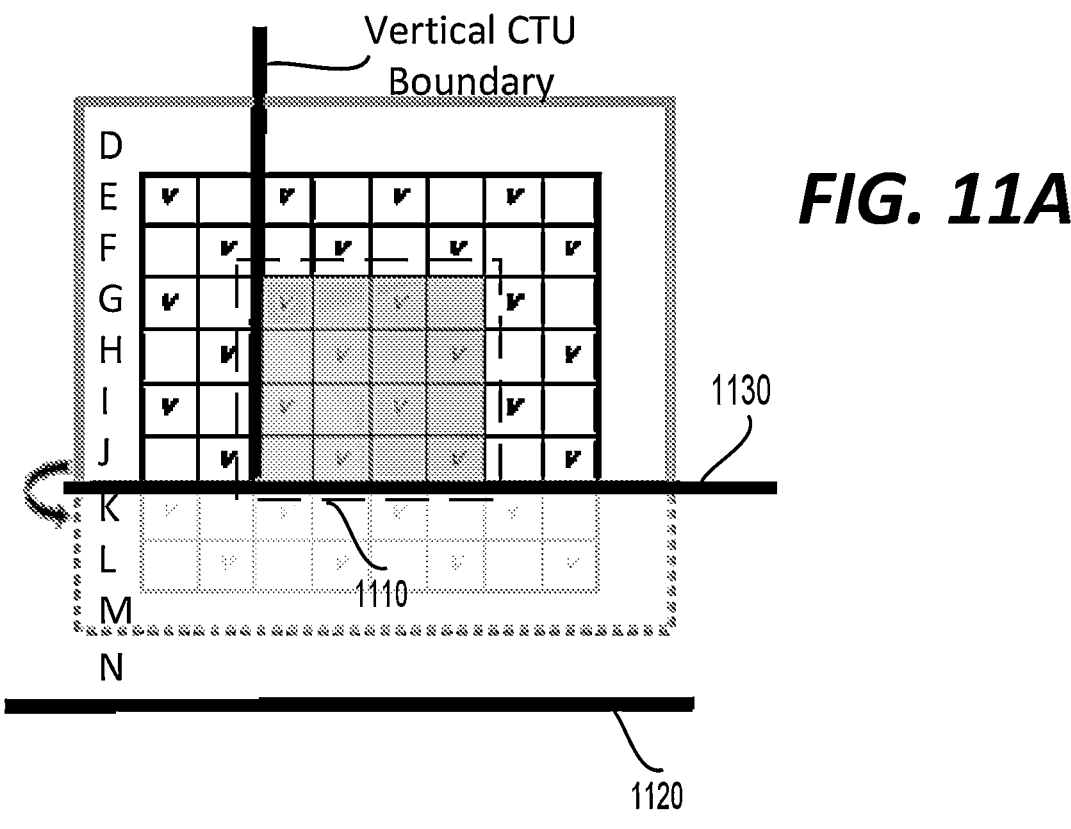
FIGS. 11A and 11B show modified block classifications at virtual boundaries according to embodiments of the disclosure.

In an embodiment, a virtual boundary filtering process can be used to reduce a line buffer requirement of the ALF. Accordingly, modified block classification and filtering can be employed for samples near CTU boundaries (e.g., a horizontal CTU boundary). A virtual boundary (1130) can be defined as a line by shifting a horizontal CTU boundary (1120) by "$N_{samples}$" samples, as shown in FIG. 11A, where $N_{samples}$ can be a positive integer. In an example, $N_{samples}$ is equal to 4 for a luma component, and $N_{samples}$ is equal to 2 for a chroma component.

Figure 11B:
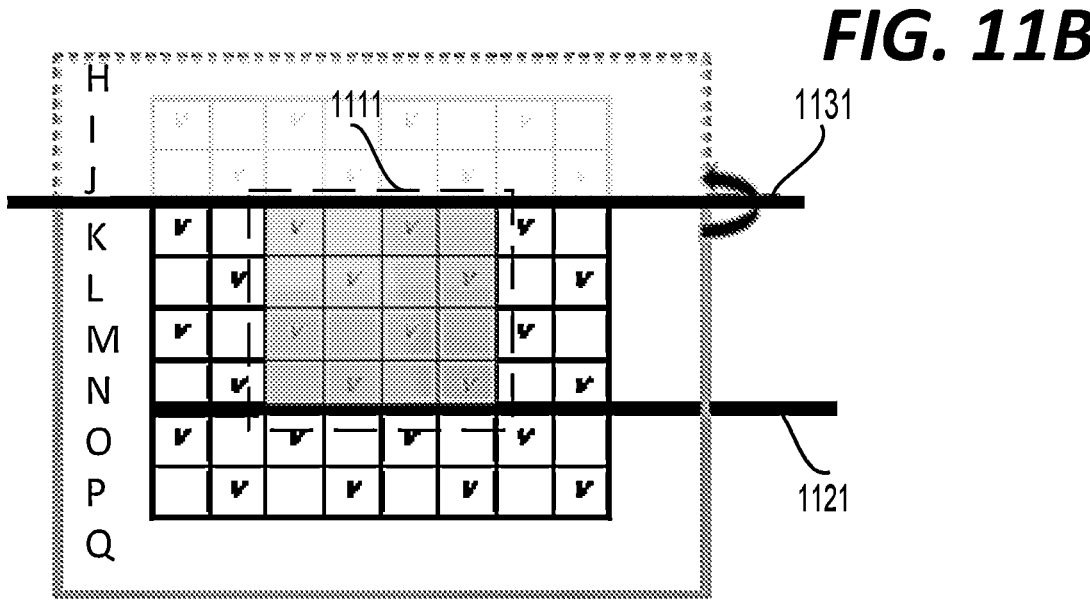

Referring to FIG. 11A, a modified block classification can be applied for a luma component. In an example, for the 1D Laplacian gradient calculation of a 4×4 block (1110) above the virtual boundary (1130), only samples above the virtual boundary (1130) are used. Similarly, referring to FIG. 11B, for a 1D Laplacian gradient calculation of a 4×4 block (1111) below a virtual boundary (1131) that is shifted from a CTU boundary (1121), only samples below the virtual boundary (1131) are used. The quantization of an activity value A can be accordingly scaled by taking into account a reduced number of samples used in the 1D Laplacian gradient calculation.

Figures 12A, 12B, 12C, 12D, 12E, 12F:
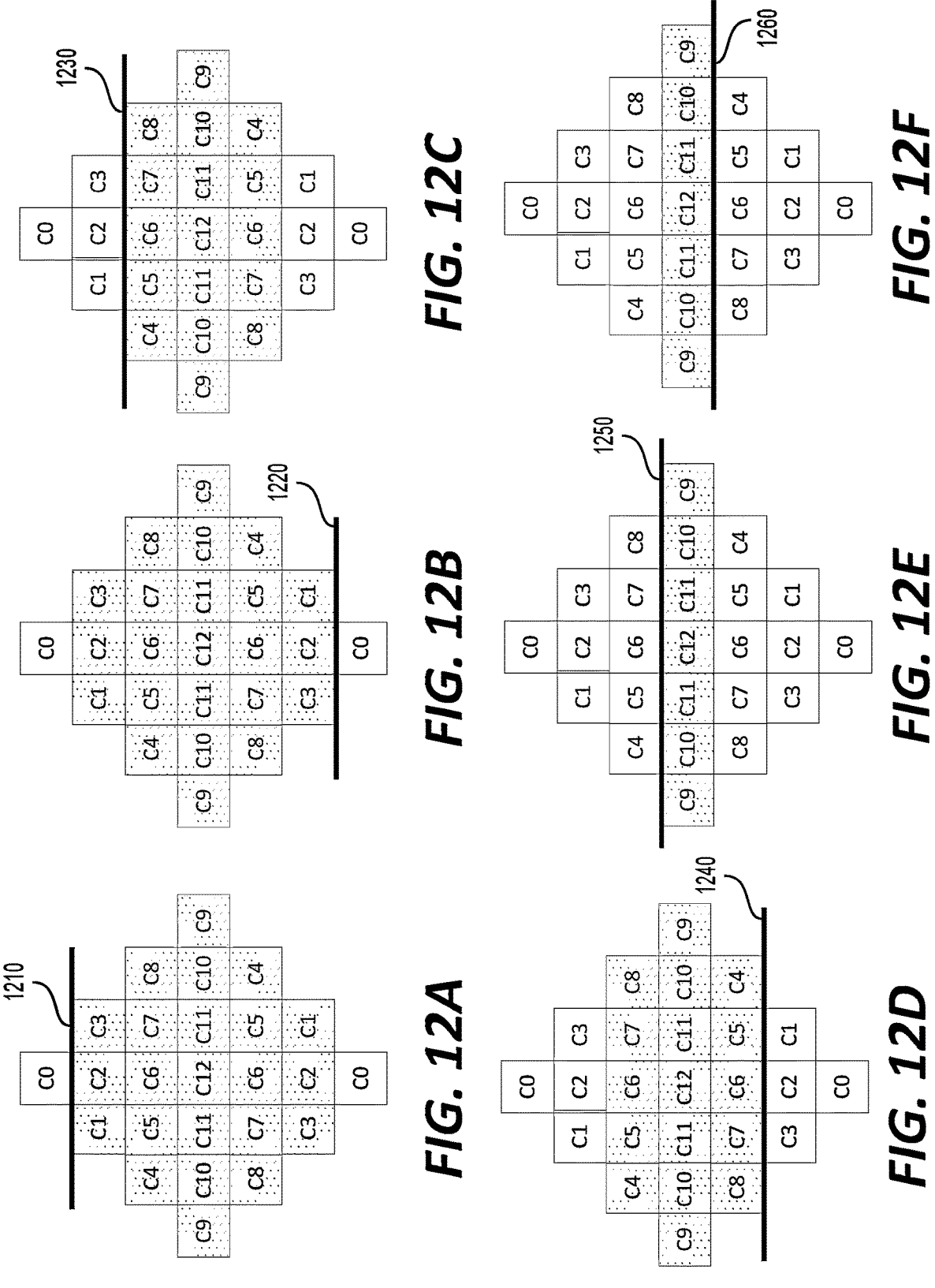
FIGS. 12A-12F show exemplary adaptive loop filters with padding operations at respective virtual boundaries according to embodiments of the disclosure.

For a filtering processing, a symmetric padding operation at virtual boundaries can be used for both a luma component and a chroma component. FIGS. 12A-12F illustrate examples of such modified ALF filtering for a luma component at virtual boundaries. When a sample being filtered is located below a virtual boundary, neighboring samples that are located above the virtual boundary can be padded. When a sample being filtered is located above a virtual boundary, neighboring samples that are located below the virtual boundary can be padded. Referring to FIG. 12A, a neighboring sample C0 can be padded with a sample C2 that is located below a virtual boundary (1210). Referring to FIG. 12B, a neighboring sample C0 can be padded with a sample C2 that is located above a virtual boundary (1220). Referring to FIG. 12C, neighboring samples C1-C3 can be padded with samples C5-C7, respectively, that are located below a virtual boundary (1230). Referring to FIG. 12D, neighboring samples C1-C3 can be padded with samples C5-C7, respectively, that are located above a virtual boundary (1240). Referring to FIG. 12E, neighboring samples C4-C8 can be padded with samples C10, C11, C12, C11, and C10, respectively, that are located below a virtual boundary (1250). Referring to FIG. 12F, neighboring samples C4-C8 can be padded with samples C10, C11, C12, C11, and C10, respectively, that are located above a virtual boundary (1260).

In some examples, the above description can be suitably adapted when sample(s) and neighboring sample(s) are located to the left (or to the right) and to the right (or to the left) of a virtual boundary.

A largest coding unit (LCU)-aligned picture quadtree splitting can be used. In order to enhance coding efficiency, a coding unit synchronous picture quadtree-based adaptive loop filter can be used in video coding. In an example, a luma picture is split into multiple multi-level quadtree partitions, and each partition boundary is aligned to boundaries of largest coding units (LCUs). Each partition can have a filtering process, and thus can be referred to as a filter unit or filtering unit (FU).

A 2-pass encoding flow is described as follows. At a first pass, a quadtree split pattern and the best filter (or an optimal filer) of each FU can be decided. Filtering distortions can be estimated by a fast filtering distortion estimation (FFDE) during the decision process. According to the decided quadtree split pattern and the selected filters of the FUs (e.g., all FUs), a reconstructed picture can be filtered. At a second pass, a CU synchronous ALF on/off control can be performed. According to the ALF on/off results, the first filtered picture is partially recovered by the reconstructed picture.

Figure 13:
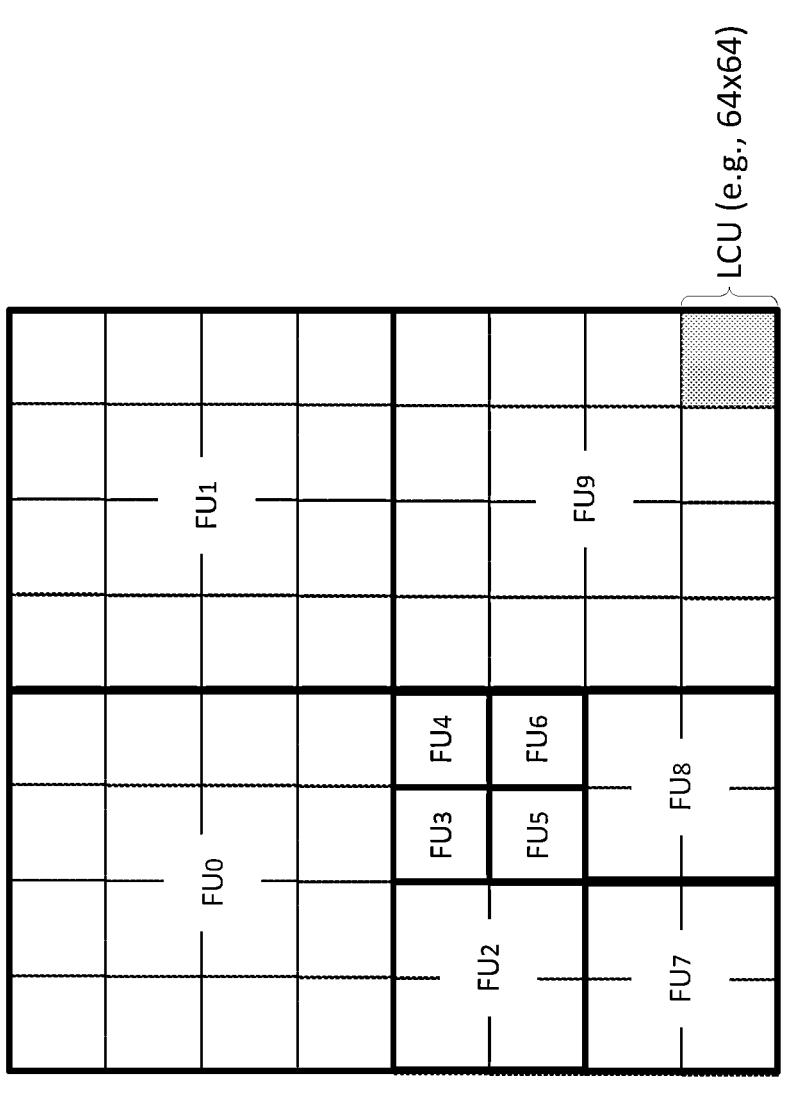
FIG. 13. shows an example of largest coding unit aligned picture quadtree splitting according to an embodiment of the disclosure.

A top-down splitting strategy can be adopted to divide a picture into multi-level quadtree partitions by using a rate-distortion criterion. Each partition can be referred to as a FU. The splitting process can align quadtree partitions with LCU boundaries, as shown in FIG. 13. FIG. 13 shows an example of LCU-aligned picture quadtree splitting according to an embodiment of the disclosure. In an example, an encoding order of FUs follows a z-scan order. For example, referring to FIG. 13, a picture is split into ten FUs (e.g., $FU_0$-$FU_9$) and the encoding order is from $FU_0$ to $FU_9$, e.g., $FU_0$, $FU_1$, $FU_2$, $FU_3$, $FU_4$, $FU_5$, $FU_6$, $FU_7$, $FU_8$, and $FU_9$.

Figure 14:
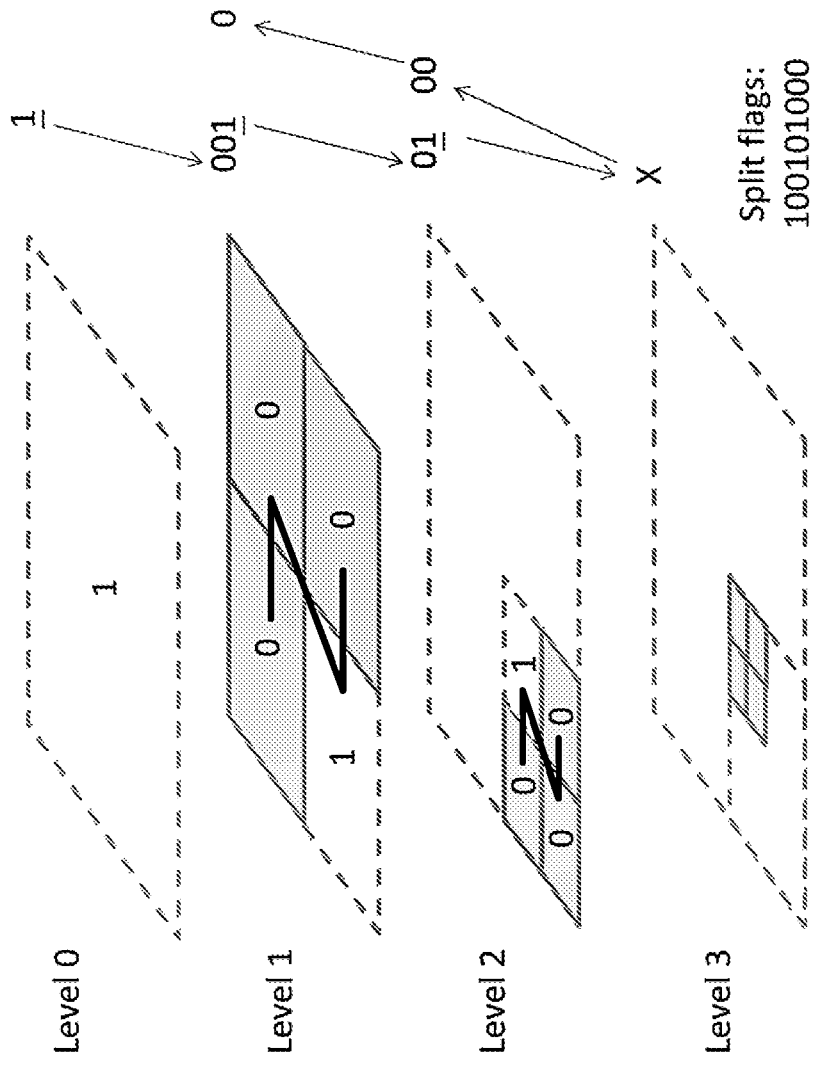
FIG. 14 shows a quadtree split pattern corresponding to FIG. 13 according to an embodiment of the disclosure.

To indicate a picture quadtree split pattern, split flags can be encoded and transmitted in a z-scan order. FIG. 14 shows a quadtree split pattern corresponding to FIG. 13 according to an embodiment of the disclosure. As shown in an example in FIG. 14, quadtree split flags are encoded in a z scan order.

A filter of each FU can be selected from two filter sets based on the rate-distortion criterion. The first set can have ½-symmetric square-shaped and rhombus-shaped filters newly derived for a current FU. The second set can be from time-delayed filter buffers. The time-delayed filter buffers can store filters previously derived for FUs in prior pictures. The filter with the minimum rate-distortion cost of the two filter sets can be chosen for the current FU. Similarly, if the current FU is not the smallest FU and can be further split into four children FUs, the rate-distortion costs of the four children FUs can be calculated. By comparing the rate-distortion cost of the split and non-split cases recursively, the picture quadtree split pattern can be determined.

In some examples, a maximum quadtree split level is 2, and thus a maximum number of FUs is 16. During the quadtree split decision, correlation values for deriving Wiener coefficients of the 16 FUs at the bottom quadtree level (smallest FUs) can be reused. The remaining FUs can derive the Wiener filters of the remaining FUs from the correlations of the 16 FUs at the bottom quadtree level. Therefore, in an example, there is only one frame buffer access for deriving the filter coefficients of all FUs.

After the quadtree split pattern is determined, to further reduce the filtering distortion, the CU synchronous ALF on/off control can be performed. By comparing the filtering distortion and non-filtering distortion, a leaf CU can explicitly switch ALF on/off in a corresponding local region. The coding efficiency may be further improved by redesigning filter coefficients according to the ALF on/off results. In an example, the redesigning process needs additional frame buffer accesses. Thus, in some examples, such as a coding unit synchronous picture quadtree-based adaptive loop filter (CS-PQALF) encoder design, no redesign process is needed after the CU synchronous ALF on/off decision in order to minimize the number of frame buffer accesses.

A cross-component filtering process can apply cross-component filters, such as cross-component adaptive loop filters (CC-ALFs). The cross-component filter can use luma sample values of a luma component (e.g., a luma CB) to refine a chroma component (e.g., a chroma CB corresponding to the luma CB). In an example, the luma CB and the chroma CB are included in a CU.

Figure 15:
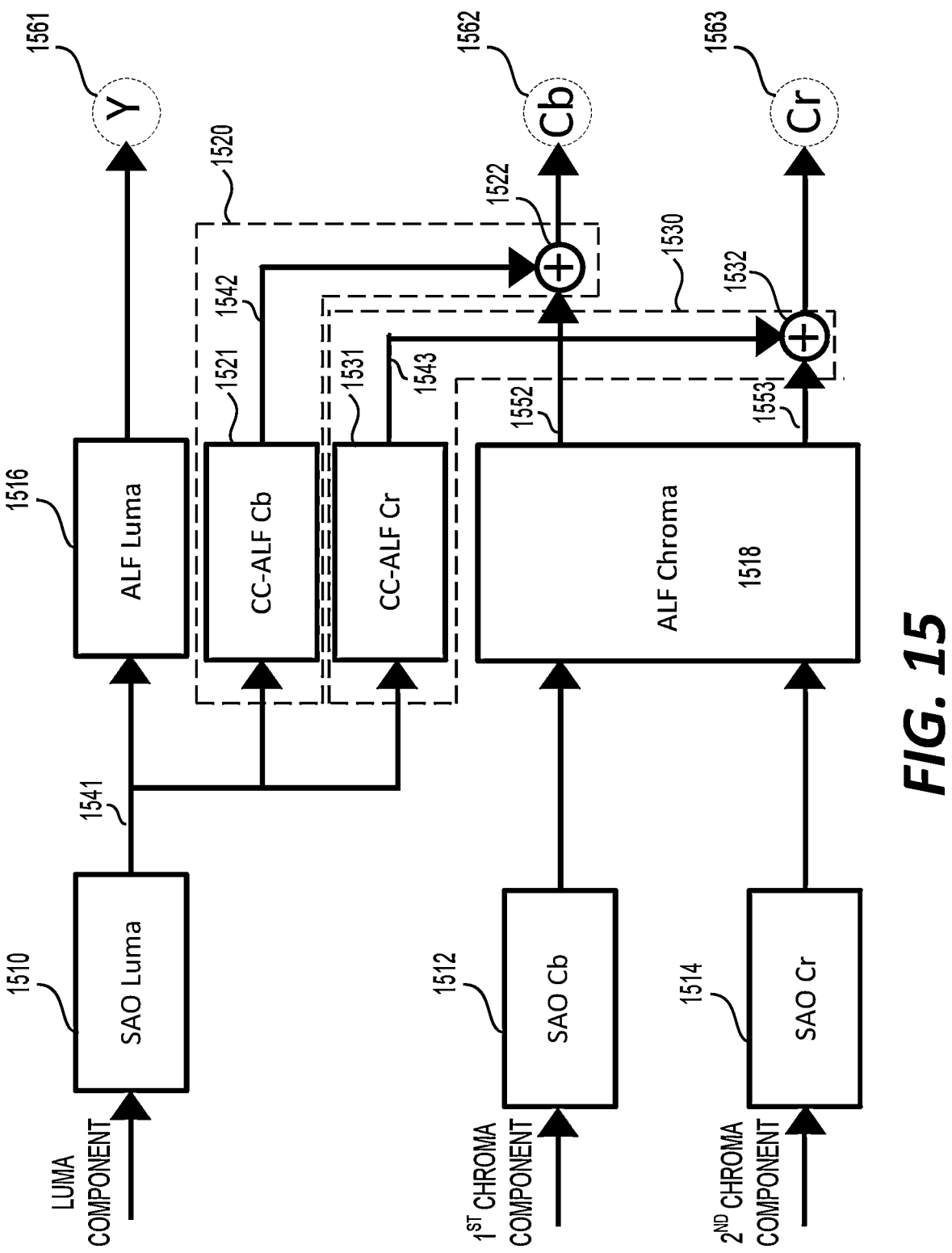
FIG. 15 shows cross-component filters used to generate chroma components according to an embodiment of the disclosure.

FIG. 15 shows cross-component filters (e.g., CC-ALFs) used to generate chroma components according to an embodiment of the disclosure. In some examples, FIG. 15 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (1510) to generate a SAO filtered luma component (1541). The SAO filtered luma component (1541) can be further filtered by an ALF luma filter (1516) to become a filtered luma CB (1561) (e.g., 'Y').

The first chroma component can be filtered by a SAO filter (1512) and an ALF chroma filter (1518) to generate a first intermediate component (1552). Further, the SAO filtered luma component (1541) can be filtered by a cross-component filter (e.g., CC-ALF) (1521) for the first chroma component to generate a second intermediate component (1542). Subsequently, a filtered first chroma component (1562) (e.g., 'Cb') can be generated based on at least one of the second intermediate component (1542) and the first intermediate component (1552). In an example, the filtered first chroma component (1562) (e.g., 'Cb') can be generated by combining the second intermediate component (1542) and the first intermediate component (1552) with an adder (1522). The cross-component adaptive loop filtering process for the first chroma component can include a step performed by the CC-ALF (1521) and a step performed by, for example, the adder (1522).

The above description can be adapted to the second chroma component. The second chroma component can be filtered by a SAO filter (1514) and the ALF chroma filter (1518) to generate a third intermediate component (1553). Further, the SAO filtered luma component (1541) can be filtered by a cross-component filter (e.g., a CC-ALF) (1531) for the second chroma component to generate a fourth intermediate component (1543). Subsequently, a filtered second chroma component (1563) (e.g., 'Cr') can be generated based on at least one of the fourth intermediate component (1543) and the third intermediate component (1553). In an example, the filtered second chroma component (1563) (e.g., 'Cr') can be generated by combining the fourth intermediate component (1543) and the third intermediate component (1553) with an adder (1532). In an example, the cross-component adaptive loop filtering process for the second chroma component can include a step performed by the CC-ALF (1531) and a step performed by, for example, the adder (1532).

A cross-component filter (e.g., the CC-ALF (1521), the CC-ALF (1531)) can operate by applying a linear filter having any suitable filter shape to the luma component (or a luma channel) to refine each chroma component (e.g., the first chroma component, the second chroma component).

Figure 16:
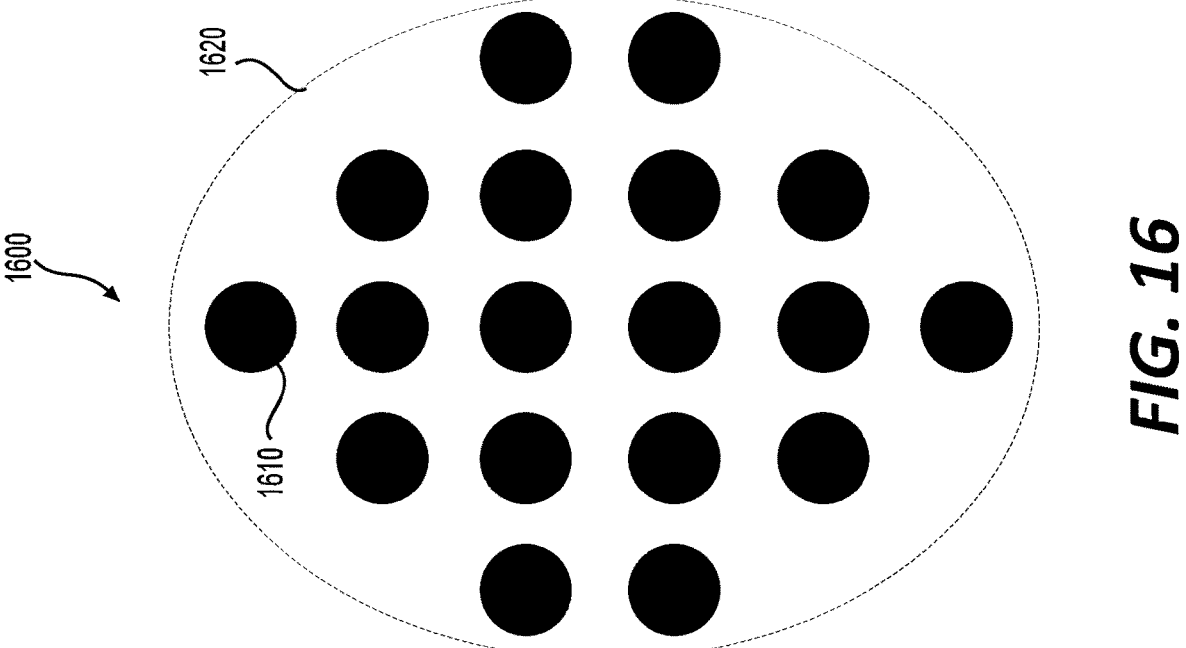
FIG. 16 shows an example of a filter according to an embodiment of the disclosure.

FIG. 16 shows an example of a filter (1600) according to an embodiment of the disclosure. The filter (1600) can include non-zero filter coefficients and zero filter coefficients. The filter (1600) has a diamond shape (1620) formed by filter coefficients (1610) (indicated by circles having black fill). In an example, the non-zero filter coefficients in the filter (1600) are included in the filter coefficients (1610), and filter coefficients not included in the filter coefficients (1610) are zero. Thus, the non-zero filter coefficients in the filter (1600) are included in the diamond shape (1620), and the filter coefficients not included in the diamond shape (1620) are zero. In an example, a number of the filter coefficients of the filter (1600) is equal to a number of the filter coefficients (1610), which is 18 in the example shown in FIG. 14.

The CC-ALF can include any suitable filter coefficients (also referred to as the CC-ALF filter coefficients). Referring back to FIG. 15, the CC-ALF (1521) and the CC-ALF (1531) can have a same filter shape, such as the diamond shape (1620) shown in FIG. 14, and a same number of filter coefficients. In an example, values of the filter coefficients in the CC-ALF (1521) are different from values of the filter coefficients in the CC-ALF (1531).

In general, filter coefficients (e.g., non-zero filter coefficients) in a CC-ALF can be transmitted, for example, in the APS. In an example, the filter coefficients can be scaled by a factor (e.g., 210) and can be rounded for a fixed point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

In an example, the syntax changes of CC-ALF are described below in Table 3.

TABLE 3

Syntax changes of CC-ALF if ( slice_cross_component_alf_cb_enabled_flag )
  alf_ctb_cross_component_cb_idc[ xCtb >> CtbLog2SizeY ][ yCtb >> Ctb          ae(v)
Log2SizeY ]

TABLE 3-continued

Syntax changes of CC-ALF

| | |
|---|---|
| if( slice_cross_component_alf_cb_enabled_flag = = 0 ‖ alf_ctb_cross_comp onent_cb_idc[ xCtb >> CtbLog2SizeY ][ yCtb >> CtbLog2SizeY ] == 0 ) | |
|    if( slice_alf_chroma_idc = = 1 ‖ slice_alf_chroma_idc = = 3 ) { | |
|       alf_ctb_flag[ 1 ][ xCtb >> CtbLog2SizeY ][ yCtb >> CtbLog2SizeY ] | ae(v) |
|       if( | |
| alf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|    alf_ctb_filter_alt_idx[ 0 ][ xCtb >> CtbLog2SizeY ][ yCtb >> CtbLog2Siz eY ] | ae(v) |
|    } | |
|    if ( slice_cross_component_alf_cr_enabled_flag ) | |
|    alf_ctb_cross_component_cr_idc[ xCtb >> CtbLog2SizeY ][ yCtb >> Ctb Log2SizeY ] | ae(v) |
|    if( slice_cross_component_alf_cr_enabled_flag = = 0 ‖ alf_ctb_cross_comp onent_cr_idc[ xCtb >> CtbLog2SizeY ][ yCtb >> CtbLog2SizeY ] == 0 ) | |
|    if( slice_alf_chroma_idc = = 2 ‖ slice_alf_chroma_idc = = 3 ) { | |
|       alf_ctb_flag[ 2 ][ xCtb >> CtbLog2SizeY ][ yCtb >> CtbLog2SizeY ] | ae(v) |
|       if( | |
| alf_ctb_flag[ 2 ][ xCtb >> CtbLog2SizeY ][ yCtb >> CtbLog2SizeY ] | |
|       && aps_alf_chroma_num_alt_filters_minus1 > 0 ) | |
|    alf_ctb_filter_alt_idx[ 1 ][ xCtb >> CtbLog2SizeY ][ yCtb >> CtbLog2Siz eY ] | ae(v) |
|    } | |

The semantics of CC-ALF related syntaxes can be described below:

alf_ctb_cross_component_cb_idc [xCtb>>CtbLog 2Size Y][yCtb>>CtbLog 2SizeY] equal to 0 can indicate that the cross component Cb filter is not applied to a block of Cb color component samples at a luma location (xCtb, yCtb).

alf_cross_component_cb_idc[xCtb>>CtbLog 2SizeY] [yCtb>>CtbLog 2Size Y] not equal to 0 can indicate that the alf_cross_component_cb_idc[xCtb>>CtbLog 2SizeY][yCtb>>CtbLog 2SizeY]-th cross component Cb filter is applied to the block of Cb color component samples at the luma location (xCtb, yCtb).

alf_ctb_cross_component_cr_idc[xCtb>>CtbLog 2SizeY][yCtb>>CtbLog 2SizeY] equal to 0 can indicate that the cross component Cr filter is not applied to block of Cr color component samples at the luma location (xCtb, yCtb).

alf_cross_component_cr_idc[xCtb>>CtbLog 2SizeY] [yCtb>>CtbLog 2Size Y] not equal to 0 can indicate that the alf_cross_component_cr_idc[xCtb>>CtbLog 2SizeY][yCtb>>CtbLog 2SizeY]-th cross component Cr filter is applied to the block of Cr color component samples at the luma location (xCtb, yCtb).

Examples of chroma sampling formats are described below. In general, a luma block can correspond to chroma block(s), such as two chroma blocks. A number of samples in each of the chroma block(s) can be less than a number of samples in the luma block. A chroma subsampling format (also referred to as a chroma subsampling format, e.g., specified by chroma_format_idc) can indicate a chroma horizontal subsampling factor (e.g., SubWidthC) and a chroma vertical subsampling factor (e.g., SubHeightC) between each of the chroma block(s) and the corresponding luma block. In an example, the chroma subsampling format is 4:2:0, and thus the chroma horizontal subsampling factor (e.g., SubWidthC) and the chroma vertical subsampling factor (e.g., SubHeightC) are 2, as shown in FIGS. 15A-15B. In an example, the chroma subsampling format is 4:2:2, and thus the chroma horizontal subsampling factor (e.g., SubWidthC) is 2, and the chroma vertical subsampling factor (e.g., SubHeightC) is 1. In an example, the chroma subsampling format is 4:4:4, and thus the chroma horizontal subsampling factor (e.g., SubWidthC) and the chroma vertical subsampling factor (e.g., SubHeightC) are 1. A chroma sample type (also referred to as a chroma sample position) can indicate a relative position of a chroma sample in the chroma block with respect to at least one corresponding luma sample in the luma block.

Figure 17A:
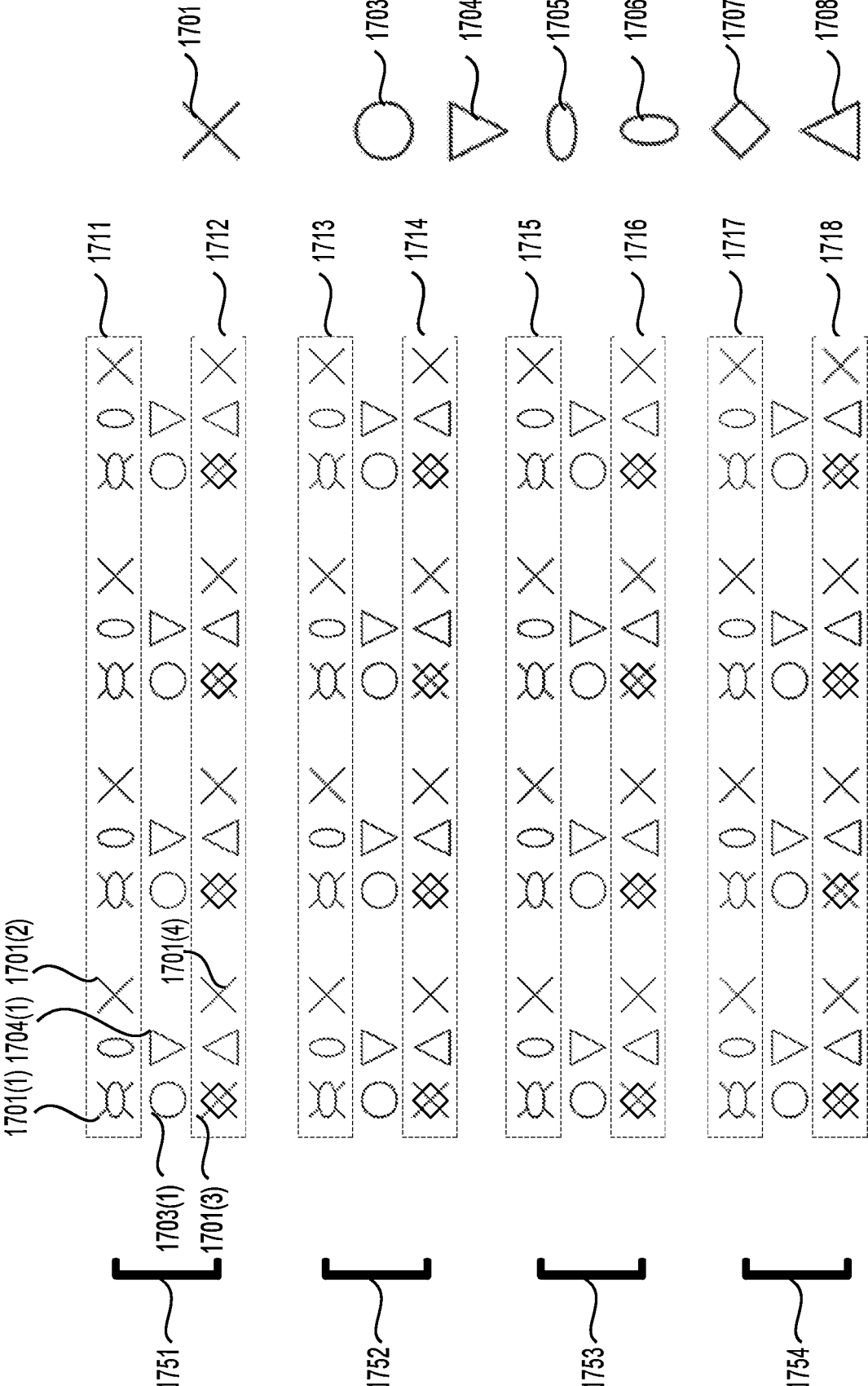
FIGS. 17A-17B show exemplary locations of chroma samples relative to luma samples according to embodiments of the disclosure.
Figure 17B:
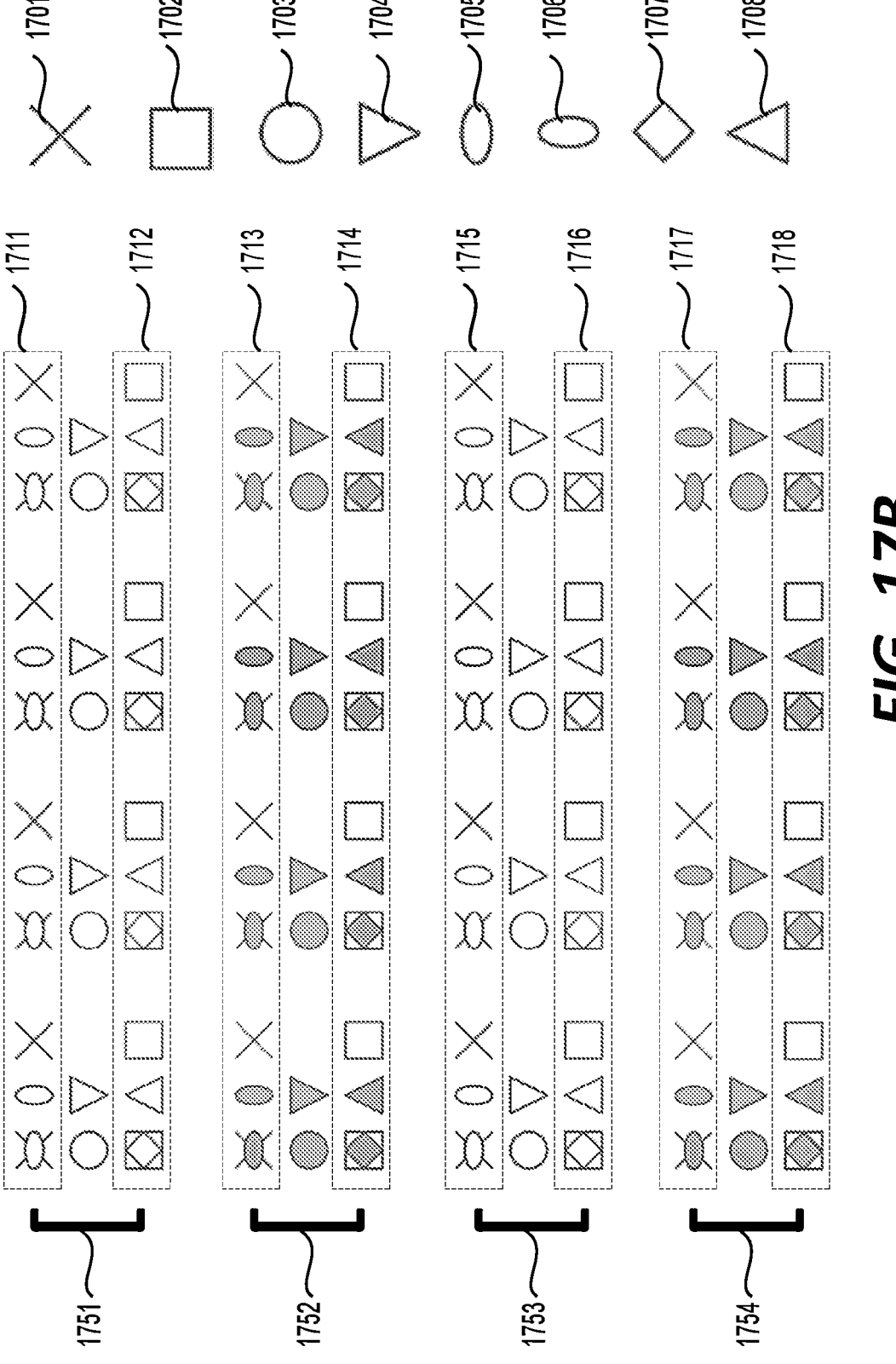

FIGS. 17A-17B show exemplary locations of chroma samples relative to luma samples according to embodiments of the disclosure. Referring to FIG. 17A, the luma samples (1701) are located in rows (1711)-(1718). The luma samples (1701) shown in FIG. 17A can represent a portion of a picture. In an example, a luma block (e.g., a luma CB) includes the luma samples (1701). The luma block can correspond to two chroma blocks having the chroma subsampling format of 4:2:0. In an example, each chroma block includes chroma samples (1703). Each chroma sample (e.g., the chroma sample (1703(1)) corresponds to four luma samples (e.g., the luma samples (1701(1))-(1701(4))). In an example, the four luma samples are the top-left (1701(1)), the top-right sample (1701(2)), the bottom-left sample (1701(3)), and the bottom-right sample (1701(4)). The chroma sample (e.g., (1703(1))) is located at a left center position that is between the top-left sample (1701(1)) and the bottom-left sample (1701(3)), and a chroma sample type of the chroma block having the chroma samples (1703) can be referred to as a chroma sample type 0. The chroma sample type 0 indicates a relative position 0 corresponding to the left center position in the middle of the top-left sample (1701(1)) and the bottom-left sample (1701(3)). The four luma samples (e.g., (1701(1))-(1701(4))) can be referred to as neighboring luma samples of the chroma sample (1703) (1).

In an example, each chroma block includes chroma samples (1704). The above description with reference to the chroma samples (1703) can be adapted to the chroma samples (1704), and thus detailed descriptions can be omitted for purposes of brevity. Each of the chroma samples (1704) can be located at a center position of four corresponding luma samples, and a chroma sample type of the chroma block having the chroma samples (1704) can be referred to as a chroma sample type 1. The chroma sample type 1 indicates a relative position 1 corresponding to the center position of the four luma samples (e.g., (1701(1))-(1701(4))). For example, one of the chroma samples (1704) can be located at a center portion of the luma samples (1701(1))-(1701(4)).

In an example, each chroma block includes chroma samples (1705). Each of the chroma samples (1705) can be located at a top left position that is co-located with the top-left sample of the four corresponding luma samples (1701), and a chroma sample type of the chroma block having the chroma samples (1705) can be referred to as a chroma sample type 2. Accordingly, each of the chroma samples (1705) is co-located with the top left sample of the four luma samples (1701) corresponding to the respective chroma sample. The chroma sample type 2 indicates a relative position 2 corresponding to the top left position of the four luma samples (1701). For example, one of the chroma samples (1705) can be located at a top left position of the luma samples (1701(1))-(1701(4)).

In an example, each chroma block includes chroma samples (1706). Each of the chroma samples (1706) can be located at a top center position between a corresponding top-left sample and a corresponding top-right sample, and a chroma sample type of the chroma block having the chroma samples (1706) can be referred to as a chroma sample type 3. The chroma sample type 3 indicates a relative position 3 corresponding to the top center position between the top-left sample (and the top-right sample. For example, one of the chroma samples (1706) can be located at a top center position of the luma samples (1701(1))-(1701(4)).

In an example, each chroma block includes chroma samples (1707). Each of the chroma samples (1707) can be located at a bottom left position that is co-located with the bottom-left sample of the four corresponding luma samples (1701), and a chroma sample type of the chroma block having the chroma samples (1707) can be referred to as a chroma sample type 4. Accordingly, each of the chroma samples (1707) is co-located with the bottom left sample of the four luma samples (1701) corresponding to the respective chroma sample. The chroma sample type 4 indicates a relative position 4 corresponding to the bottom left position of the four luma samples (1701). For example, one of the chroma samples (1707) can be located at a bottom left position of the luma samples (1701(1))-(1701(4)).

In an example, each chroma block includes chroma samples (1708). Each of the chroma samples (1708) is located at a bottom center position between the bottom-left sample and the bottom-right sample, and a chroma sample type of the chroma block having the chroma samples (1708) can be referred to as a chroma sample type 5. The chroma sample type 5 indicates a relative position 5 corresponding to the bottom center position between the bottom-left sample and the bottom-right sample of the four luma samples (1701). For example, one of the chroma samples (1708) can be located between the bottom-left sample and the bottom-right sample of the luma samples (1701(1))-(1701(4)).

In general, any suitable chroma sample type can be used for a chroma subsampling format. The chroma sample types 0-5 are exemplary chroma sample types described with the chroma subsampling format 4:2:0. Additional chroma sample types may be used for the chroma subsampling format 4:2:0. Further, other chroma sample types and/or variations of the chroma sample types 0-5 can be used for other chroma subsampling formats, such as 4:2:2, 4:4:4, or the like. In an example, a chroma sample type combining the chroma samples (1705) and (1707) is used for the chroma subsampling format 4:2:2.

In an example, the luma block is considered to have alternating rows, such as the rows (1711)-(1712) that include the top two samples (e.g., (1701(1))-(1701)(2))) of the four luma samples (e.g., (1701(1))-(1701)(4))) and the bottom two samples (e.g., (1701(3))-(1701)(4))) of the four luma samples (e.g., (1701(1)-(1701(4)))), respectively. Accordingly, the rows (1711), (1713), (1715), and (1717) can be referred to as current rows (also referred to as a top field), and the rows (1712), (1714), (1716), and (1718) can be referred to as next rows (also referred to as a bottom field). The four luma samples (e.g., (1701(1))-(1701(4)))) are located at the current row (e.g., (1711)) and the next row (e.g., (1712)). The relative positions 2-3 are located in the current rows, the relative positions 0-1 are located between each current row and the respective next row, and the relative positions 4-5 are located in the next rows.

The chroma samples (1703), (1704), (1705), (1706), (1707), or (1708) are located in rows (1751)-(1754) in each chroma block. Specific locations of the rows (1751)-(1754) can depend on the chroma sample type of the chroma samples. For example, for the chroma samples (1703)-(1704) having the respective chroma sample types 0-1, the row (1751) is located between the rows (1711)-(1712). For the chroma samples (1705)-(1706) having the respective chroma sample types 2-3, the row (1751) is co-located with the current row (1711). For the chroma samples (1707)-(1708) having the respective the chroma sample types 4-5, the row (1751) is co-located with the next row (1712). The above descriptions can be suitably adapted to the rows (1752)-(1754), and the detailed descriptions are omitted for purposes of brevity.

Any suitable scanning method can be used for displaying, storing, and/or transmitting the luma block and the corresponding chroma block(s) described above in FIG. 17A. In an example, progressive scanning is used.

An interlaced scan can be used, as shown in FIG. 17B. As described above, the chroma subsampling format is 4:2:0 (e.g., chroma_format_idc is equal to 1). In an example, a variable chroma location type (e.g., ChromaLocType) indicates the current rows (e.g., ChromaLocType is chroma_sample_loc_type_top_field) or the next rows (e.g., ChromaLocType is chroma_sample_loc_type_bottom_field). The current rows (1711), (1713), (1715), and (1717) and the next rows (1712), (1714), (1716), and (1718) can be scanned separately, for example, the current rows (1711), (1713), (1715), and (1717) can be scanned first followed by the next rows (1712), (1714), (1716), and (1718) being scanned. The current rows can include the luma samples (1701) while the next rows can include the luma samples (1702).

Similarly, the corresponding chroma block can be interlaced scanned. The rows (1751) and (1753) including the chroma samples (1703), (1704), (1705), (1706), (1707), or (1708) with no fill can be referred to as current rows (or current chroma rows), and the rows (1752) and (1754) including the chroma samples (1703), (1704), (1705), (1706), (1707), or (1708) with gray fill can be referred to as next rows (or next chroma rows). In an example, during the interlaced scan, the rows (1751) and (1753) are scanned first followed by scanning the rows (1752) and (1754).

A constrained directional enhancement filter (CDEF) can be used in video coding. An in-loop CDEF can be used to filter out coding artifacts while retaining details of an image. In some examples, such as in HEVC, a sample adaptive offset (SAO) algorithm achieves a similar goal by defining signal offsets for different classes of pixels. Unlike SAO, a CDEF is a non-linear spatial filter. In some examples, the design of the filter is constrained to be easily vectorizable (e.g., implementable with single instruction, multiple data (SIMD) operations), which was not the case for other non-linear filters such as a median filter and a bilateral filter.

In an example, the CDEF design originates from the following observations. In some examples, an amount of ringing artifacts in a coded image can be approximately proportional to a quantization step size. An amount of detail is a property of an input image. However, the smallest detail retained in the quantized image can be proportional to the quantization step size. For a given quantization step size, the amplitude of the ringing artifacts can be less than the amplitude of the details.

A CDEF can identify a direction of each block. The CDEF can then adaptively filter along the identified direction and to a lesser degree along directions rotated 45° from the identified direction. The filter strengths can be signaled explicitly, allowing a high degree of control over blurring. An efficient encoder search can be designed for the filter strengths. CDEF can be based on two in-loop filters and the combined filter can be used for video coding, such as in an AV1 codec.

Figure 18:
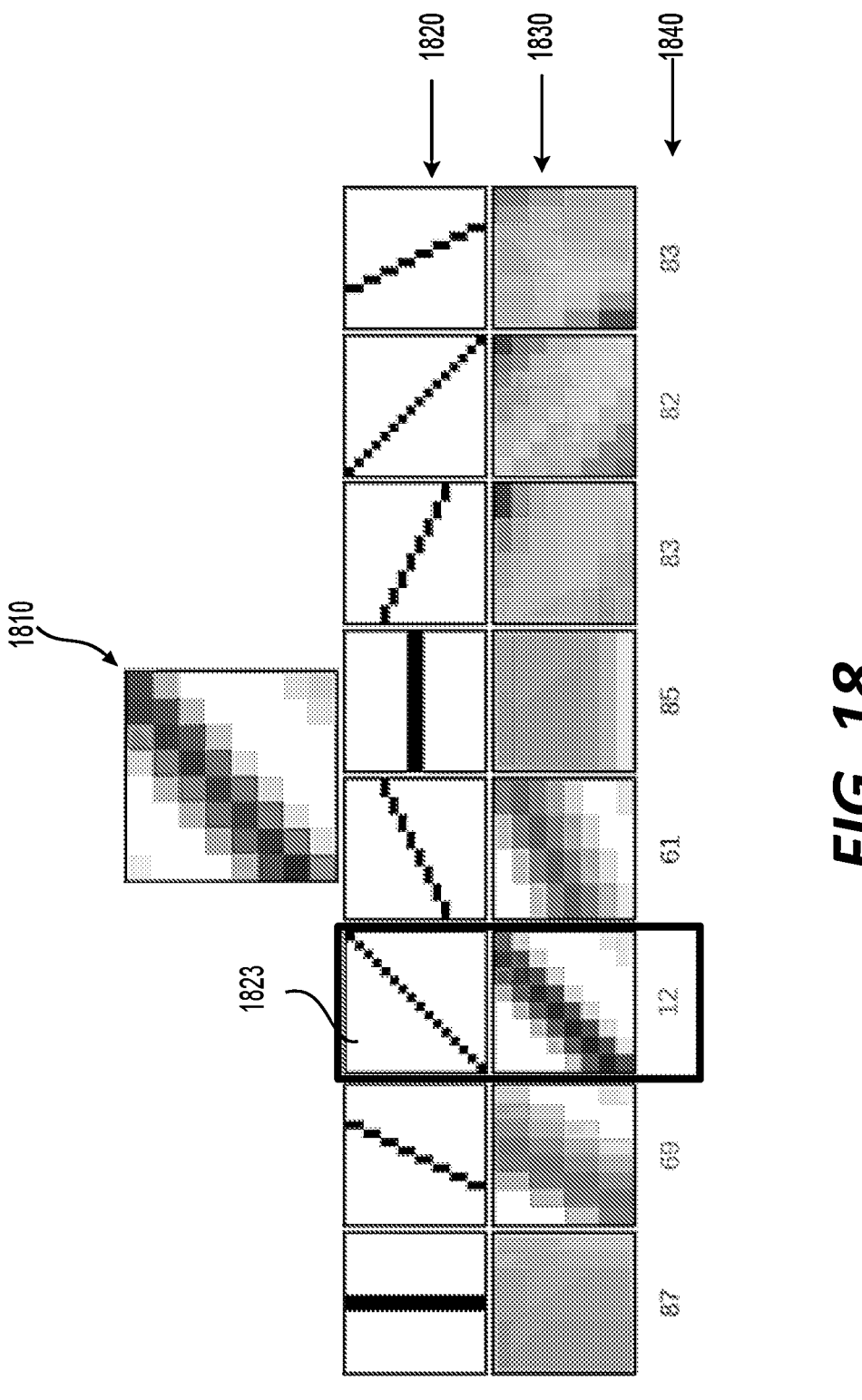
FIG. 18 shows an example of direction search for a block according to an embodiment of the disclosure.

The direction search can operate on reconstructed pixels (or samples), for example, after a deblocking filter. Since the reconstructed pixels are available to a decoder, the directions may not require signaling. The search can operate on blocks having a suitable size (e.g., 8×8 blocks) that are small enough to adequately handle non-straight edges and are large enough to reliably estimate directions when applied to a quantized image. Having a constant direction over an 8×8 region can make vectorization of the filter easier. For each block, the direction that best matches a pattern in the block can be determined by minimizing a difference measure, such as a sum of squared differences (SSD), RMS error, and the like, of the quantized block and each of the perfectly directional blocks (1830). In an example, a perfectly directional block (e.g., one of (1830)) is a block where all pixels along a line in one direction have the same value. FIG. 18 shows an example of direction search for an 8×8 block (1810) according to an embodiment of the disclosure. In an example shown in FIG. 18, the 45-degree direction (1823) among a set of directions (1820) is selected because the 45-degree direction (1823) can minimize the error. For example, the error for the 45-degree direction is 12 and is the smallest among the errors ranging from 12 to 87 indicated by a row (1840).

A non-linear low-pass directional filter is described below. Identifying the direction can help align filter taps along the identified direction to reduce ringing artifacts while preserving the directional edges or patterns. However, in some examples, directional filtering alone cannot sufficiently reduce ringing artifacts. It is desired to use additional filter taps on pixels that do not lie along a main direction (e.g., the identified direction). To reduce the risk of blurring, the additional filter taps can be treated more conservatively. Accordingly, a CDEF can define primary taps and secondary taps. In an example, a complete two dimensional (2D) CDEF filter is expressed as $$y(i, j) = x(i, j) + \text{round}\left(\sum_{m,n} w_{d,m,n}^{(p)} f\left(x(m, n) - x(i, j), S^{(p)}, D\right) + \sum_{m,n} w_{d,m,n}^{(s)} f\left(x(m, n) - x(i, j), S^{(s)}, D\right)\right), \quad \text{Eq. (14)}$$

In Eq. (14), D is a damping parameter, $S^{(p)}$ and $S^{(s)}$ are the strengths of the primary and secondary taps, respectively, and a function round (·) can round ties away from zero, $$w_{d,m,n}^{(p)} \text{ and } w_{d,m,n}^{(s)}$$

are the filter weights, and f(d, S, D) is a constraint function operating on a difference d (e.g., d=x(m, n)−x(i, j)). between a filtered pixel (e.g., x(i, j)) and each of the neighboring pixels (e.g., x(m, n)). When the difference is small, f(d, S, D) can be equal to the difference d (e.g., f(d, S, D)=d), and thus the filter can behave as a linear filter. When the difference is large, f(d, S, D) can be equal to 0 (e.g., f(d, S, D)=0), which effectively ignores the filter tap.

A set of in-loop restoration schemes can be used in video coding post deblocking, such as in AV1, to generally de-noise and enhance the quality of edges beyond a deblocking operation. The set of in-loop restoration schemes can be switchable within a frame (or a picture) per suitably sized tile. Some examples of the in-loop restoration schemes are described based on separable symmetric Wiener filters and dual self-guided filters with subspace projection. Because content statistics can vary substantially within a frame, the tools can be integrated within a switchable framework where different tools can be triggered in different regions of the frame.

A separable symmetric Wiener filter can be described below. One restoration tool can be the Wiener filter. Every pixel (or sample) in a degraded frame can be reconstructed as a non-causal filtered version of pixels within a w×w window around the pixel where w=2r+1 and is odd for an integer r. The 2D filter taps can be denoted by a vector F in a column-vectorized form having $w^2 \times 1$ elements, and a straightforward linear minimum mean square error (LMMSE) optimization can lead to filter parameters given by $F=H^{-1}$ M, where H is equal to $E[XX^T]$ and is the auto-covariance of x, the column-vectorized version of the $w^2$ samples in the w×w window around a pixel, and M that is equal to $E[YX^T]$ is the cross correlation of x with the scalar source sample y to be estimated. The encoder can estimate H and M from realizations in the deblocked frame and the source, and send the resultant filter F to a decoder. However, in some example, a substantial bit rate cost can occur in transmitting $w^2$ taps. Further, non-separable filtering can make decoding prohibitively complex. Therefore, a plurality of additional constraints can be imposed on the nature of F. For example, F is constrained to be separable so that the filtering can be implemented as separable horizontal and vertical w-tap convolutions. In an example, each of the horizontal and vertical filters are constrained to be symmetric. Further, in an example, a sum of the horizontal and vertical filter coefficients can be assumed to sum to 1.

Dual self-guided filtering with subspace projection can be described below. In some examples, guided filtering can be used in image filtering where a local linear model is used to compute a filtered output y from an unfiltered sample x. The local linear model can be written as $$y = F \, x + G \quad \text{Eq. (15)}$$

where F and G can be determined based on statistics of a degraded image and a guidance image (also referred to as a guide image) in a neighborhood of the filtered pixel. If the guide image is identical to the degraded image, the resultant self-guided filtering can have the effect of edge preserving smoothing. According to some aspects of the disclosure, the specific form of self-guided filtering can depend on two parameters: a radius r and a noise parameter e, and can be enumerated as follows:

1. Obtain a mean µ and a variance $\sigma^2$ of pixels in a (2r+1)×(2r+1) window around every pixel. Obtaining the mean µ and the variance $\sigma^2$ of the pixels can be implemented efficiently with box filtering based on integral imaging.

2. Compute parameters f and g for every pixel based on Eq. (16)

$$f = \sigma^2/(\sigma^2 + e); g = (1 - f)\mu \qquad \text{Eq. (16)}$$

3. Compute F and G for every pixel as averages of values of the parameters f and g in a 3×3 window around the pixel for use.

Filtering can be controlled by the radius r and the noise parameter e, where a larger radius r can imply a higher spatial variance and a higher noise parameter e can imply a higher range variance.

Figure 19:
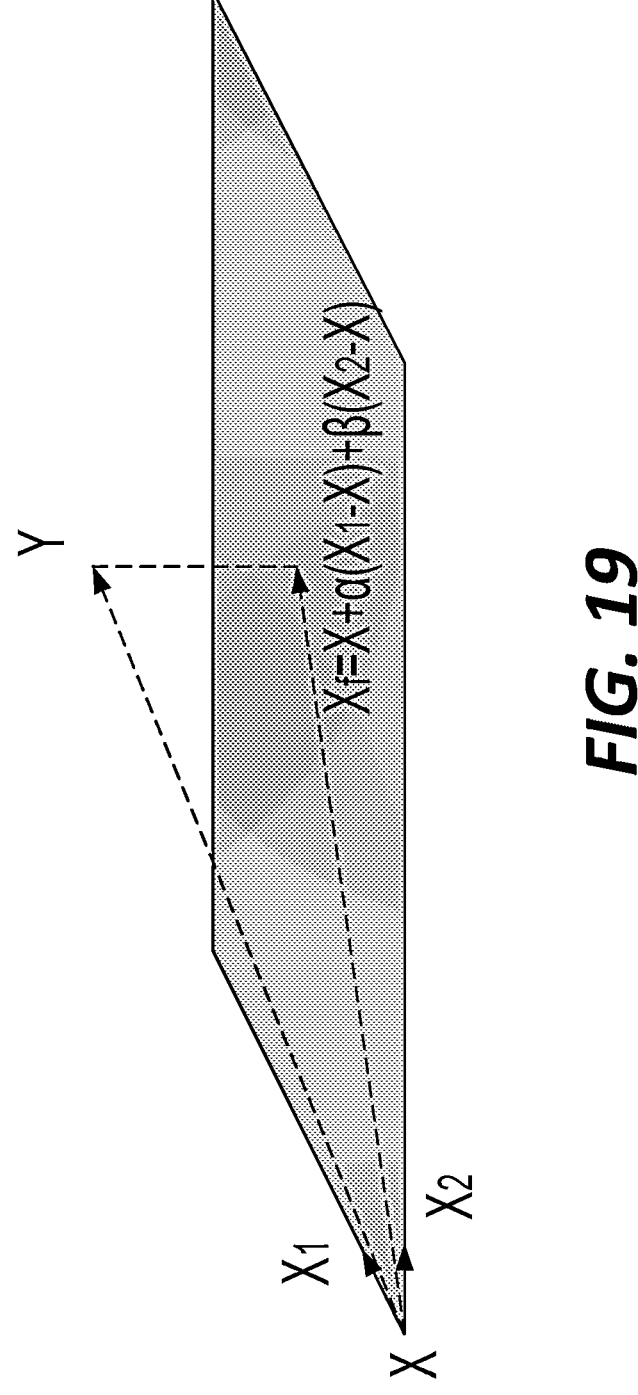
FIG. 19 shows an example of a subspace projection according to an embodiment of the disclosure.

FIG. 19 shows an example of a subspace projection according to an embodiment of the disclosure. In the example shown in FIG. 19, the subspace projection can use cheap restorations $X_1$ and $X_2$ to produce a final restoration $X_f$ closer to a source Y. Even though cheap restorations $X_1$ and $X_2$ are not close to a source Y, appropriate multipliers {α,β} can bring the cheap restorations $X_1$ and $X_2$ much closer to the source Y if the cheap restorations $X_1$ and $X_2$ move in the right direction. In an example, the final restoration $X_f$ is obtained based on Eq. (17) below.

$$X_f = X + \alpha(X_1 - X) + \beta(X_2 - X) \qquad \text{Eq. (17)}$$

A loop filtering method referred to as a Cross-Component Sample Offset (CCSO) filter or CCSO, can be used to reduce distortion of reconstructed samples (also referred to as reconstruction samples). In a CCSO filtering process, a non-linear mapping can be used to determine an output offset based on processed input reconstructed samples of a first color component. The output offset can be added to a reconstructed sample of a second color component in a filtering process of CCSO.

Figure 20:
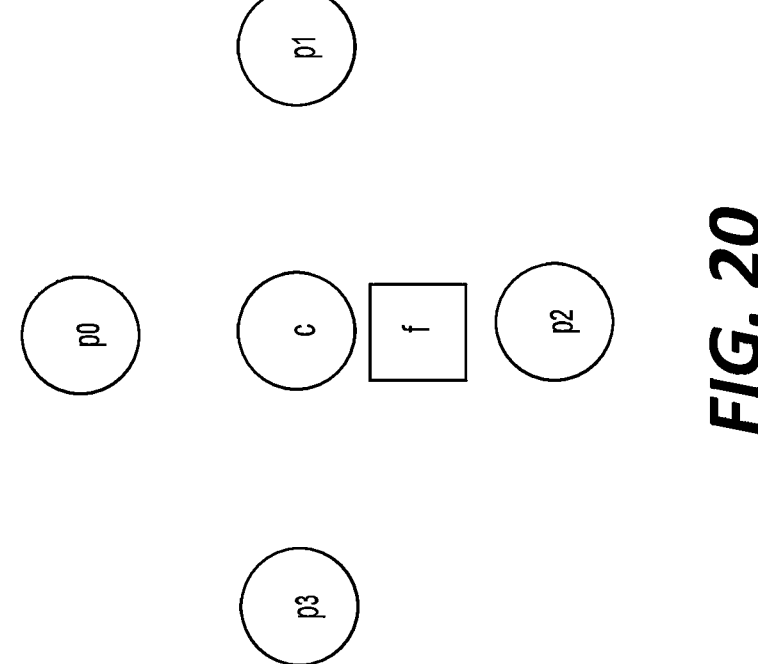
FIG. 20 shows an example of a filter support area in a Cross-Component Sample Offset (CCSO) filter according to an embodiment of the disclosure.

The input reconstructed samples can be from the first color component located in a filter support area, as shown in FIG. 20. FIG. 20 shows an example of the filter support area in a CCSO filter according to an embodiment of the disclosure. The filter support area can include four reconstructed samples: p0, p1, p2, and p3. The four input reconstructed samples can follow a cross-shape in a vertical direction and a horizontal direction. In an example, a center sample (denoted by c) in the first color component and a sample (denoted by f) to be filtered in the second color component are co-located. When processing the input reconstructed samples, the following steps can be applied:

Step 1: Delta values (e.g., differences) between the four reconstructed samples: p0, p1, p2 and p3 and the center sample c are computed, and are denoted as m0, m1, m2, and m3, respectively. For example, the delta value between p0 and c is m0.

Step 2: The delta values m0 to m3 can be further quantized. The quantized values can be denoted as d0, d1, d2, and d3. In an example, the quantized value is −1, 0, or 1 based on the following quantization process:

$$di = -1, \text{ if } mi < -N; \qquad \text{Eq. (18)}$$

$$di = 0, \text{ if } -N <= mi <= N; \qquad \text{Eq. (19)}$$

$$di = 1; \text{ if } mi > N. \qquad \text{Eq. (20)}$$

where N is a quantization step size, example values of N are 4, 8, 12, 16, and the like, di and mi refer to the respective quantized value and the delta value where i is 0, 1, 2, or 3.

The quantized values d0 to d3 can be used to identify a combination of the non-linear mapping. In the example shown in FIG. 20, the CCSO filter has four filter inputs d0 to d3, and each filter input can have one of the three quantized values (e.g., −1, 0, and 1), and thus a total number of combinations is 81 (e.g., $3^4$). FIGS. 21A-21C show an example of the 81 combinations according to an embodiment of the disclosure. The last column can represent the output offset value for each combination. The output offset values can be integers, such as 0, 1, −1, 3, −3, 5, −5, −7, and the like.

The final filtering process of the CCSO filter can be applied as follows:

$$f' = \text{clip}(f + s), \qquad \text{Eq. (21)}$$

where f is the reconstructed sample to be filtered, s is the output offset value, for example, retrieved from FIGS. 21A-21C. In an example shown in Eq. (21), the filtered sample value f' of the reconstructed sample to be filtered f can be further clipped into a range associated with a bit-depth.

A Local Sample Offset (LSO) method or an LSO filtering process can be used in video coding. In LSO, a similar filtering approach as used in CCSO can be applied. However, an output offset value can be applied on a color component that is the same color component of which the input reconstructed samples used in the filtering process are in. Accordingly, in LSO, the input reconstructed samples (e.g., p0-p3 and c) used in the filtering process and the reconstructed sample to be filtered (e.g., f) are in a same component, such as a luma component, a chroma component, or any suitable component. An LSO can a filter shape (such as shown in FIG. 20) that is similar or identical to that of a CCSO.

Figure 22:
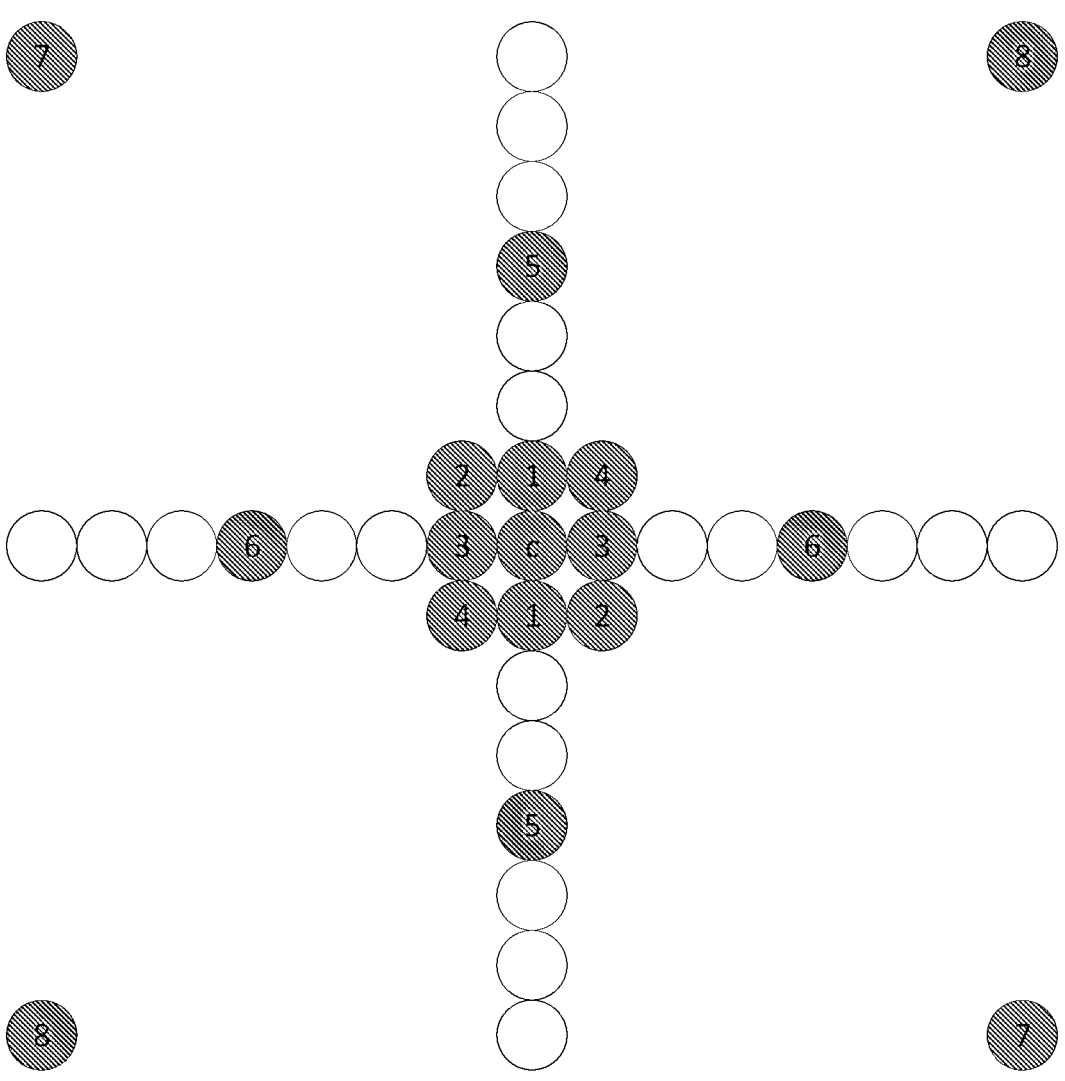
FIG. 22 shows an example implementation of a CCSO filter according to an embodiment of the disclosure.

A lower-complexity three tap CCSO design can be used in video coding. FIG. 22 shows an example implementation of CCSO according to an embodiment of the disclosure. Eight different filter shapes can be defined. Each of the filter shapes can define positions of the three reconstructed samples (also referred to as three taps) in a first component (also referred to as a first color component). The three reconstructed samples can include a center sample (denoted as c). In an example, a reconstructed sample in a second color component to be filtered is co-located with the center sample c. For purposes of clarity, the reconstructed sample in the second color component to be filtered is not shown in FIG. 22.

A SAO filter can be used in video coding. In an example, such as in HEVC, a SAO filter or a SAO filtering process can be applied to a reconstruction signal after a deblocking filter by using offset values, for example, in a slice header. For luma samples, an encoder can determine whether the SAO filter is applied for a current slice. If the SAO filter is enabled, a current picture can be recursively split into four sub-regions and one of six SAO types (e.g., SAO types 1-6) can be selected for each sub-region, as shown in Table 4. The SAO filter can classify reconstructed pixels into a plurality of categories and reduce the distortion by adding an offset to pixels of each category in a current sub-region. Edge properties can be used for pixel classification in the SAO types 1-4, and a pixel intensity can be used for pixel classification in the SAO types 5-6.

TABLE 4

| Specification of SAO types | | |
|---|---|---|
| SAO type | SAO type to be used | Number of categories |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | central bands band offset | 16 |
| 6 | side bands band offset | 16 |

A band offset (BO) can be used to classify pixels (e.g., all pixels) of a sub-region into multiple bands where each band can include pixels in a same intensity interval. An intensity range can be equally divided into a plurality of intervals (e.g., 32 intervals) from a minimum intensity value (e.g., zero) to a maximum intensity value (e.g. 255 for 8-bit pixels), and each interval can have an offset. Subsequently, the plurality of intervals or bands (e.g., 32 bands) can be divided into two groups. One group can include the 16 central bands, and the other group can include the 16 remaining bands. In an example, only offsets in one group are transmitted. Regarding the pixel classification operation in the BO, the five most significant bits of each pixel can be directly used as a band index.

An edge offset (EO) can use four 1-D 3-pixel patterns for pixel classification with consideration of edge directional information, as shown in FIG. 23. FIG. 23 shows examples of the four 1-D 3-pixel patterns for the pixel classification in the EO. From left to right, the four 1-D 3-pixel patterns correspond to a 1D 0-degree pattern (2310), a 1D 90-degree pattern (2320), a 1D 135-degree pattern (2330), and a 1D 45-degree pattern (2340), respectively. For each sub-region of a picture (e.g., the current picture), one of the four patterns can be selected to classify pixels into multiple categories by comparing each pixel with two neighboring pixels of the pixel. The selection can be sent in a bit-stream as side information. Table 5 shows the pixel classification rule for the EO.

TABLE 5

| Pixel classification rule for the EO | |
|---|---|
| Category | Condition |
| 1 | c < 2 neighbors |
| 2 | c < 1 neighbor && c == 1 neighbor |

TABLE 5-continued

| Pixel classification rule for the EO | |
|---|---|
| Category | Condition |
| 3 | c > 1 neighbor && c == 1 neighbor |
| 4 | c > 2 neighbors |
| 0 | None of the above |

In an example, it is desirable that the SAO on a decoder side is operated LCU-independently so that line buffers can be saved. In order to operate the SAO LCU-independently, in an example, pixels of the top and the bottom rows in each LCU are not SAO processed when the 90-degree, the 135-degree, and the 45-degree classification patterns are chosen, and pixels of the leftmost and rightmost columns in each LCU are not SAO processed when the 0-degree, the 135-degree, and the 45-degree patterns are chosen.

Table 6 below describes syntaxes that may be signaled for a CTU if the parameters are not merged from neighboring CTU.

TABLE 6

| An example of SAO syntax | |
|---|---|
| | Descriptor |
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|     for( i = 0; i < 4; i++ ) | |
|       sao_offset[ cIdx ][ rx][ ry ][ i ] | se(v) |
|   } else if( sao_type_idx[ cIdx ][ rx ][ ry ] ! = 0 ) | |
|     for( i = 0; i < 4; i++ ) | |
|       sao_offset[ cIdx ][ rx][ ry ][ i ] | ue(v) |
| } | |

Certain filters or filter shapes, such as filters or filter shapes used in a CCSO filtering process, require accessing neighboring sample(s) that can be relatively far away from the center sample that is co-located with a reconstructed sample to be filtered (e.g., the filter shapes 5, 7 and 8 shown in FIG. 22 where neighboring sample(s) that are four rows above the center sample need to be accessed). In some examples, accessing neighboring sample(s) that are relatively far away from the center sample may be too costly for implementing a CCSO filter in hardware. Accordingly, sample offset filters (e.g., CCSO or LSO) that use samples that are relatively close to the center sample can be used, such as shown in FIGS. 24-28. In some examples, accessing rows that are below the center sample and are relatively far away from the center sample does not increase the implementation cost as significantly as accessing rows that are above the center sample and are relatively far away from the center sample. Accordingly, in some examples, a constraint is applied to accessing a limited number of rows above the center sample, and a sample offset filter such as shown in FIG. 29 can be used.

According to aspects of the disclosure, a sample offset filter (or a sample offset filtering process) can refer to a filter or a filtering process where reconstructed samples of a first component (also referred to as a first color component) are used as inputs to the sample offset filter (or the sample offset filtering process), and an output of the sample offset filter (or the sample offset filtering process) can be applied to a reconstructed sample (to be filtered) of a second component (or a second color component). The reconstructed sample of the second component can be filtered based on the output of the sample offset filter, such as shown in Eq. (21). The sample offset filter can be an in-loop filter by which the output (also referred to as the output value) is applied to the reconstructed sample as an offset to filter out coding artifacts while retaining details of the second component. The sample offset filter can include one of LSO, a CCSO, and an adaptive sample offset filter (ASO).

A component, such as the first component, the second component, can be any suitable component in a colorspace (e.g., YCrCB, RGB, or the like) used in video coding, such as a luma component, a chroma component, a Y component, a Cb component, a Cr component, an R component, a G component, a B component, or the like. The second component can also be referred to as a current component as the reconstructed sample to be filtered is to be processed by an encoder and/or a decoder.

In an embodiment, the first component (or the first color component) is different from the second component (or the second color component), and the sample offset filter is referred to as a CCSO filter. More specifically, the CCSO can refer to a filter or a filtering process where reconstructed samples of the first component are used as inputs to the CCSO filter (or the CCSO filtering process), and an output of the CCSO filter (or the CCSO filtering process) can be applied to a reconstructed sample (to be filtered) of the second component (or the second color component). The reconstructed sample of the second component can be filtered based on the output of the CCSO filter, such as shown in Eq. (21). In an example, for the CCSO, the first component is a luma component, and the second component is a chroma component. In an example, for the CCSO, the first component and the second component are two different chroma components.

In an embodiment, the first component in the sample offset filter is the second component in the sample offset filter, and the sample offset filter can be referred to as an LSO filter. The LSO filter can be a filter or a filtering process where the reconstructed samples of the first component (or the first color component) (e.g., Y, Cb, or Cr) are used as inputs, and the output can be applied to the same first component, for example, to filter a reconstructed sample of the first component.

When the sample offset filter is applied to a reconstructed sample (to be filtered) of a current component (or a current color component) in a current picture, a filter shape of the sample offset filter can be one of a plurality of filter shapes (or a plurality of filters). Each of the plurality of filter shapes can include first reconstructed samples of a first component (or a first color component) in the current picture. According to aspects of the disclosure, for each of the plurality of filter shapes, the top-most sample of the first reconstructed samples is located within N rows (or lines) from a center sample (also referred to as a center reconstructed sample) of the first component that is co-located with the reconstructed sample (to be filtered) of the current component. The reconstructed sample to be filtered is in the current component.

In some embodiments, the center sample of the first component is at a same location with the reconstructed sample (to be filtered) of the current component. In an example, the first component is a luma component, and the current component is a chroma component. Referring to FIG. 17A, the center sample is the luma sample (1701(1)) and the reconstructed sample to be filtered is the chroma sample 1705, and the center sample (e.g., (1701(1))) and the reconstructed sample to be filtered (e.g., (1705)) are at the same location.

In some embodiments, the center sample of the first component is at a slightly different location from that of the reconstructed sample (to be filtered) of the current component. Referring to FIG. 17A, the center sample is the luma sample (1701(1)) and the reconstructed sample to be filtered is the chroma sample (1703(1)), and the center sample (e.g., (1701(1))) and the reconstructed sample to be filtered (e.g., (1703(1))) are located at slightly different locations (e.g., a difference along a vertical direction is less than a row). For example, referring to FIG. 17A, an offset along the vertical direction in the current picture is 0.5 rows. The center sample (e.g., (1701(1))) and the reconstructed sample to be filtered (e.g., (1703(1))) are co-located.

In some embodiments, for each of the plurality of filter shapes, the top-most sample of the first reconstructed samples is located within N rows (or lines) from the reconstructed sample to be filtered. N can be any suitable positive integer, such as in a range of 1 to 1024. For example, N can be constrained to be a relatively small integer to reduce hardware implementation cost of the sample offset filter (e.g., a CCSO, a LSO). In some examples, when N is constrained to be a relatively small integer, only neighboring samples that are within the constrained number of rows or lines of the center sample are used. In an example, N is less than or equal to 3.

In an example, a number of the first reconstructed samples in each of the plurality of filter shapes is less than five.

In an example, each of the plurality of filter shapes has a same number M of the first reconstructed samples of the first component. M is a positive integer. A filter or a filter shape having a number M of the first reconstructed samples can be referred to as an M-tap filter or a filter having M taps.

In an example, N is 1. In an example, the number of the first reconstructed samples in each of the plurality of filter shapes is 3 when N is 1.

In an embodiment, each of the plurality of filter shapes includes a center sample that is co-located with the reconstructed sample (to be filtered) of the current component. The first reconstructed samples include the center sample. The top-most sample of the first reconstructed samples is located within N rows (or lines) from the center sample. As described above, N can be less than or equal to 3. In an example, N is 1.

Subsequently, an output value of the sample offset filter can be determined based on the first reconstructed samples in the filter shape. Further, a filtered sample value of the reconstructed sample of the current component can be determined based on the reconstructed sample and the output value of the sample offset filter, such as shown in Eq. (21).

In an embodiment, each of the plurality of filter shapes includes the center sample that is co-located with the reconstructed sample of the current component, and the number of the first reconstructed samples in each of the plurality of filter shapes is 3. Remaining first reconstructed samples (that are different from the center sample) in each of the plurality of filter shapes can be located symmetrically or asymmetrically with respect to the center sample. Further, in an example, the first reconstructed samples in each of the plurality of filter shapes include the center sample and two samples that are symmetric with respect to the center sample. In an example, N is 1.

Figures 24, 25:
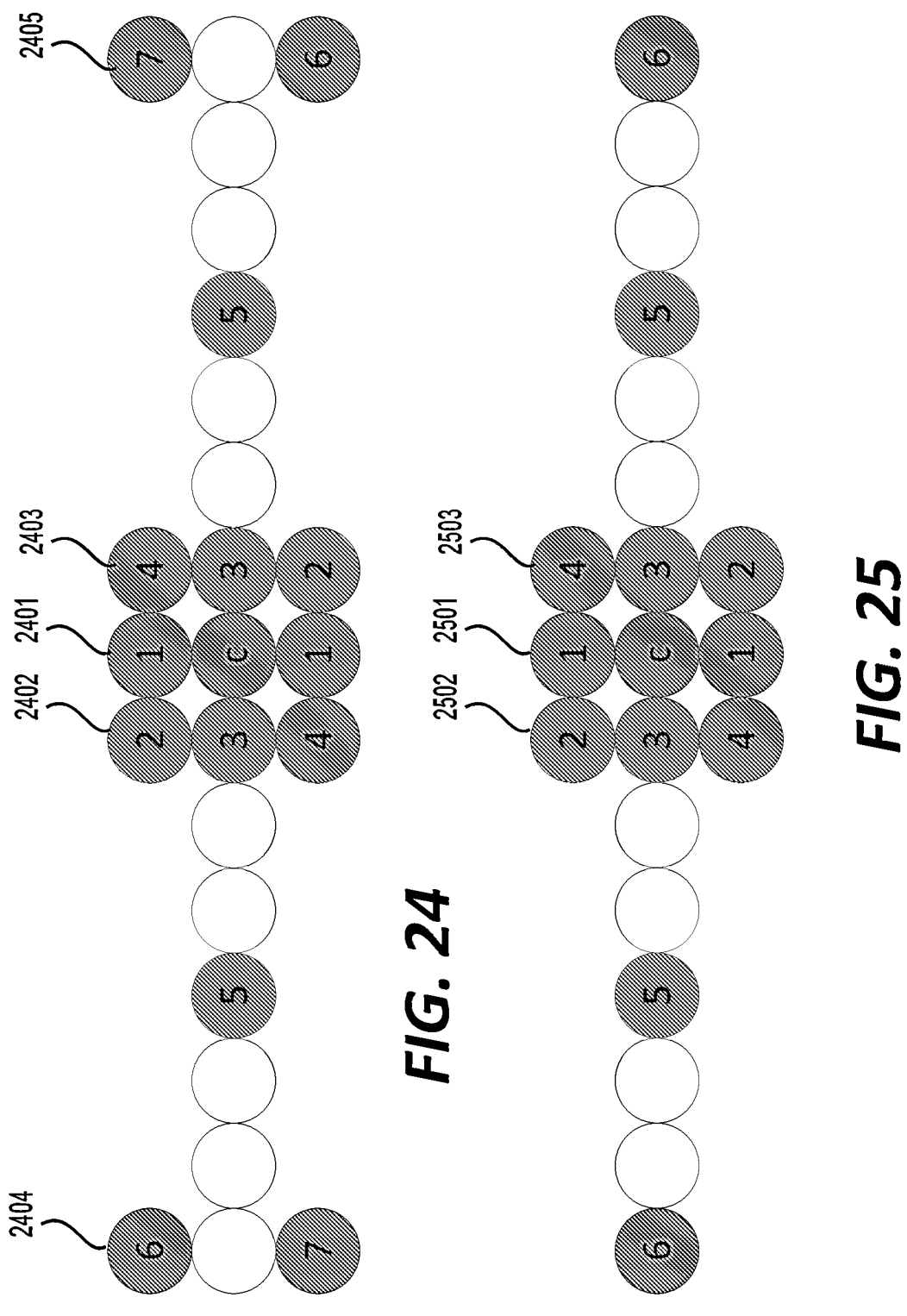
FIG. 24 show exemplary filter shapes used in a sample offset filter according to an embodiment of the disclosure.
FIG. 25 show exemplary filter shapes used in a sample offset filter according to an embodiment of the disclosure.

In an example, the plurality of filter shapes (or the plurality of filters) used in the sample offset filter (e.g., CCSO or LSO) includes one or more of the following 7 different 3-tap filter shapes as shown in FIG. 24. FIG. 24 shows an example of the plurality of filter shapes (or the plurality of filters) used in the sample offset filter (e.g., CCSO or LSO) according to an embodiment of the disclosure. The plurality of filter shapes includes filter shapes (or filters) 1-7. Each of the plurality of filter shapes can include three first reconstructed samples including a center sample (denoted as c) and two samples that are symmetric with respect to the center sample. N is 1. For example, for the filter shapes 1, 2, 4, 6, and 7, a top-most sample (e.g., each of samples (2401)-(2405)) of the first reconstructed samples is located within 1 row (e.g., 1 row above) from the reconstructed sample to be filtered (co-located with the center sample c). For example, for the filter shapes 3 and 5, a top-most sample of the first reconstructed samples is located within 1 row (e.g., same row) from the reconstructed sample to be filtered (co-located with the center sample c).

More specifically, referring to FIG. 24, a location of the center sample c in the first component of the current picture is (i, j) where i and j are integers. The plurality of filter shapes includes seven filter shapes 1-7. Locations of the two samples in a first of the seven filter shapes are (i−1, j) and (i+1, j). Locations of the two samples in a second of the seven filter shapes are (i−1, j−1) and (i+1, j+1). Locations of the two samples in a third of the seven filter shapes are (i, j−1) and (i, j+1). Locations of the two samples in a fourth of the seven filter shapes are (i+1, j−1) and (i−1, j+1). Locations of the two samples in a fifth of the seven filter shapes are (i, j−4) and (i, j+4). Locations of the two samples in a sixth of the seven filter shapes are (i−1, j−7) and (i+1, j+7). Locations of the two samples in a seventh of the seven filter shapes are (i+1, j−7) and (i−1, j+7). A subset of the filter shapes in FIG. 24 can be used in other embodiments. In an example, the plurality of filter shapes (or the plurality of filters) used in the sample offset filter (e.g., CCSO or LSO) include one or more of the filter shapes 1-7 in FIG. 24.

In an example, the plurality of filter shapes (or the plurality of filters) used in the sample offset filter (e.g., CCSO or LSO) includes one or more of the following 6 different 3-tap filter shapes as shown in FIG. 25. FIG. 25 shows an example of the plurality of filter shapes (or the plurality of filters) used in the sample offset filter (e.g., CCSO or LSO) according to an embodiment of the disclosure. The plurality of filter shapes includes filter shapes (or filters) 1-6. Each of the plurality of filter shapes can include three first reconstructed samples including a center sample (denoted as c) and two samples that are symmetric with respect to the center sample. N is 1. For example, for the filter shapes 1, 2, and 4, a top-most sample (e.g., each of samples (2501)-(2503)) of the first reconstructed samples is located within 1 row (e.g., 1 row above) from the reconstructed sample to be filtered (co-located with the center sample c). For example, for the filter shapes 3, 5, and 6, a top-most sample of the first reconstructed samples is located within 1 row (e.g., same row) from the reconstructed sample to be filtered (co-located with the center sample c).

More specifically, referring to FIG. 25, a location of the center sample c in the first component of the current picture is (i, j) where i and j are integers. The plurality of filter shapes includes seven filter shapes 1-6. Locations of the two samples in a first of the six filter shapes are (i−1, j) and (i+1, j). Locations of the two samples in a second of the six filter shapes are (i−1, j−1) and (i+1, j+1). Locations of the two samples in a third of the six filter shapes are (i, j−1) and (i, j+1). Locations of the two samples in a fourth of the six filter shapes are (i+1, j−1) and (i−1, j+1). Locations of the two samples in a fifth of the six filter shapes are (i, j−4) and (i, j+4). Locations of the two samples in a sixth of the six filter shapes are (i, j−7) and (i, j+7). A subset of the filter shapes can be used in other embodiments. In an example, the plurality of filter shapes (or the plurality of filters) used in the sample offset filter (e.g., CCSO or LSO) include one or more of the filter shapes 1-6 in FIG. 25.

Figures 26, 27:
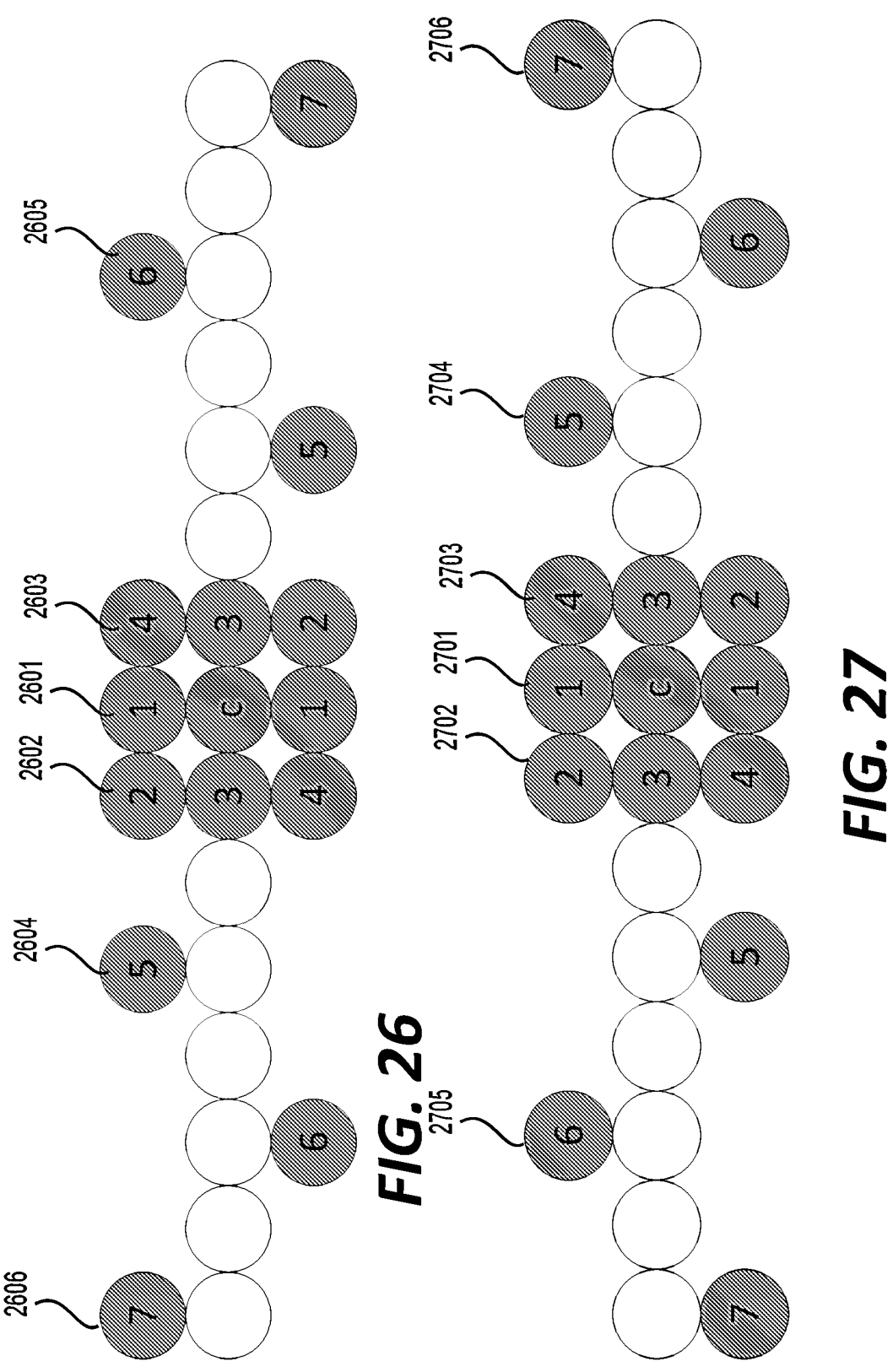
FIG. 26 show exemplary filter shapes used in a sample offset filter according to an embodiment of the disclosure.
FIG. 27 show exemplary filter shapes used in a sample offset filter according to an embodiment of the disclosure.

In an example, the plurality of filter shapes (or the plurality of filters) used in the sample offset filter (e.g., CCSO or LSO) includes one or more of the following 7 different 3-tap filter shapes as shown in FIG. 26. FIG. 26 shows an example of the plurality of filter shapes (or the plurality of filters) used in the sample offset filter (e.g., CCSO or LSO) according to an embodiment of the disclosure. The plurality of filter shapes includes filter shapes (or filters) 1-7. Each of the plurality of filter shapes can include three first reconstructed samples including a center sample (denoted as c) and two samples that are symmetric with respect to the center sample. N is 1. For example, for the filter shapes 1, 2, and 4-7, a top-most sample (e.g., each of samples (2601)-(2606)) of the first reconstructed samples is located within 1 row (e.g., 1 row above) from the reconstructed sample to be filtered (co-located with the center sample c). For example, for the filter shape 3, a top-most sample of the first reconstructed samples is located within 1 row (e.g., same row) from the reconstructed sample to be filtered (co-located with the center sample c).

More specifically, referring to FIG. 26, a location of the center sample c in the first component of the current picture is (i, j) where i and j are integers. The plurality of filter shapes includes seven filter shapes 1-7. Locations of the two samples in a first of the seven filter shapes are (i−1, j) and (i+1, j). Locations of the two samples in a second of the seven filter shapes are (i−1, j−1) and (i+1, j+1). Locations of the two samples in a third of the seven filter shapes are (i, j−1) and (i, j+1). Locations of the two samples in a fourth of the seven filter shapes are (i+1, j−1) and (i−1, j+1). Locations of the two samples in a fifth of the seven filter shapes are (i−1, j−3) and (i+1, j+3). Locations of the two samples in a sixth of the seven filter shapes are (i+1, j−5) and (i−1, j+5). Locations of the two samples in a seventh of the seven filter shapes are (i−1, j−7) and (i+1, j+7). A subset of the filter shapes can be used in other embodiments. In an example, the plurality of filter shapes (or the plurality of filters) used in the sample offset filter (e.g., CCSO or LSO) include one or more of the filter shapes 1-7 in FIG. 26.

In an example, the plurality of filter shapes (or the plurality of filters) used in the sample offset filter (e.g., CCSO or LSO) includes one or more of the following 7 different 3-tap filter shapes as shown in FIG. 27. FIG. 27 shows an example of the plurality of filter shapes (or the plurality of filters) used in the sample offset filter (e.g., CCSO or LSO) according to an embodiment of the disclosure. The plurality of filter shapes includes filter shapes (or filters) 1-7. Each of the plurality of filter shapes can include three first reconstructed samples including a center sample (denoted as c) and two samples that are symmetric with respect to the center sample. N is 1. For example, for the filter shapes 1, 2, and 4-7, a top-most sample (e.g., each of samples (2701)-(2706)) of the first reconstructed samples is located within 1 row (e.g., 1 row above) from the reconstructed sample to be filtered (co-located with the center sample c). For example, for the filter shape 3, a top-most sample of the first reconstructed samples is located within 1 row (e.g., same row) from the reconstructed sample to be filtered (co-located with the center sample c).

More specifically, referring to FIG. 27, a location of the center sample c in the first component of the current picture is (i, j) where i and j are integers. The plurality of filter shapes includes seven filter shapes 1-7. Locations of the two samples in a first of the seven filter shapes are (i−1, j) and (i+1, j). Locations of the two samples in a second of the seven filter shapes are (i−1, j−1) and (i+1, j+1). Locations of the two samples in a third of the seven filter shapes are (i, j−1) and (i, j+1). Locations of the two samples in a fourth of the seven filter shapes are (i+1, j−1) and (i−1, j+1). Locations of the two samples in a fifth of the seven filter shapes are (i+1, j−3) and (i−1, j+3). Locations of the two samples in a sixth of the seven filter shapes are (i−1, j−5) and (i+1, j+5). Locations of the two samples in a seventh of the seven filter shapes are (i+1, j−7) and (i−1, j+7). A subset of the filter shapes can be used in other embodiments. In an example, the plurality of filter shapes (or the plurality of filters) used in the sample offset filter (e.g., CCSO or LSO) include one or more of the filter shapes 1-7 in FIG. 27.

Figure 28:
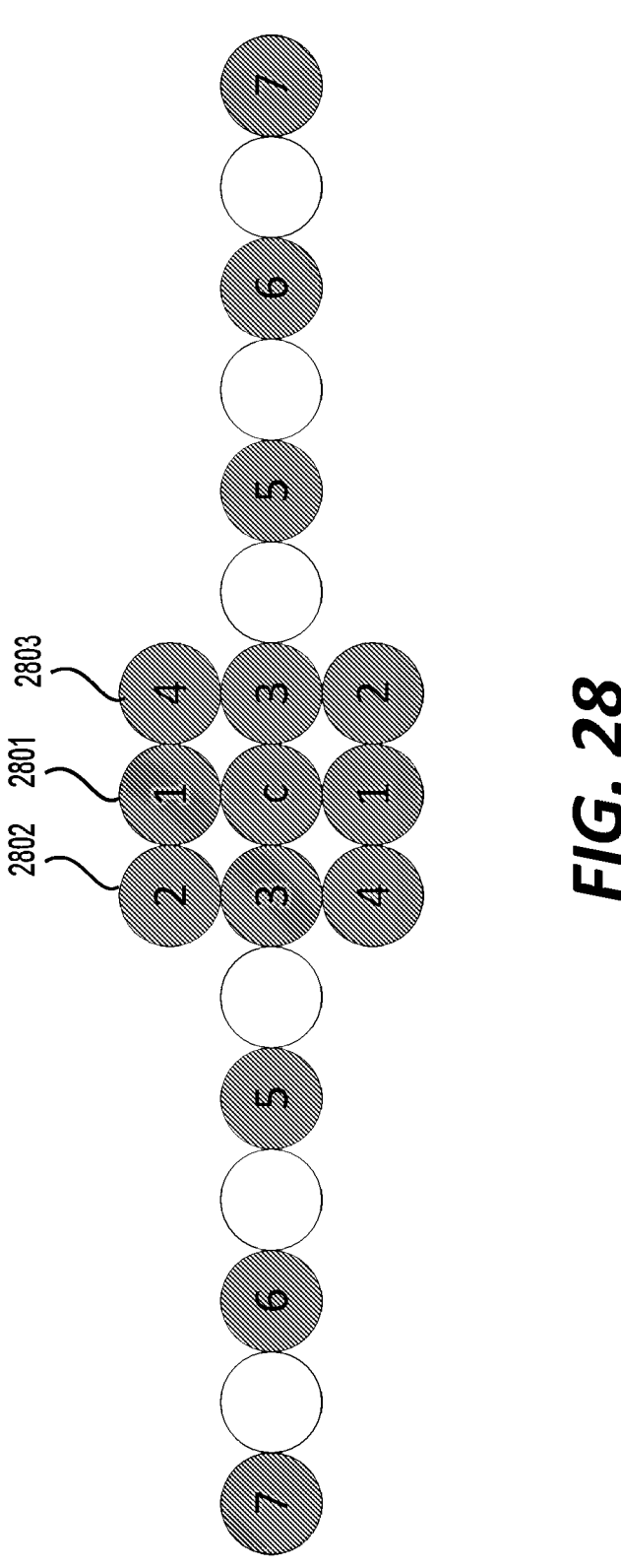
FIG. 28 show exemplary filter shapes used in a sample offset filter according to an embodiment of the disclosure.
Figure 29:
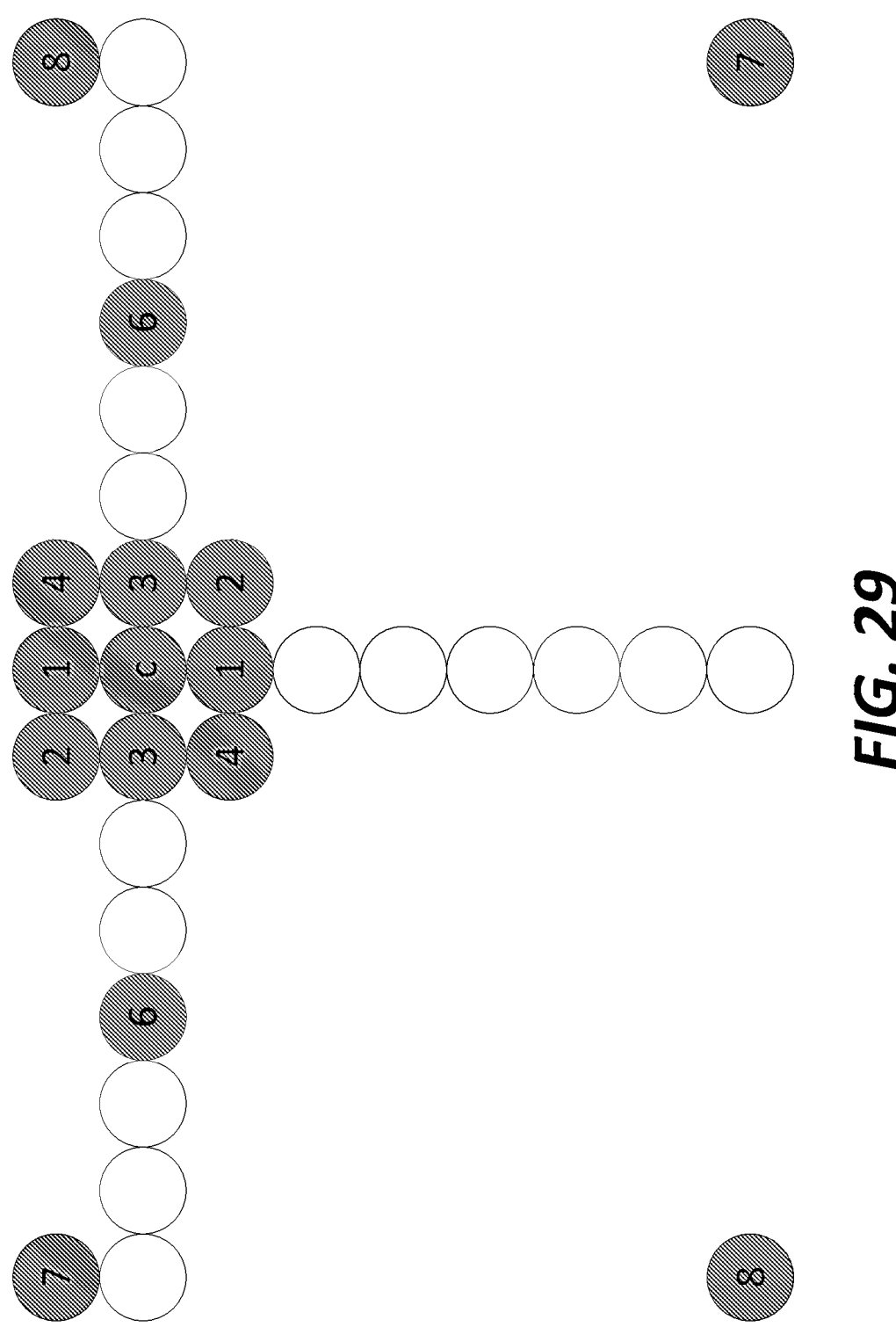
FIG. 29 show exemplary filter shapes used in a sample offset filter according to an embodiment of the disclosure.

In an example, the plurality of filter shapes (or the plurality of filters) used in the sample offset filter (e.g., CCSO or LSO) includes one or more of the following 7 different 3-tap filter shapes (filter shapes or filters 1-7) as shown in FIG. 28. FIG. 28 shows an example of the plurality of filter shapes (or the plurality of filters) used in the sample offset filter (e.g., CCSO or LSO) according to an embodiment of the disclosure. Each of the filter shapes 1-7 can include three first reconstructed samples including a center sample (denoted as c) and two samples that are symmetric with respect to the center sample. N is 1. For example, for the filter shapes 1, 2, and 4, a top-most sample (e.g., each of samples (2801)-(2803)) of the first reconstructed samples is located within 1 row (e.g., 1 row above) from the reconstructed sample to be filtered (co-located with the center sample c). For example, for the filter shapes 3 and 5-7, a top-most sample of the first reconstructed samples is located within 1 row (e.g., same row) from the reconstructed sample to be filtered (co-located with the center sample c).

More specifically, referring to FIG. 28, a location of the center sample c in the first component of the current picture is (i, j) where i and j are integers. Locations of the two samples in a first of the seven filter shapes are (i−1, j) and (i+1, j). Locations of the two samples in a second of the seven filter shapes are (i−1, j−1) and (i+1, j+1). Locations of the two samples in a third of the seven filter shapes are (i, j−1) and (i, j+1). Locations of the two samples in a fourth of the seven filter shapes are (i+1, j−1) and (i−1, j+1). Locations of the two samples in a fifth of the seven filter shapes are (i, j−3) and (i, j+3). Locations of the two samples in a sixth of the seven filter shapes are (i, j−5) and (i, j+5). Locations of the two samples in a seventh of the seven filter shapes are (i, j−7) and (i, j+7). In an example, the plurality of filter shapes (or the plurality of filters) used in the sample offset filter (e.g., CCSO or LSO) include one or more of the filter shapes 1-7 in FIG. 28. According to one embodiment, the plurality of filter shapes includes the filters 1-6 in FIG. 28.

A filter or a filter shape used in the sample offset filter (e.g., CCSO or LSO) may not be symmetric. In an example, a maximum number of top row(s) (e.g., row(s) that are above a center sample of the first component that is co-located with a reconstructed sample to be filtered) and a maximum number of bottom row(s) (e.g., row(s) that are below a center sample that is co-located with the reconstructed sample to be filtered) used as inputs to the sample offset filter (e.g., CCSO or LSO) is different. FIG. 29 shows an example of filter shapes (or filters) 1-4 and 6-8 according to an embodiment of the disclosure. Each of the filter shapes (or filters) 1-4 and 6-8 is a 3-tap filter including a center sample c and two other samples of the first component. The filter shapes 1-4 and 6 are symmetric where the two other samples are located symmetrically with respect to the center sample c. The filter shapes 7 and 8 are asymmetric where the two other samples are not located symmetrically with respect to the center sample c. In an example, when an asymmetric filter (e.g., the filter 7 or 8 in FIG. 29) is used in the sample offset filter (e.g., CCSO or LSO), the maximum number of rows (or lines) of a top sample is limited to be N relative to a current sample (e.g., a current reconstructed sample in a current component) to be filtered. In an example, the current sample is co-located with the center sample c of the first component. As described above, N can be any suitable positive integer. Example values of N can include but are not limited to 1 to 1024. In an example, N is less than or equal to 3. In an example, N is 1.

According to some aspects of the disclosure, a filter (e.g., position(s) of filter taps in the filter) or a filter shape used in the sample offset filter (e.g., CCSO or LSO) can depend on a relative position of a reconstructed sample to be filtered (also referred to as a current sample) within a FU (e.g., a 128×128 chroma block).

In an embodiment, coded information for a reconstructed sample of a current component in a filtering unit can be decoded from a coded video bitstream. The coded information can indicate the sample offset filter to be applied to the reconstructed sample to be filtered. The filter shape of the sample offset filter can include first reconstructed samples of a first component in a current picture. The FU is in the current picture. As described above, the filter shape can be determined based on a location (or a relative location) of the reconstructed sample in the FU. The reconstructed sample can be co-located with the center sample of the filter shape. Subsequently, an output value of the sample offset filter can be determined based on the first reconstructed samples in the filter shape. Then, a filtered sample value of the reconstructed sample of the current component can be determined based on the reconstructed sample and the output value of the sample offset filter.

In an embodiment, the current component is in a filtering unit in the current picture. The filter shape of the sample offset filter can be determined based on a location of the reconstructed samples in the filtering unit.

In an embodiment, when applying the sample offset filter (e.g., CCSO or LSO), if the sample offset filter has one or more filter taps that reach beyond the top K rows relative to the current sample to be filtered (or the center sample co-located with the current sample), then the sample offset filter is not allowed. In an example, the sample offset filter is replaced with another sample offset filter that has filter taps within the top K rows relative to the current sample to be filtered. K can be a positive integer. In an example, K is equal to N.

In an embodiment, when applying the sample offset filter (e.g., CCSO or LSO), if the sample offset filter has one or more filter taps that reach beyond the top L rows relative to a current FU (or a CTU) to be filtered, then the one or more filter taps can be moved to the nearest sample that is located in a same column but within the top L rows relative to the current FU (or the CTU) to be filtered or otherwise padded. The top L row can be relative to a sample in the current FU (or the CTU). In an example, the top L row is relative to a top boundary of the current FU (or the CTU). For example, if the sample offset filter has the one or more filter taps that reach beyond the top L rows relative to the top boundary of the current FU (or the CTU) to be filtered, then the one or more filter taps can be moved to the nearest sample that is located in the same column but within the top L rows relative to the top boundary of the current FU (or the CTU) to be filtered or otherwise padded. L can be an integer. In an example, L is equal to N.

Figure 30:
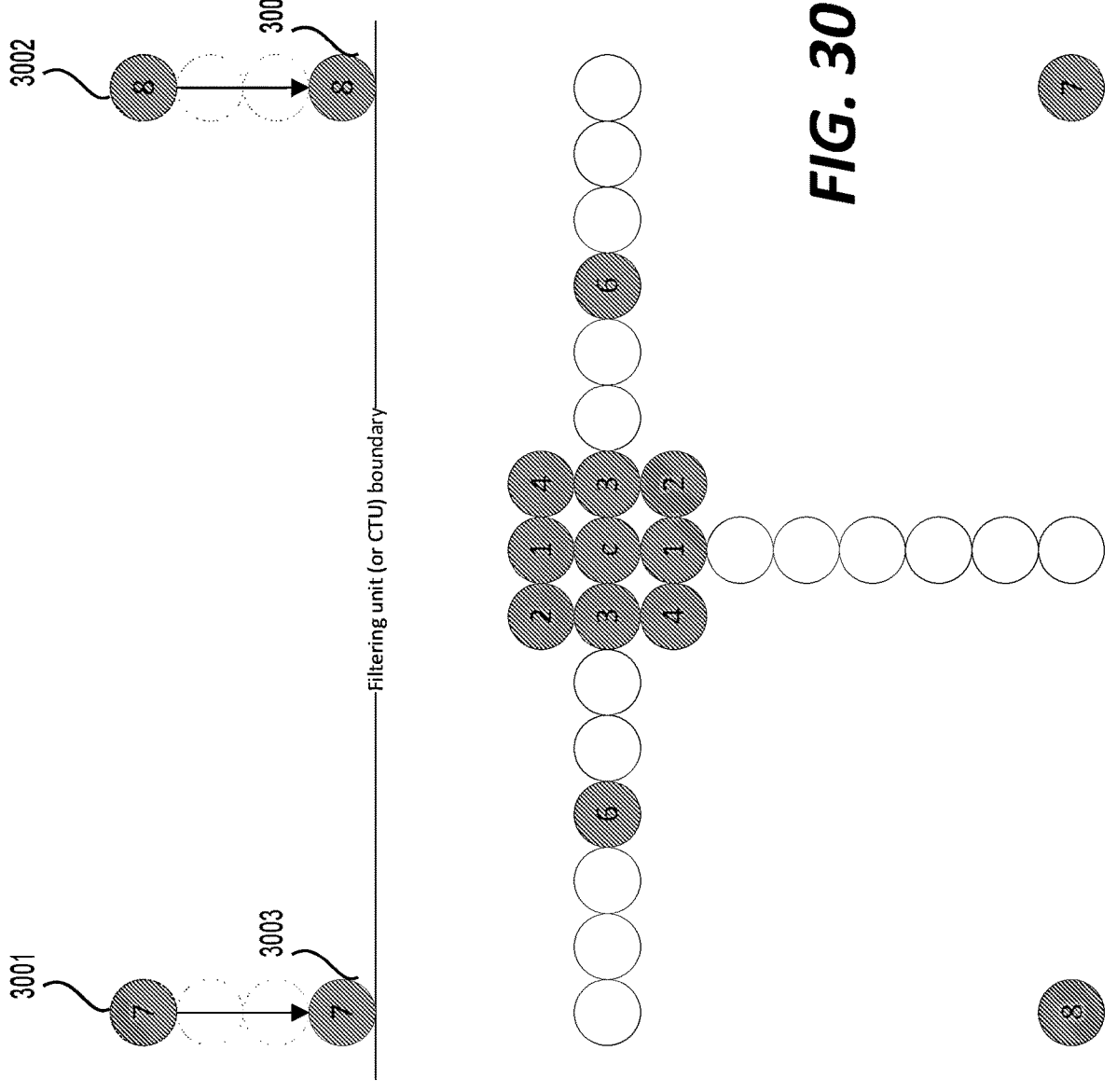
FIG. 30 shows an example where one or more filter taps are moved according to an embodiment of the disclosure.

FIG. 30 shows an example where the one or more filter taps (e.g., filter taps 7 and 8) are moved according to an embodiment of the disclosure. FIG. 30 shows seven filters (or filter shapes) 1-4 and 6-8. While the filter taps 1-4 and 6 are located within the top 4 rows of the current FU (or the CTU), such as a top boundary of the current FU, and two filter taps 7-8 (indicated by (3001)-(3002)) are located beyond the top 4 rows from the current FU (or the CTU). Then, the filter taps 7-8 are moved to new positions indicated by (3003)-(3004). The new positions of the filter taps 7-8 can be located within the top 4 rows from the current FU, such as within a top 1 row of the current FU (or the CTU).

Examples of filters such as the filters shown in FIGS. 20, 22, and 24-30 include the center sample c that is co-located with the reconstructed sample to be filtered (or the current sample). In general, a sample offset filter can include the center sample or exclude the center sample.

FIG. 31 shows a flow chart outlining a process (3100) according to an embodiment of the disclosure. The process (3100) can be used in filtering sample(s) in a current picture, such as sample(s) in a FU of a current picture. In various embodiments, the process (3100) are executed by processing circuitry, such as the processing circuitry in the terminal devices (310), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (3100) is implemented in software instructions, thus when the processing circuitry executes the software instructions, the processing circuitry performs the process (3100). The process starts at (S3101) and proceeds to (S3110).

At (S3110), coded information for a reconstructed sample of a current component in a current picture can be decoded from a coded video bitstream. The coded information can indicate a sample offset filter to be applied to the reconstructed sample. A filter shape of the sample offset filter can be one of a plurality of filter shapes. Each of the plurality of filter shapes can include first reconstructed samples of a first component in the current picture. In an embodiment, for each of the plurality of filter shapes, a top-most sample of the first reconstructed samples can be located within N rows from a center reconstructed sample (also referred to as a center sample) in the first component that is co-located with the reconstructed sample of the current component. N can be less than or equal to 3.

In an example, a number of the first reconstructed samples in each of the plurality of filter shapes is less than five.

In an example, each of the plurality of filter shapes includes the center reconstructed sample that is co-located with the reconstructed sample of the current component, and a number of the first reconstructed samples in each of the plurality of filter shapes is 3. The first reconstructed samples in each of the plurality of filter shapes can include the center reconstructed sample and two samples that are symmetric with respect to the center reconstructed sample.

In an example, N is 1.

In an example, a location of the center reconstructed sample in the first component of the current picture is (i, j), i and j being integers, and the plurality of filter shapes includes six filter shapes. Locations of the two samples in a first of the six filter shapes are (i−1, j) and (i+1, j). Locations of the two samples in a second of the six filter shapes are (i−1, j−1) and (i+1, j+1). Locations of the two samples in a third of the six filter shapes are (i, j−1) and (i, j+1). Locations of the two samples in a fourth of the six filter shapes are (i+1, j−1) and (i−1, j+1). Locations of the two samples in a fifth of the six filter shapes are (i, j−4) and (i, j+4). Locations of the two samples in a sixth of the six filter shapes are (i, j−7) and (i, j+7).

In an example, a location of the center reconstructed sample in the first component of the current picture is (i, j), i and j being integers, and the plurality of filter shapes includes six different filter shapes. Locations of the two samples in the first filter shape are (i−1, j) and (i+1, j). Locations of the two samples in the second filter shape are (i−1, j−1) and (i+1, j+1). Locations of the two samples in the third filter shape are (i, j−1) and (i, j+1). Locations of the two samples in the fourth filter shape are (i+1, j−1) and (i−1, j+1). Locations of the two samples in the fifth filter shape are (i, j−3) and (i, j+3). Locations of the two samples in the sixth filter shape are (i, j−5) and (i, j+5).

The sample offset filter can be a CCSO filter or a LSO filter.

In an example, the first component is the second component. In an example, the first component is different from the second component. The first component can be a luma component, and the current component can be a chroma component.

In an example, the sample offset filter is a LSO filter, the first component is the current component, and the reconstructed sample in the current component is the center reconstructed sample.

At (S3120), an output value of the sample offset filter can be determined based on the first reconstructed samples in the filter shape.

At (S3130), a filtered sample value of the reconstructed sample of the current component can be determined based on the reconstructed sample and the output value of the sample offset filter. In various examples, the sample offset filter is an in-loop filter by which the output value is applied to the reconstructed sample as an offset to filter out coding artifacts while retaining details of the current component in a current picture. The sample offset filter can include one of an LSO, a CCSO, and an adaptive sample offset filter (ASO). The process (3100) proceeds to (S3199), and terminates.

The process (3100) can be suitably adapted. Step(s) in the process (3100) can be modified and/or omitted. Additional step(s) can be added. Any suitable order of implementation can be used. In an example, the current component is in a filtering unit in the current picture. The filter shape of the sample offset filter can be determined based on a location of the reconstructed sample in the filtering unit. The sample offset filter is a CCSO filter, and the filtering unit is a chroma block having 128×128 chroma samples.

Figure 32:
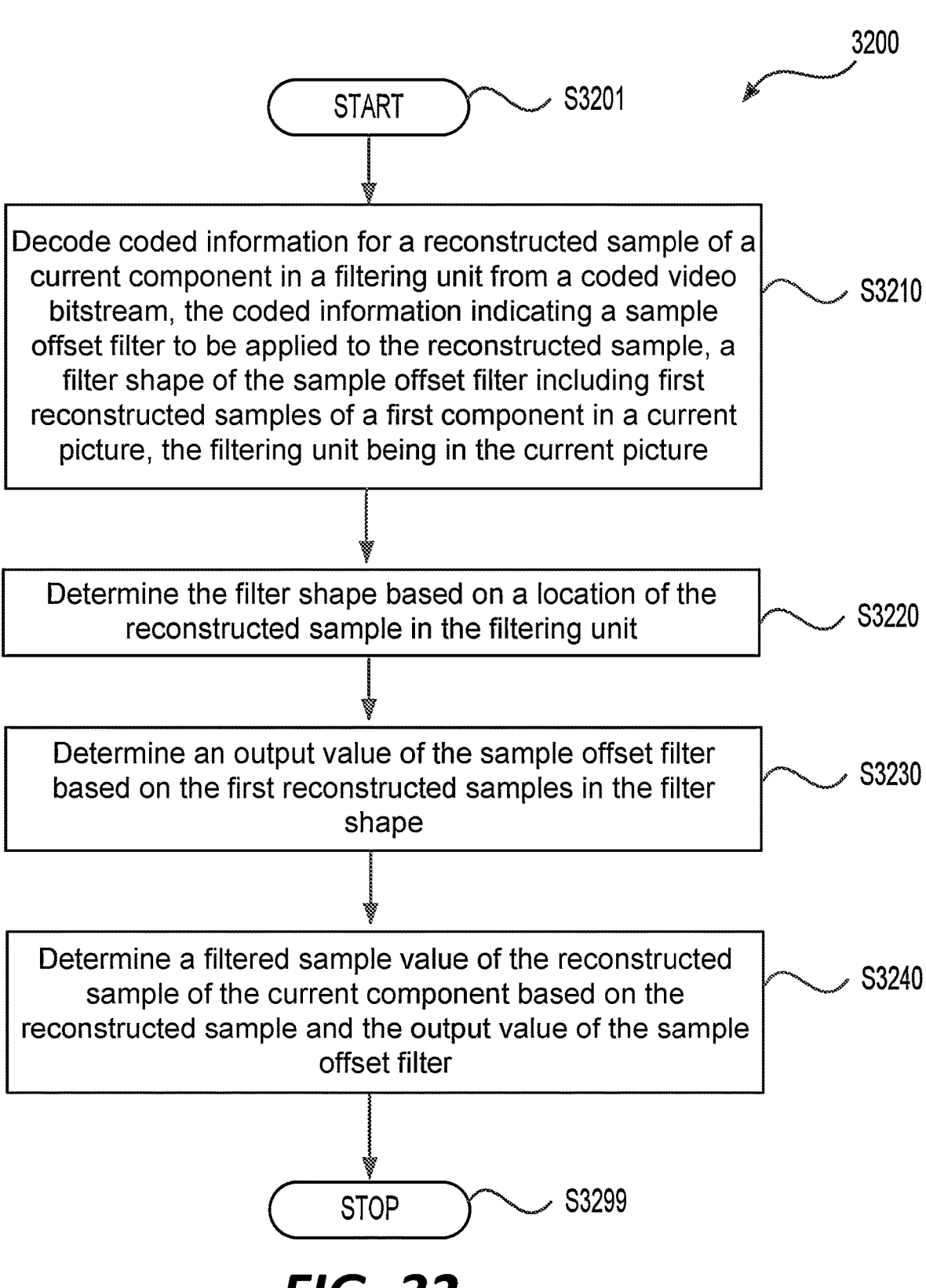
FIG. 32 shows a flow chart outlining a process (3200) according to an embodiment of the disclosure.

FIG. 32 shows a flow chart outlining a process (3200) according to an embodiment of the disclosure. The process (3200) can be used in filtering sample(s) in a current picture, such as sample(s) in a FU of a current picture. In various embodiments, the process (3200) are executed by processing circuitry, such as the processing circuitry in the terminal devices (310), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (3200) is implemented in software instructions, thus when the processing circuitry executes the software instructions, the processing circuitry performs the process (3200). The process starts at (S3201) and proceeds to (S3210).

At (S3210), coded information for a reconstructed sample of a current component in a filtering unit can be decoded from a coded video bitstream. The coded information can indicate a sample offset filter to be applied to the reconstructed sample. A filter shape of the sample offset filter can include first reconstructed samples of a first component in a current picture, the filtering unit being in the current picture.

In an example, the filtering unit is a chroma block having 128×128 chroma samples.

In an example, the sample offset filter is a cross-component sample offset (CCSO) filter.

In an example, the sample offset filter is a local sample offset (LSO) filter.

At (S3220), the filter shape (e.g., position(s) of respective filter tap(s)) can be determined based on a location of the reconstructed sample in the filtering unit, such as described with reference to FIG. 30.

At (S3230), an output value of the sample offset filter can be determined based on the first reconstructed samples in the filter shape.

At (S3240), a filtered sample value of the reconstructed sample of the current component can be determined based on the reconstructed sample and the output value of the sample offset filter. The process (3200) proceeds to (S3299), and terminates.

The process (3200) can be suitably adapted. Step(s) in the process (3200) can be modified and/or omitted. Additional step(s) can be added. Any suitable order of implementation can be used.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 33 shows a computer system (3300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 33:
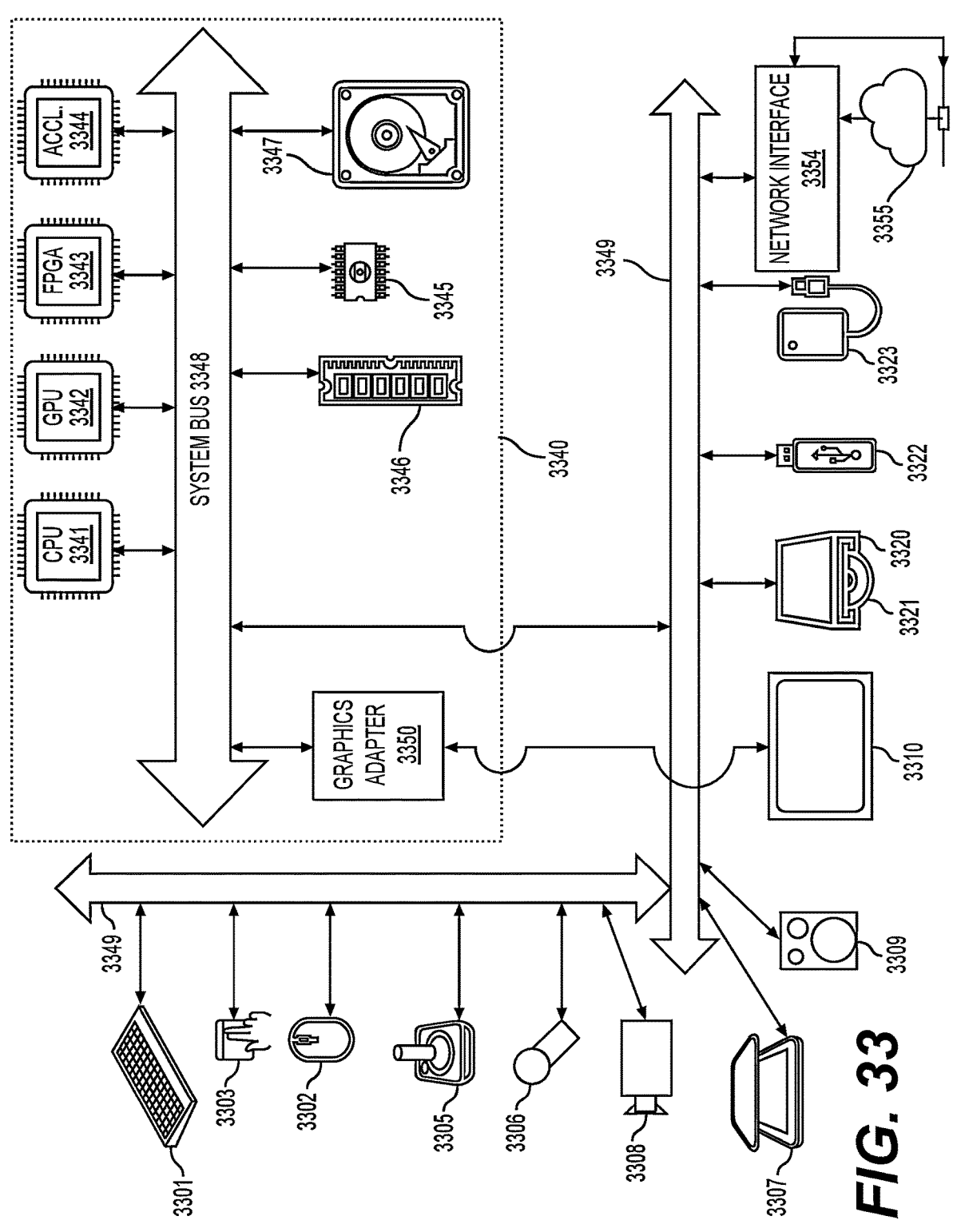
FIG. 33 is a schematic illustration of a computer system in accordance with an embodiment.

The components shown in FIG. 33 for computer system (3300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3300).

Computer system (3300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3301), mouse (3302), trackpad (3303), touch screen (3310), data-glove (not shown), joystick (3305), microphone (3306), scanner (3307), camera (3308).

Computer system (3300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3310), data-glove (not shown), or joystick (3305), but there can also be tactile feedback devices that do not serve as input devices), audio output devices (such as: speakers (3309), headphones (not depicted)), visual output devices (such as screens (3310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3300) can also include human accessible storage devices and their associated media such as optical media including CD/DVD ROM/RW (3320) with CD/DVD or the like media (3321), thumb-drive (3322), removable hard drive or solid state drive (3323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3300) can also include an interface (3354) to one or more communication networks (3355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general purpose data ports or peripheral buses (3349) (such as, for example USB ports of the computer system (3300)); others are commonly integrated into the core of the computer system (3300) by attachment to a system bus as described below (for example Ethernet interface into a PC computer system or cellular network interface into a smartphone computer system). Using any of these networks, computer system (3300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3340) of the computer system (3300).

The core (3340) can include one or more Central Processing Units (CPU) (3341), Graphics Processing Units (GPU) (3342), specialized programmable processing units in the form of Field Programmable Gate Areas (FPGA) (3343), hardware accelerators for certain tasks (3344), graphics adapters (3350), and so forth. These devices, along with Read-only memory (ROM) (3345), Random-access memory (3346), internal mass storage such as internal non-user accessible hard drives, SSDs, and the like (3347), may be connected through a system bus (3348). In some computer systems, the system bus (3348) can be accessible in the form of one or more physical plugs to enable extensions by additional CPUs, GPU, and the like. The peripheral devices can be attached either directly to the core's system bus (3348), or through a peripheral bus (3349). In an example, the screen (3310) can be connected to the graphics adapter (3350). Architectures for a peripheral bus include PCI, USB, and the like.

CPUs (3341), GPUs (3342), FPGAs (3343), and accelerators (3344) can execute certain instructions that, in combination, can make up the aforementioned computer code. That computer code can be stored in ROM (3345) or RAM (3346). Transitional data can also be stored in RAM (3346), whereas permanent data can be stored for example, in the internal mass storage (3347). Fast storage and retrieve to any of the memory devices can be enabled through the use of cache memory, that can be closely associated with one or more CPU (3341), GPU (3342), mass storage (3347), ROM (3345), RAM (3346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3300), and specifically the core (3340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3340) that are of non-transitory nature, such as core-internal mass storage (3347) or ROM (3345). The software implementing various embodiments of the present disclosure can be stored in such devices and executed by core (3340). A computer-readable medium can include one or more memory devices or chips, according to particular needs. The software can cause the core (3340) and specifically the processors therein (including CPU, GPU, FPGA, and the like) to execute particular processes or particular parts of particular processes described herein, including defining data structures stored in RAM (3346) and modifying such data structures according to the processes defined by the software. In addition or as an alternative, the computer system can provide functionality as a result of logic hardwired or otherwise embodied in a circuit (for example: accelerator (3344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

---

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter -continued Appendix A: Acronyms AV1: AOMedia Video 1
AV2: AOMedia Video 2

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:

receiving a bitstream that includes coded information indicating a filter shape of a sample offset filter to be applied to a reconstructed sample of a first component in a current picture, the filter shape of the sample offset filter being one of a plurality of filter shapes, each of the plurality of filter shapes including different first reconstructed samples of a second component in the current picture;

determining an output value of the sample offset filter based on the first reconstructed samples in the filter shape indicated by the coded information; and determining a filtered sample value of the reconstructed sample of the first component based on the reconstructed sample and the output value of the sample offset filter, wherein for each of the plurality of filter shapes, a top-most sample of the first reconstructed samples is located within N rows from a center reconstructed sample in the second component that is co-located with the reconstructed sample of the first component, N being less than or equal to 3.

2. The method of claim 1, wherein a number of the first reconstructed samples in each of the plurality of filter shapes is 2.

3. The method of claim 1, wherein each of the plurality of filter shapes includes a center reconstructed sample that is co-located with the reconstructed sample of the first component.

4. The method of claim 3, wherein the first reconstructed samples in each of the plurality of filter shapes include the center reconstructed sample and two samples that are symmetric with respect to the center reconstructed sample.

5. The method of claim 1, wherein N is 1.

6. The method of claim 1, wherein the sample offset filter comprises one of a local sample offset filter (LSO), a cross-component sample offset filter (CCSO), and an adaptive sample offset filter (ASO).

7. The method of claim 6, wherein the sample offset filter is the CCSO, the first component is a chroma component, and the second component is a luma component.

8. The method of claim 6, wherein the sample offset filter is the LSO, the second component is the first component, and the reconstructed sample is a center reconstructed sample.

9. The method of claim 1, wherein a location of a center reconstructed sample in the second component of the current picture is (i, j), i and j being integers, the plurality of filter shapes includes six filter shapes, locations of the two samples in a first of the six filter shapes are (i−1, j) and (i+1, j), locations of the two samples in a second of the six filter shapes are (i−1, j−1) and (i+1, j+1), locations of the two samples in a third of the six filter shapes are (i, j−1) and (i, j+1), locations of the two samples in a fourth of the six filter shapes are (i+1, j−1) and (i−1, j+1), locations of the two samples in a fifth of the six filter shapes are (i, j−a) and (i, j+a), and locations of the two samples in a sixth of the six filter shapes are (i, j−b) and (i, j+b), and a is a first integer and b is a second integer that is different from the first integer.

10. The method of claim 1, wherein the sample offset filter is a cross-component sample offset (CCSO) filter, and a filtering unit is a chroma block having 128×128 chroma samples.

11. A method for video encoding, comprising:

determining a filter shape from a plurality of filter shapes of a sample offset filter to be applied to a reconstructed sample of a first component in a current picture, each of the plurality of filter shapes including different first reconstructed samples of a second component; and generating a bitstream based on samples of the current picture and the determined filter shape of the sample offset filter, the bitstream including coded information that indicates the filter shape of the sample offset filter to be applied to the reconstructed sample of the first component, wherein for each of the plurality of filter shapes, a top-most sample of the first reconstructed samples is located within N rows from a center reconstructed sample in the second component that is co-located with the reconstructed sample of the first component, N being less than or equal to 3.

12. The method of claim 11, wherein a number of the first reconstructed samples in each of the plurality of filter shapes is 2.

13. The method of claim 11, wherein each of the plurality of filter shapes includes a center reconstructed sample that is co-located with the reconstructed sample of the first component.

14. The method of claim 13, wherein the first reconstructed samples in each of the plurality of filter shapes include the center reconstructed sample and two samples that are symmetric with respect to the center reconstructed sample.

15. The method of claim 11, wherein N is 1.

16. The method of claim 11, wherein the sample offset filter comprises one of a local sample offset filter (LSO), a cross-component sample offset filter (CCSO), and an adaptive sample offset filter (ASO).

17. The method of claim 11, wherein a location of a center reconstructed sample in the second component of the current picture is (i, j), i and j being integers, the plurality of filter shapes includes six filter shapes, locations of the two samples in a first of the six filter shapes are (i−1, j) and (i+1, j), locations of the two samples in a second of the six filter shapes are (i−1, j−1) and (i+1, j+1), locations of the two samples in a third of the six filter shapes are (i, j−1) and (i, j+1), locations of the two samples in a fourth of the six filter shapes are (i+1, j−1) and (i−1, j+1), locations of the two samples in a fifth of the six filter shapes are (i, j–a) and (i, j+a), and locations of the two samples in a sixth of the six filter shapes are (i, j–b) and (i, j+b), and a is a first integer and b is a second integer that is different from the first integer.

18. A non-transitory computer-readable storage medium storing instructions which when executed by processing circuitry cause the processing circuitry to perform a method of encoding a bitstream, the method comprising:

determining a filter shape from a plurality of filter shapes of a sample offset filter to be applied to a reconstructed sample of a first component in a current picture, each of the plurality of filter shapes including different first reconstructed samples of a second component;

generating the bitstream based on samples of the current picture and the determined filter shape of the sample offset filter, the bitstream including coded information that indicates the filter shape of the sample offset filter to be applied to the reconstructed sample of the first component; and transmitting the bitstream, wherein for each of the plurality of filter shapes, a top-most sample of the first reconstructed samples is located within N rows from a center reconstructed sample in the second component that is co-located with the reconstructed sample of the first component, N being less than or equal to 3.

19. The method of claim 18, wherein each of the plurality of filter shapes includes a center reconstructed sample that is co-located with the reconstructed sample of the first component.

20. The method of claim 18, wherein N is 1.

\* \* \* \* \*